US012504002B1

(12) United States Patent
Finnell

(10) Patent No.: US 12,504,002 B1
(45) Date of Patent: Dec. 23, 2025

(54) TENSION TURBINE ASSEMBLY AND OPERATIONAL CONTROL SYSTEM

(71) Applicant: Alfred Finnell, Loxahatchee, FL (US)

(72) Inventor: Alfred Finnell, Loxahatchee, FL (US)

(*) Notice: Subject to any disclaimer, the term of this patent is extended or adjusted under 35 U.S.C. 154(b) by 0 days.

(21) Appl. No.: 18/815,783

(22) Filed: Aug. 26, 2024

Related U.S. Application Data

(63) Continuation-in-part of application No. 17/334,705, filed on May 29, 2021, now abandoned, which is a continuation-in-part of application No. 16/595,428, filed on Oct. 7, 2019, now Pat. No. 11,021,243, which is a continuation-in-part of application No. 15/469,542, filed on Mar. 26, 2017, now Pat. No. 10,435,145, which is a continuation-in-part of application No. 14/204,931, filed on Mar. 11, 2014, now Pat. No. 10,443,569, which is a continuation-in-part of application No. 12/825,857, filed on Jun. 29, 2010, now Pat. No. 8,668,455, which is a continuation-in-part of application No. 12/496,769, filed on Jul. 2, 2009, now Pat. No. 7,775,760.

(51) Int. Cl.
*F03D 9/25* (2016.01)
*H02K 7/18* (2006.01)

(52) U.S. Cl.
CPC ............... *F03D 9/25* (2016.05); *H02K 7/183* (2013.01); *F05B 2220/706* (2013.01); *F05B 2270/32* (2013.01); *F05B 2270/327* (2013.01); *F05B 2270/404* (2013.01)

(58) Field of Classification Search
CPC ...... F03D 7/0256; F03D 7/0272; F03D 9/255; F05B 2270/1012; F05B 2270/32; F05B 2270/327; F05B 2270/331
See application file for complete search history.

(56) References Cited

U.S. PATENT DOCUMENTS

| 155,472 | A | 9/1874 | Smythe |
| 178,507 | A | 6/1876 | Burrows |
| 243,169 | A | 6/1881 | Sprague |
| 835,667 | A | 11/1906 | Donnelly |

(Continued)

FOREIGN PATENT DOCUMENTS

| FR | 2473465 | 7/1981 |
| RU | 2694610 | 1/2002 |

*Primary Examiner* — Pedro J Cuevas
(74) *Attorney, Agent, or Firm* — Allen D Hertz, P.A.; Allen D. Hertz

(57) ABSTRACT

A tension airfoil assembly includes an outer rim located concentrically with a hub supported by a plurality of spokes, each spoke extending therebetween. A series of airfoils, each airfoil having an aerodynamically lifting shape extending between a leading edge and a trailing edge. The tension airfoil assembly can be employed as an electrical power generating system, a propulsion and/or lifting device integrated into a vehicle, such as an airplane, a helicopter, a tandem rotor helicopter, etc. The power generating system can be optimized by applying an electrical load to reduce a rotational rate of the blade assembly. The optimal load can be determined and controlled by a computing system, preferably using Artificial Intelligence, which constantly or periodically monitors the conditions. The load is determined by a stall speed, a wind velocity, and a variation of the wind velocity.

19 Claims, 38 Drawing Sheets

(56) References Cited

U.S. PATENT DOCUMENTS

| | | |
|---|---|---|
| 1,461,048 A | 7/1923 | Roman |
| 3,902,072 A | 8/1975 | Quinn |
| 3,930,625 A | 1/1976 | Krivka |
| 3,942,839 A | 3/1976 | Chalk |
| 3,974,395 A | 8/1976 | Bright |
| 4,087,927 A | 5/1978 | Basmajian |
| 4,146,264 A | 3/1979 | Korzeniewski |
| 4,256,972 A | 3/1981 | Wyatt |
| 4,280,061 A | 7/1981 | Lawson-Tancred |
| 4,289,970 A | 9/1981 | Deibert |
| 4,330,714 A | 5/1982 | Smith |
| 4,331,881 A | 5/1982 | Soderholm |
| 4,340,822 A | 7/1982 | Gregg |
| 4,410,806 A | 10/1983 | Brulle |
| 4,426,192 A | 1/1984 | Chertok |
| 4,427,897 A | 1/1984 | Migliori |
| 4,461,957 A | 7/1984 | Jallen |
| 4,490,093 A | 12/1984 | Chertok |
| 4,491,739 A | 1/1985 | Watson |
| 4,503,673 A | 3/1985 | Schachle |
| 4,511,807 A | 4/1985 | Somerville |
| 4,656,413 A | 4/1987 | Bourbeau |
| 5,798,632 A | 8/1998 | Muljadi |
| 5,823,749 A | 10/1998 | Green |
| 5,982,116 A | 11/1999 | Yang |
| 6,064,123 A | 5/2000 | Gislason |
| 6,155,785 A | 12/2000 | Rechnagel |
| 6,320,273 B1 | 11/2001 | Nemec |
| 6,726,439 B2 | 4/2004 | Mikhail et al. |
| 6,853,096 B1 | 2/2005 | Yu et al. |
| 6,864,597 B1 | 3/2005 | Ricker |
| 6,957,946 B1 | 10/2005 | Vander Kley |
| 7,183,664 B2 | 2/2007 | McClintic |
| 7,268,443 B2 | 9/2007 | Kikuchi |
| 7,352,076 B1 | 4/2008 | Gabrys |
| 7,399,162 B2 | 7/2008 | Williams |
| 7,420,288 B2 | 9/2008 | Calley |
| 7,425,774 B2 | 9/2008 | Shibata et al. |
| 7,436,086 B2 | 10/2008 | McClintic |
| 7,615,880 B2 | 11/2009 | Kikuchi |
| 7,761,190 B2 | 7/2010 | Delmerico |
| 7,775,760 B1 | 8/2010 | Finnell |
| 7,863,767 B2 | 1/2011 | Chapple |
| 7,952,216 B2 | 5/2011 | Kikuchi |
| 8,011,614 B2 | 9/2011 | Bird |
| 8,174,142 B2 | 5/2012 | Barber |
| 8,178,987 B2 | 5/2012 | Mahawili |
| 8,242,620 B2 | 8/2012 | Kikuchi |
| 8,247,914 B2 | 8/2012 | Calley |
| 8,258,645 B2 | 9/2012 | Barber |
| 8,278,773 B2 | 10/2012 | Murata |
| 8,362,633 B2 | 1/2013 | Tsutsumi |
| 8,368,236 B2 | 2/2013 | Ben-David |
| 8,436,485 B1 | 5/2013 | Smith |
| 8,464,990 B2 | 6/2013 | Flores |
| 8,466,573 B2 | 6/2013 | Kikuchi |
| 8,502,402 B2 | 8/2013 | Hamano |
| 8,598,731 B2 | 12/2013 | Pitre |
| 8,668,455 B2 | 3/2014 | Finnell |
| 8,736,093 B2 | 5/2014 | Kii |
| 8,870,553 B2 | 10/2014 | Lavender |
| 9,004,864 B2 | 4/2015 | Stimm |
| 9,103,438 B2 | 8/2015 | Caldwell |
| 9,194,371 B2 | 11/2015 | Stimm |
| 9,261,078 B2 | 2/2016 | Calley |
| 9,328,720 B2 | 5/2016 | Caldwell |
| 9,331,534 B2 | 5/2016 | Yost |
| 9,631,503 B2 | 4/2017 | Ehrnberg |
| 9,797,373 B2 | 10/2017 | Aihara |
| 10,184,455 B2 | 1/2019 | Dermitzakis |
| 10,186,155 B2 | 1/2019 | Tong et al. |
| 10,435,145 B1 | 10/2019 | Finnell |
| 10,443,569 B1 | 10/2019 | Finnell |
| 10,746,160 B2 * | 8/2020 | Spruce ................ F03D 7/0292 |
| 10,871,146 B2 * | 12/2020 | Spruce ................ F03D 7/048 |
| 10,907,611 B2 * | 2/2021 | Spruce ................ G05B 19/048 |
| 10,927,814 B2 * | 2/2021 | Spruce ................ F03D 7/028 |
| 10,928,816 B2 * | 2/2021 | Spruce ................ G06F 30/17 |
| 10,975,844 B2 * | 4/2021 | Spruce ................ F03D 17/00 |
| 11,021,243 B1 | 6/2021 | Finnell |
| 11,047,698 B2 | 6/2021 | Han et al. |
| 11,052,821 B2 | 7/2021 | Pedersen |
| 11,125,212 B2 * | 9/2021 | Suzuki ................ F03D 3/005 |
| 11,428,208 B2 * | 8/2022 | Spruce ................ F03D 80/50 |
| 11,514,358 B2 | 11/2022 | Kim |
| 11,642,179 B2 | 5/2023 | Roh et al. |
| 12,230,383 B2 | 2/2025 | Rosenberg et al. |
| 2006/0056972 A1 | 3/2006 | Delong |
| 2006/0131890 A1 | 6/2006 | Gizara |
| 2007/0024058 A1 | 2/2007 | McClintic |
| 2007/0036653 A1 | 2/2007 | Bak et al. |
| 2007/0138798 A1 | 6/2007 | McClintic |
| 2007/0170724 A1 | 7/2007 | Calley |
| 2007/0221779 A1 | 9/2007 | Ikeda |
| 2008/0069696 A1 | 3/2008 | Ball |
| 2008/0240923 A1 | 10/2008 | Bonnet |
| 2008/0253892 A1 | 10/2008 | Dehlsen |
| 2008/0296962 A1 | 12/2008 | Tsai |
| 2009/0008986 A1 | 1/2009 | Granieri |
| 2009/0058095 A1 | 3/2009 | McClintic |
| 2009/0110554 A1 | 4/2009 | Dukovic |
| 2009/0140522 A1 | 6/2009 | Chapple |
| 2009/0230235 A1 | 9/2009 | McNulty |
| 2009/0236902 A1 | 9/2009 | Zibkoff |
| 2010/0007145 A1 | 1/2010 | Calley |
| 2010/0109324 A1 | 5/2010 | Ben-David |
| 2010/0140951 A1 | 6/2010 | Pitre |
| 2010/0295317 A1 | 11/2010 | Mahawili |
| 2010/0303623 A1 | 12/2010 | Dawoud |
| 2011/0012363 A1 | 1/2011 | Finnell |
| 2011/0107684 A1 | 5/2011 | Flores |
| 2012/0045327 A1 | 2/2012 | Caldwell |
| 2012/0060684 A1 | 3/2012 | Lavender |
| 2012/0061958 A1 | 3/2012 | Tsutsumi |
| 2012/0076652 A1 | 3/2012 | Ventzke |
| 2012/0096844 A1 | 4/2012 | Caldwell |
| 2012/0117958 A1 | 5/2012 | Caldwell |
| 2012/0133342 A1 | 5/2012 | Murata |
| 2012/0280503 A1 | 11/2012 | Mahawili |
| 2012/0326452 A1 | 12/2012 | Calley |
| 2013/0009612 A1 | 1/2013 | Caldwell |
| 2013/0134708 A1 | 5/2013 | Hamano |
| 2013/0149171 A1 | 6/2013 | Caldwell |
| 2013/0214537 A1 | 8/2013 | Hashimoto |
| 2013/0221676 A1 | 8/2013 | Caldwell |
| 2013/0226458 A1 | 8/2013 | Nakamura |
| 2013/0234436 A1 | 9/2013 | Kii |
| 2013/0287572 A1 | 10/2013 | Ehrnberg |
| 2014/0054893 A1 | 2/2014 | Lindholdt |
| 2014/0070534 A1 | 3/2014 | Hamano |
| 2014/0145441 A1 | 5/2014 | Calley |
| 2014/0234120 A1 | 8/2014 | Aihara |
| 2015/0219068 A1 | 8/2015 | Port |
| 2015/0240783 A1 | 8/2015 | Kii |
| 2015/0244220 A1 | 8/2015 | Yost |
| 2016/0138612 A1 | 5/2016 | Swett |
| 2016/0208772 A1 | 7/2016 | Dermitzakis |
| 2016/0208898 A1 | 7/2016 | Caldwell |
| 2017/0320564 A1 | 11/2017 | Kuzikov |
| 2018/0156197 A1 * | 6/2018 | Spruce ................ F03D 7/0292 |
| 2018/0171979 A1 * | 6/2018 | Spruce ................ F03D 7/0292 |
| 2018/0173215 A1 * | 6/2018 | Spruce ................ F03D 7/048 |
| 2018/0180025 A1 * | 6/2018 | Spruce ................ F03D 17/00 |
| 2018/0180026 A1 * | 6/2018 | Spruce ................ F03D 17/00 |
| 2018/0187649 A1 * | 7/2018 | Spruce ................ F03D 9/257 |
| 2018/0187650 A1 * | 7/2018 | Byreddy ................ F03D 7/028 |
| 2019/0055927 A1 * | 2/2019 | Suzuki ................ F03D 7/06 |
| 2020/0378360 A1 * | 12/2020 | Spruce ................ F03D 17/00 |
| 2022/0016486 A1 | 1/2022 | Bissonnette et al. |
| 2022/0266094 A1 | 8/2022 | Mason et al. |
| 2023/0245751 A1 | 8/2023 | Rosenberg et al. |
| 2024/0117786 A1 | 4/2024 | Finnell |

* cited by examiner

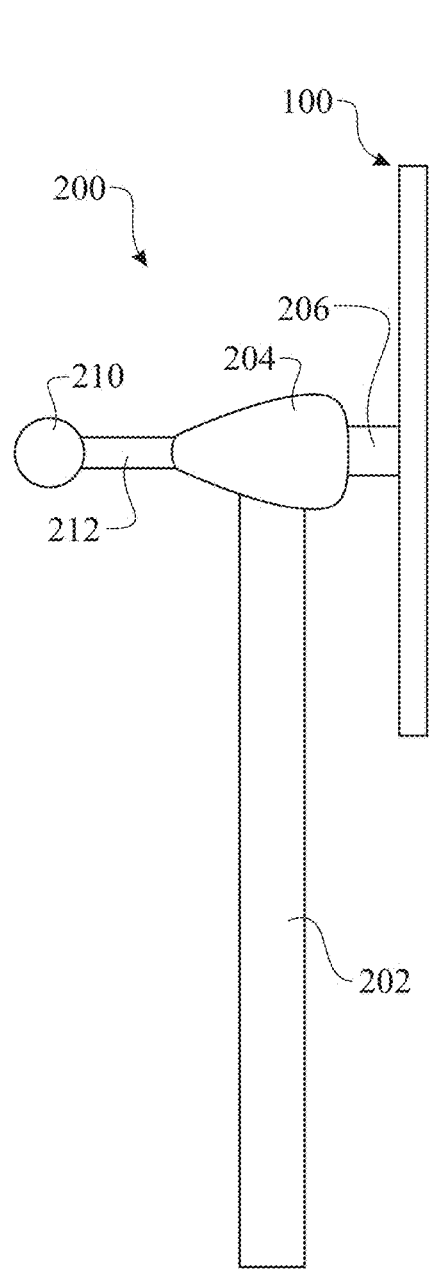
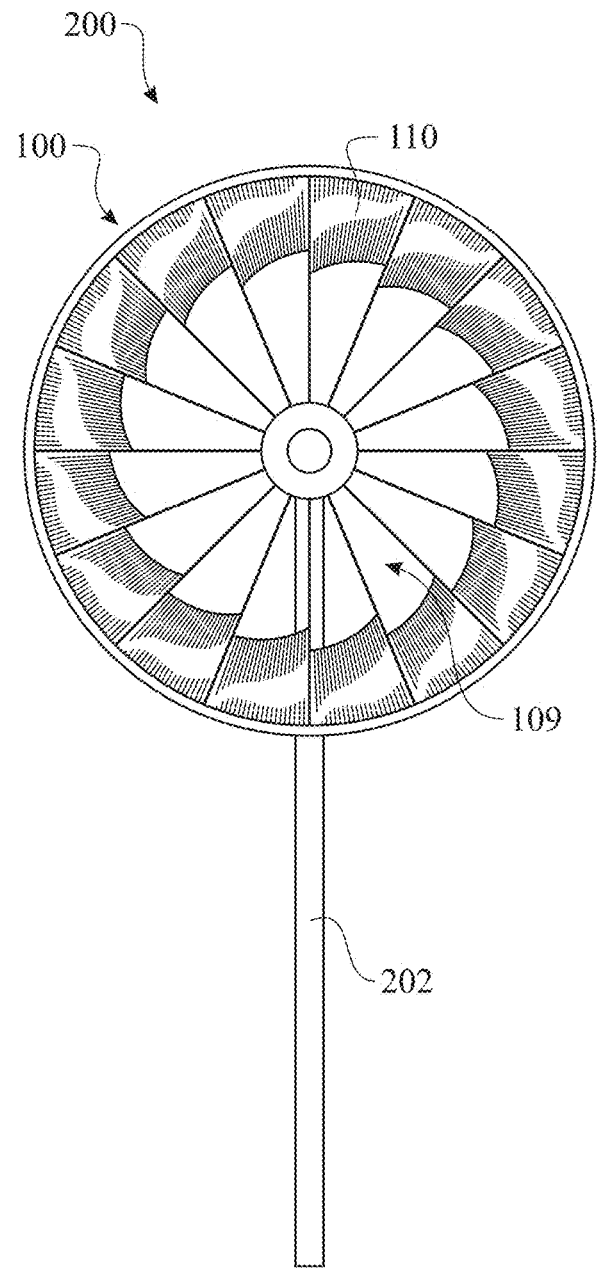
*FIG. 10*  *FIG. 11*

TENSION TURBINE ASSEMBLY AND OPERATIONAL CONTROL SYSTEM

CROSS-REFERENCE TO RELATED APPLICATION

This Non-Provisional Utility Patent Application is:
A) a Continuation-In-Part Utility Patent Application claiming the benefit of co-pending U.S. Non-Provisional Utility patent application Ser. No. 17/334,705, filed on May 29, 2021,
B) wherein U.S. Non-Provisional patent application Ser. No. 17/334,705 is a Continuation-In-Part Utility Patent Application claiming the benefit of co-pending U.S. Non-Provisional Utility patent application Ser. No. 16/595,428, filed on Oct. 7, 2019 (Issued as U.S. Pat. No. 11,021,243 on Jun. 1, 2021),
C) wherein U.S. Non-Provisional patent application Ser. No. 16/595,428 is a Continuation-In-Part Utility Patent Application claiming the benefit of co-pending U.S. Non-Provisional Utility patent application Ser. No. 15/469,542, filed on Mar. 26, 2017 (Issued as U.S. Pat. No. 10,435,145 on Oct. 8, 2019),
D) wherein U.S. Non-Provisional Utility patent application Ser. No. 15/469,542 is a Continuation-In-Part Utility Patent Application claiming the benefit of co-pending U.S. Non-Provisional Utility patent application Ser. No. 14/204,931, filed on Mar. 11, 2014 (Issued as U.S. Pat. No. 10,443,569 on Oct. 15, 2019),
E) wherein U.S. Non-Provisional Utility patent application Ser. No. 14/204,931 is a Continuation-In-Part Utility Patent Application claiming the benefit of co-pending Non-Provisional Utility patent application Ser. No. 12/825,857, filed on Jun. 29, 2010 (Issued as U.S. Pat. No. 8,668,455 on Mar. 11, 2014),
F) wherein U.S. Non-Provisional Utility patent application Ser. No. 12/825,857 is a Continuation-In-Part Utility Application claiming the benefit of co-pending U.S. Non-Provisional patent application Ser. No. 12/496,769, filed on Jul. 2, 2009, (Issued as U.S. Pat. No. 7,775,760 on Aug. 17, 2010),
G) wherein all of which are incorporated herein in their entireties.

FIELD OF THE INVENTION

The present disclosure generally relates to an apparatus and method for converting wind or water flow to electrical energy. More particularly, the present disclosure relates to a turbine wheel having a plurality of blades disposed about an internal edge of a peripheral rim.

BACKGROUND OF THE INVENTION

Windmills and other wind driven turbines generally comprise a series of blades projecting radially from a centrally located hub. This configuration provides several limitations. A first limitation is efficiency. The energy utilized to turn an object is referred to as torque. The torque is calculated at a force times a distance from the center of rotation. The force applied near the center of rotation has a significantly lower impact than a force applied towards the outer edge of the blades, although resistance is created along the entire length of the blade. A second limitation is the potential injury or death to birds. Turbines of common windmills have a plurality of cantilevered blades, which are spatially configured, allowing birds to fly between the swirling turbines. The birds are unable to see the narrow, cantilevered blades when the blade assembly is rotating. This poses a risk whereby one of the blades could collide with the passing bird.

A first known blade discloses a rotor blade, which includes a main blade and an extension nap, which is translationally moveable relative to the main blade. The main blade and transition blade at least form an airfoil lifting surface of the entire blade. The dimension of the airfoil lifting surface is variable by translationally moving the extension flap relative to the main blade.

A second known reference discloses self starting vertical-axis wind turbine, for economically competitive power production by driving large grid-corrected AC generators. The wind turbine includes a variable blade pitch-angle from 0 to 60 degrees, wherein the blades following variable wind velocity for maximum efficiency and to keep constant turbine speed; a variable blade camber to optimize lift-to-drag ratio, controlled by pitch and cyclical variation of incidence-angle; improved airfoil shape of cambered blades; low cost automatic gear-train for two constant turbine speeds; protection against overload and prevention of power surge during wind gusts; low stress three-legged high tower assembled with nacelle and tail structure on ground level. This enables a tower to be built to any height required to harness maximum wind energy.

Yet another known embodiment discloses a wind or water flow energy converter that includes a wind or water flow actuated rotor assembly. The rotor includes a plurality of blades; the blades of are variable in length to provide a variable diameter rotor. The rotor diameter is controlled to fully extend the rotor at low flow velocity and to retract the rotor, as flow velocity increases such that the loads delivered by or exerted upon the rotor do not exceed set limits.

While another known embodiment discloses a rotation shaft which is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

And another known embodiment discloses a multi-axis turbine with an external upper covering, a tower structure with a plurality of vertical elongated members connected to each other with supporting horizontal elongated members, and a plurality of smaller blades on a rotation connected to a tower structure with a plurality of the rotation. One embodiment includes impact impellers connected to a rotation creating a swept area with a height to diameter ratio of greater than four. In one embodiment the impact impellers are connected to a rotation means thereby creating a swept area with a height to diameter ratio of greater than ten.

While another embodiment discloses a power plant which extracts energy from a free flowing fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

Yet another embodiment discloses a design of a wind turbine blade and a wind turbine by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. A method of controlling the wind turbine is also disclosed.

While another embodiment discloses a wind turbine system, which incorporates a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor, which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

And another embodiment discloses a wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the: wind turbine can be operated with a maximum output within the range of evading fatigue failure of the blades and rotor by adjusting the active annular plane area in accordance with wind velocity.

Common windmills comprise a plurality (generally three) of masts or blades extending from a central hub. The design of the blades must be structurally sound to accommodate the applied forces. This requirement dictates a heavier construction to the masts or blades. The heavy construction increases the inertial force, which reduces the rotational speed of the turbine assembly. The mass of material increases the cost of fabrication, transport, and the like to the site. Alternately, exotic materials and structural designs can be used to reduce the weight, while increasing cost and complexity of fabrication.

Wind studies show that as the velocity of the wind doubles, the power of the wind or water is cubed. Thus, if a turbine at 12 MPH wind generates 10 watts of power, at 24 MPH it will produce 1,000 watts of power.

A turbine will increase speed as the velocity of the air or water is sped up. The power of a generator is also increased as the rotational speed is increased. The power of the generator is not necessarily the same power curve of the turbine driving the generator. Therefore, losses can be expected because of the power mismatch between turbine and generator.

The described device monitors the rpm of a generator either directly or indirectly and provides a value, which corresponds to the rpm of the turbine. This in turn, is used to determining the amount of load (power) to be generated.

The angle difference of wing and wind is known as the Angle Of Attack (AOA). Experiments have determined that the optimum AOA is approximately 28° in a "climb angle" for a blade or wing. The closer the AOA can be to the 28°, the more power that can be generated. Two methods can be used to keep this angle of attack (AOA) constant. One is to pivot the blades to make the proper angle. This would keep the RPM of the turbine rather constant. The changing of the blade angle is used on large turbines. The other method to have the AOA stable is to change the rpm of the turbine.

The currently utilized cantilevered blade wind turbines are limited in size. The cantilevered blade design limits the diameter of the turbine blade assembly. As the length of each cantilevered blades increases, the stress and strain of each blade increases exponentially. The diameter of the turbine blade assembly affects the rotational tip speed. The greater the diameter of the turbine blade assembly, the faster the tip speed for the same rotational rate. Alternatively, the greater the diameter of the turbine blade assembly, the slower the rotational speed when maintaining a constant tip speed. What is desired is a turbine blade design that reduces stress and strain upon each blade, while enabling a turbine blade assembling having a larger diameter.

Therefore, a wind driven turbine wheel with improved efficiency and a focus on bird safety is needed. The larger blade surface area provides a visual deterrent for birds, thus eliminating any danger to birds.

Rotational rates of the wind turbine blade assembly can affect the efficiency of the electrical power generating system. What is desired is a system that optimizes the efficiency of the electrical power generating system.

SUMMARY OF THE INVENTION

The present disclosure is generally directed to a wind driven turbine, and more specifically to a turbine blade having a peripheral rim assembled to a central hub via a plurality of spokes. A series of airfoil blades are disposed along an interior edge of the peripheral rim, being rotationally attached to the plurality of spokes. The blades leave an airflow breach between an interior edge of the blade and the central hub.

A wing provides lift in order to make heavier than air vehicles possible. The other use for a wing is to provide the ability to propel a vehicle such as an airplane. The wing, in a lifting or propulsion application is commonly referred to as a propeller or turbine.

The following are some characteristics of wings:
1. A larger wing will provide more lift than a small wing.
2. A wing that has high velocity up to close to the speed of sound will provide more lift than wings moving slower.
3. A wing that has the proper shape will provide more lift than others with different shapes.
4. A lighter wing will have less mass, and thus will be able to provide more lift than a heavier wing due to the limitations of the vehicle weight and the mass of the propeller.

Thus, to provide a superior lifting wing or propeller, all the above items must be considered to provide the maximum ability to provide lift. Wings attached to an airplane travel at the same speed as the airplane. Wings, when employed as propellers, have many different speeds, depending on where the point of reference is made away from the hub or axis of rotation.

On any circle, thirty percent (30%) of a circle on the outer portion of the circle will have fifty percent (50%) of the volume of the circle. On a propeller, the outer thirty percent (30%) has the fastest moving part of the propeller. Thus, by combining the area and the velocity of the propeller, the outer thirty percent (30%) of the circle will provide most of the possible lift made. If the outer fifty percent (50%) of the propeller blade can be made larger than most propellers, additional lift provided can be substantial.

The problem is that as a lever is made longer, the shear forces become too large for the propeller to bear.

The tension wing provides answers to all of the above as follows:
1. Multiple winglets are placed only on the outer portion of the wing.
2. The outer portion of the circle provides the velocity to provide the maximum lift.
3. No change is necessary on optimum shape of the winglets, so existing wing shape technology can be used.
4. A bicycle wheel is the lightest, strongest, most efficient rotating device known. The Tension Wing uses this embodiment of proven engineering to make a more efficient, lighter, more powerful rotating wing or propeller.

The tension wing allows more power to be input to the wing, and allows more lift to be provided.

In some embodiments, the wind turbine apparatus may include:
a peripheral rim having a rim radius defined from a rim center to an interior edge of the rim;
a central hub having a hub radius defined from a hub center to an exterior edge of the hub;
a radial span dimension being defined as rim radius minus the hub radius;
a plurality of spokes assembling the central hub to a rotationally centralized position within the peripheral rim; and
a series of blades having a radial length being significantly less than the radial span dimension;
wherein the each of the blades is assembled to the wind turbine apparatus positioning the blades within the peripheral ring and proximate the interior edge of the rim, leaving an airflow gap between an interior edge of the blades and the exterior edge of the hub.

In a second aspect, a leading edge of the blade is rotationally assembled to a spoke.

In another aspect, a trailing edge is assembled to the spoke via an adjusting mechanism.

In yet another aspect, the adjusting mechanism is operationally controlled via a feature within the respective spoke.

In yet another aspect, the adjusting mechanism is operationally controlled via a feature within the respective spoke by rotating the spoke or a member within the spoke.

In yet another aspect the plurality of spokes is configured having two adjacent spokes overlapping.

In yet further aspect, the adjusting mechanism is operationally controlled via a tension member, which is provided through a hollow portion of the spoke and controlled via a winding mechanism located proximate or within the central hub.

In yet another aspect, the trailing edge is assembled to a spoke via a breakaway mechanism.

In yet another aspect, the breakaway mechanism further comprises a means for automatically restoring the trailing edge to an operable configuration.

In yet aspect, breakaway mechanism is integrated with the adjusting mechanism.

In yet another aspect, the turbine wheel engages with an electrical power generator, with the assembly being positioned upon a vertical riser support.

In yet another aspect, the deployed turbine wheel can include a counterbalance assembly.

In yet another aspect, the deployed assembly can additionally include a rotational means, rotating about a vertical axis to reduce the frontal area respective to the airflow.

In yet another aspect, the turbine wheel comprises a plurality of masts extending radially from an axle, each mast comprising a blade. The masts are supported via a planar tension cable spanning between distal ends of adjacent masts and a radial tension cable spanning between the distal end of each mast and each of the two ends of the axle.

In yet another aspect, the blades can be replaceable with one's having different shapes, sizes, surface areas, and aerodynamic characteristics.

In a second embodiment, the wind turbine apparatus may include:
a vertical riser support extending upward from a supporting surface;
a turbine housing carried by the vertical riser support;
a wind driven turbine blade subassembly in operational communication with a turbine shaft;
a hydraulic pump carried by the turbine housing and in operational communication with the turbine shaft;
a hydraulic motor comprising a hydraulic motor drive shaft, wherein the hydraulic motor is distally located from the turbine housing and in hydraulic communication with the hydraulic pump through hydraulic lines; and
an electrical power generator comprising a generator drive shaft in rotational communication with the hydraulic motor drive shaft,
wherein rotation of the wind driven turbine blade subassembly rotationally drives the hydraulic pump,
wherein the hydraulic pump flows hydraulic fluid through the hydraulic lines to the hydraulic motor,
wherein the hydraulic fluid flowing through the hydraulic lines drives rotation of the hydraulic motor;
wherein the hydraulic motor drives rotation of the electric power generator, which outputs electric power.

In yet another aspect, the electrical output of the electric power generator is governed by an electric power output controller module.

In yet another aspect, the electric power output controller module varies a resistance of a current flow.

In yet another aspect, the electric power output controller module varies a resistance of a current flow, optimizing power generation efficiency and power output.

In yet another aspect, the electric power output controller module identifies a rotational speed of the hydraulic motor drive shaft and varies a resistance of a current flow based upon a predetermined rotational speed of the hydraulic motor drive shaft.

In yet another aspect, the electric power output controller module identifies a rotational speed of the generator drive shaft and varies a resistance of a current flow based upon a predetermined rotational speed of the generator drive shaft.

In another arrangement, the wind operated electrical power generating system may include:
- a wind turbine comprising a turbine blade assembly attached to a turbine blade subassembly shaft, the turbine blade subassembly shaft being rotationally carried by a turbine housing, the turbine housing being supported by a vertical riser support structure;
- a generator in one of direct and indirect operational communication with the turbine blade subassembly shaft, wherein rotation of the turbine blade subassembly shaft provides power to rotate an input shaft of the generator;
- a rotational speed sensor arranged to sense a rotational speed of one of the turbine blade subassembly shaft and the generator shaft;
- an electrical controller circuit in signal communication with the rotational speed sensor, wherein the electrical controller circuit identifies when a rotational speed determined by a signal from the rotational speed sensor is proximate a predetermined speed; and
- a potentiometer (variable resistor), wherein the electric potentiometer (variable resistor) increases a load upon the generator.

In yet another aspect, the system further comprises a power control module, wherein the power control module contains the electrical controller circuit and the potentiometer (variable resistor), wherein the potentiometer (variable resistor) is a manually adjusted potentiometer (variable resistor).

In yet another aspect, the electrical controller circuit further comprising at least one speed indicator, wherein each of the at least one speed indicator alerts a user when the electrical controller circuit identifies when a rotational speed determined by a signal from the rotational speed sensor is proximate a predetermined speed associated with each of the at least one speed indicator.

In yet another aspect, the electrical controller circuit further comprises a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators.

In yet another aspect, the electrical controller circuit further comprises:
- a power control module, wherein the power control module contains:
- the electrical controller circuit, which further includes a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators; and
- a plurality of the potentiometers (variable resistors), wherein each of the plurality of potentiometers (variable resistors) is associated with a respective speed indicator of the plurality of speed indicators.

In yet another aspect, the electrical controller circuit further comprises a transformer integrated in electric communication between the potentiometer (variable resistor) and a grid tie. In yet another aspect, the system can include a rotational speed control module.

In yet another aspect, the rotational speed control module can include a computing device.

In yet another aspect, the rotational speed control module can include a computing device, the computing device comprising a microprocessor, digital memory in signal communication with the microprocessor, and a digital data storage device in signal communication with the microprocessor.

In yet another aspect, the rotational speed control module can include a computing device, the computing device further comprising a user interface in signal communication with the microprocessor.

In yet another aspect, the user interface of the rotational speed control module can include a keyboard.

In yet another aspect, the user interface of the rotational speed control module can include a keyboard, wherein the keyboard is at least one of a wired keyboard, a wireless keyboard, a virtual keyboard, a laser operated keyboard, a programmed keyboard integral with a touch screen display, or any other suitable keyboard.

In yet another aspect, the user interface of the rotational speed control module can include a pointer device.

In yet another aspect, the user interface of the rotational speed control module can include a pointer device, wherein the pointer device is one of a mouse, a trackball, a tablet device, a track pad, and the like.

In yet another aspect, the user interface of the rotational speed control module can include a monitor.

In yet another aspect, the user interface of the rotational speed control module can include a monitor, wherein the monitor is a flat panel display, a projection display, a touch screen display, or any other suitable display monitor.

In yet another aspect, the rotational speed control module can include a computing device, the computing device further comprising a communication and/or network circuit in signal communication with the microprocessor.

In yet another aspect, the communication and/or network circuit of the rotational speed control module can employ at least one of: a wired communication link and a wireless communication link.

In yet another aspect, the communication and/or network circuit of the rotational speed control module can include a computing device, can employ at least one of: Transmission Control Protocol (TCP), hyper text transfer protocol (HTTP), User Datagram Protocol (UDP) Internet Relay Chat (IRC), Simple Network Management Protocol (SNMP), Internet Control Message Protocol (ICMP) and any other suitable network protocol.

In yet another aspect, the communication and/or network circuit of the rotational speed control module can include a computing device, can employ Ethernet protocol, Wi-Fi protocol, Bluetooth protocol, a serial communication protocol (such as USB-A, USB-B, USB-C and the like), a parallel communication protocol, or any other communication protocol.

In yet another aspect, a sensor system is installed in an arrangement to acquire at least one of a wind velocity, a wind direction, a rotational speed (RPM) of the turbine blade assembly, a direction of the turbine blade assembly, and a power output.

In yet another aspect, a sensor system can additionally be arranged to acquire an operating temperature of the alternator/generator and/or an ambient air temperature.

In yet another aspect, a sensor system can additionally be arranged to acquire a relative humidity.

In yet another aspect, the sensor system includes a communication and/or network circuit.

In yet another aspect, the communication and/or network circuit of the sensor system employs a protocol that is compatible with the protocol of the rotational speed control module enabling communication between the sensor system and the rotational speed control module.

In a system for generating electrical power, the method comprising steps of:
- rotating a turbine blade assembly of a wind turbine, wherein the rotation of the turbine blade assembly is driven by one of wind or water;
- generating electrical power by rotating an electrical power generating machine, wherein the rotation of the electrical power generating machine is driven by a rotation of the turbine blade assembly;
- determining a rotational rate of the turbine blade assembly that would encounter stall based upon a wind velocity subjected to the turbine blade assembly, wherein stall is a minimum rotational rate to maintain lift when subjected to the current wind velocity;
- calculating a load rate that would maintain the rotational rate of the turbine blade assembly slightly faster than a rotational rate that would cause the turbine blade assembly to stall at one of the currently known wind velocity or an anticipated wind velocity, where the rotational rate slightly faster than the rotational rate that would cause the turbine blade assembly to stall accommodates a predetermined fluctuation in the wind velocity used to determine the stall;
- changing a state of at least one relay to apply a load to an electrical power circuit, wherein the electrical power circuit is in electrical communication with the electrical power generating machine, wherein the applied load creates a resistance to the electrical power generating machine, thus reducing the rotational rate of the turbine blade assembly.

In a second aspect, the process of calculating the load rate that would maintain the rotational rate of the turbine blade assembly slightly faster than the rotational rate that would cause the turbine blade assembly to stall would be accomplished using historical data.

In another aspect, the process of calculating the load rate that would maintain the rotational rate of the turbine blade assembly slightly faster than the rotational rate that would cause the turbine blade assembly to stall would be accomplished using engineering calculations.

In yet another aspect, the process of calculating the load rate that would maintain the rotational rate of the turbine blade assembly slightly faster than the rotational rate that would cause the turbine blade assembly to stall would be accomplished using artificial intelligence.

In yet another aspect, the process of calculating the load rate that would maintain the rotational rate of the turbine blade assembly slightly faster than the rotational rate that would cause the turbine blade assembly to stall would be accomplished using a combination of at least two of historical data, engineering calculations, and artificial intelligence.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a predetermined percent fluctuation in the wind velocity used to determine the stall.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 1% fluctuation in the wind velocity used to determine the stall.

In another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 2% fluctuation in the wind velocity used to determine the stall.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 2.5% fluctuation in the wind velocity used to determine the stall.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 5% fluctuation in the wind velocity used to determine the stall.

In another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 7.5% fluctuation in the wind velocity used to determine the stall.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a minimum of a 10% fluctuation in the wind velocity used to determine the stall.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time, wherein the period of time is a predetermined multiple the period of time between load calculations.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time, wherein the period of time is one (1) times a period of time between load calculations.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time, wherein the period of time is two (2) times the period of time between load calculations.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time, wherein the period of time is three (3) times the period of time between load calculations.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates a fluctuation in the wind velocity over a predetermined period of time, wherein the period of time is five (5) times the period of time between load calculations.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates one standard deviation of the fluctuation in the wind velocity. The calculations to determine the optimal applied electrical load would include an average of the wind velocity over a period of time.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates one standard deviation of the fluctuation in the wind velocity. The calculations to determine the optimal applied electrical load would include one standard deviation of the fluctuation in the wind velocity.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates one standard deviation of the fluctuation in the wind velocity. The calculations to determine the optimal applied electrical load would include two standard deviations of the fluctuation in the wind velocity.

In yet another aspect, the rotational rate of the turbine blade assembly is slightly faster than a rotational rate that would cause the turbine blade assembly to stall at one of the currently known wind velocity or an anticipated wind velocity is where the rotational rate accommodates any predetermined number of standard deviations of the fluctuation in the wind velocity. The calculations to determine the optimal applied electrical load would include any predetermined number of standard deviations of the fluctuation in the wind velocity.

In yet another aspect, the time between load calculations can be increased when the wind velocity is determined to be relatively stable.

In yet another aspect, the time between load calculations can be increased when the wind velocity is determined to remain within a predetermined percentage of fluctuation over the current time between load calculations.

In yet another aspect, the time between load calculations can be increased when the wind velocity is determined to have a velocity fluctuation that is equal to or less than 1% over the current time between load calculations.

In yet another aspect, the time between load calculations can be increased when the wind velocity is determined to have a velocity fluctuation that is equal to or less than 2% over the current time between load calculations.

In yet another aspect, the time between load calculations can be increased when the wind velocity is determined to have a velocity fluctuation that is equal to or less than 2.5% over the current time between load calculations.

In yet another aspect, the time between load calculations can be increased when the wind velocity is determined to have a velocity fluctuation that is equal to or less than 5% over the current time between load calculations.

In yet another aspect, the time between load calculations would be decreased when the wind velocity is determined to be relatively unstable.

In yet another aspect, the time between load calculations would be decreased when the wind velocity is determined to fluctuate beyond a predetermined percentage of fluctuation over the current time between load calculations.

In yet another aspect, the time between load calculations would be decreased when the wind velocity is determined to have a velocity fluctuation that is equal to or greater than 1% over the current time between load calculations.

In yet another aspect, the time between load calculations would be decreased when the wind velocity is determined to have a velocity fluctuation that is equal to or greater than 2% over the current time between load calculations.

In yet another aspect, the time between load calculations would be decreased when the wind velocity is determined to have a velocity fluctuation that is equal to or greater than 2.5% over the current time between load calculations.

In yet another aspect, the time between load calculations would be decreased when the wind velocity is determined to have a velocity fluctuation that is equal to or greater than 5% over the current time between load calculations.

In yet another aspect, the system can utilize a transmission, where the system can change a gear ratio between the turbine blade assembly and the electrical power generating machine, thus changing the loading and rotational speed of the turbine blade assembly.

In a system for generating electrical power, the method comprising steps of:
  rotating a turbine blade assembly of a wind turbine, wherein the rotation of the turbine blade assembly is driven by a wind velocity;
  generating electrical power by rotating an electrical power generator, wherein the rotation of the electrical power generating machine is driven by a rotation of the turbine blade assembly as a result of subjection to wind having the wind velocity;
  determining a rotational rate of the turbine blade assembly that would encounter stall using the wind velocity subjected to the turbine blade assembly, wherein stall is a minimum rotational rate to maintain lift when subjected to the current wind velocity;
  calculating an optimal value of an electrical load that would maintain the rotational rate of the turbine blade assembly slightly faster than a rotational rate that would cause the turbine blade assembly to stall at one of the currently known wind velocity or an anticipated wind velocity, where the rotational rate slightly faster than the rotational rate that would cause the turbine blade assembly to stall accommodates a predetermined fluctuation in the wind velocity used to determine the stall, wherein the value of an electrical load is calculated using a microprocessor, the calculations include a function of the wind velocity and the wing tip speed of turbine blades of the turbine blade assembly;

changing a value of the electrical load applied to an electrical power circuit to the calculated optimal value, wherein the electrical power circuit applies the electrical load to the electrical power generator, wherein the applied load creates an electrical resistance to the electrical power generator, thus reducing the rotational rate of the turbine blade assembly.

In yet another aspect, stall is a function of the wind and wing tip speeds of the turbine blades is as follows:

TSR=Tip Speed/Wind Speed

Wherein:

TSR=Tip Speed Ratio

Tip Speed is the speed at the outer edge of a wind turbine blade, calculated by multiplying the rotational speed of the rotor by the blade radius. More specifically, the tip speed calculation equals $(2*pi*R*N)/60$, where R is the rotor radius and N is the rotational speed in Revolutions Per Minute (RPM).

Wind Speed is the speed of the wind approaching the turbine.

A low tip speed ratio (TSR) in a wind turbine can lead to blade stalling, where the airflow separates from the blade's surface, reducing lift and power output.

In an enhanced version of the system for generating electrical power, the method comprising steps of:

rotating a turbine blade assembly of a wind turbine, wherein the rotation of the turbine blade assembly is driven by a wind velocity;

generating electrical power by rotating an electrical power generator, wherein the rotation of the electrical power generating machine is driven by a rotation of the turbine blade assembly as a result of subjection to wind having the wind velocity;

measuring the wind velocity;

determining a wing tip speed;

determining a rotational rate of the turbine blade assembly that would encounter stall using the wind velocity subjected to the turbine blade assembly, wherein stall is a minimum rotational rate to maintain lift when subjected to the current wind velocity;

using Artificial Intelligence (AI) to determine an optimal value of an electrical load that would maintain the rotational rate of the turbine blade assembly slightly faster than a rotational rate that would cause the turbine blade assembly to stall at one of the currently known wind velocity or an anticipated wind velocity, where the rotational rate slightly faster than the rotational rate that would cause the turbine blade assembly to stall accommodates a predetermined fluctuation in the wind velocity used to determine the stall, wherein the value of an electrical load is determined using the Artificial Intelligence (AI) operating on at least one microprocessor, the determination include considerations of the wind velocity and the wing tip speed of turbine blades of the turbine blade assembly;

changing a value of the electrical load applied to an electrical power circuit to the calculated optimal value, wherein the electrical power circuit applies the electrical load to the electrical power generator, wherein the applied load creates an electrical resistance to the electrical power generator, thus reducing the rotational rate of the turbine blade assembly, wherein the Artificial Intelligence (AI) learns optimization of the electrical load based upon history and affect of wind velocity and wing tip speed of the turbine blade causing stall.

In another aspect, the value of the electrical load is changed by at least one of:

(a) changing a state of at least one relay, and (b) changing a value of a variable resistor.

In yet another aspect, the value of the electrical load is changed using an automated process, wherein the automated process is controlled by the microprocessor.

In yet another aspect, the step of calculating the optimal value of the electrical load that would maintain the rotational rate of the turbine blade assembly slightly faster than the rotational rate that would cause the turbine blade assembly to stall at one of the currently known wind velocity or the anticipated wind velocity is calculated by comparing a ratio between the wind velocity and the wing tip speed to a predetermined value.

In yet another aspect, the step of calculating the optimal value of the electrical load that would maintain the rotational rate of the turbine blade assembly slightly faster than the rotational rate that would cause the turbine blade assembly to stall at one of the currently known wind velocity or the anticipated wind velocity is accomplished using artificial intelligence.

In yet another aspect, the step of calculating the optimal value of the electrical load that would maintain the rotational rate of the turbine blade assembly slightly faster than the rotational rate that would cause the turbine blade assembly to stall at one of the currently known wind velocity or the anticipated wind velocity is accomplished using artificial intelligence, wherein the artificial intelligence learns from a history of data points, the data points including wind velocity, wing tip speed of the turbine blades, and status of stall of the turbine blades.

In yet another aspect, the angle of attack of the turbine blades are arranged to be within a range of between 20 and 28 degrees.

In yet another aspect, the angle of attack of the turbine blades are arranged to be at slightly less than 28 degrees.

In yet another aspect, the step of calculating the optimal value of the electrical load that would maintain the rotational rate of the turbine blade assembly slightly faster than the rotational rate that would cause the turbine blade assembly to stall at one of the currently known wind velocity or the anticipated wind velocity utilizes an average of the wind velocity over a period of time as the wind velocity in the calculations.

In yet another aspect, the turbine blade subassembly further comprising:

an outer rim;

a central hub assembly;

a plurality of spokes assembling the central hub at a rotationally centralized position within the outer rim; and a series of airfoils, each airfoil having an aerodynamically lifting shape extending between a leading edge and a trailing edge, wherein a first end of each spoke is assembled to the central hub assembly and a second end of each spoke is assembled to the outer rim, a first spoke of the plurality of spokes being assembled to the central hub assembly in an arrangement extending in an acute angular direction from a radial orientation in a first direction and a second spoke of the plurality of spokes being assembled to the central hub assembly in an arrangement extending in an acute angular direction from a radial orientation in a second, opposite direction, wherein one spoke of the plurality of spokes attached to the central hub assembly crosses at least one another spoke of the plurality of spokes attached to the central hub assembly, wherein the each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

In an alternate application, the turbine wheel assembly can be modified and employed to provide lift, the tension lifting wing wheel assembly comprising:

a peripheral rim having a rim radius defined from a rim center to an interior edge of the rim;

a central hub having a hub radius defined from a hub center to an exterior edge of the hub;

a radial span dimension being defined as rim radius minus the hub radius;

a plurality of spokes assembling the central hub to a rotationally centralized position within the peripheral rim; and a series of wings, each wing having an aerodynamically lifting shape extending between a leading edge and a trailing edge, wherein the each wing of the series of wings is assembled to the tension lifting wing wheel assembly by coupling an area of the wing proximate the leading edge to a leading edge spoke and an area of the wing proximate the trailing edge to a trailing edge spoke, wherein the wings are arranged having a gap provided between the wing trailing edge of each forward located wing and the wing leading edge of each trailing located wing.

In a second aspect, the leading edge spoke and the trailing edge spoke are substantially parallel to one another.

In another aspect, wing is twisted along a transverse axis, wherein the transverse axis extends between a distal or outer edge of the wing and a proximal or hub edge of the wing.

In yet another aspect, each spoke can cross other spokes defining three crossover locations.

In yet another aspect, the spokes can be formed having at least one of: a circular cross section shape, an aerodynamic cross section shape, or any other suitable cross section shape.

In yet another aspect, the spokes can be arranged alternating between extending from an outer surface of each hub flange and from an inner surface of the same hub flange.

In yet another aspect, a first end of each spoke is assembled to a respective central hub flange and a second end of each spoke is assembled to the outer rim. A first spoke of the plurality of spokes is assembled to the respective central hub flange in an arrangement extending in an acute angular direction from a radial orientation in a first direction from a first side of the respective central hub flange and a second spoke of the plurality of spokes is assembled to the respective central hub flange in an arrangement extending in an acute angular direction from a radial orientation in a second direction from a second side of the respective central hub flange. One spoke of the plurality of spokes attached to the respective central hub flange crosses at least one other spoke of the plurality of spokes attached to the same respective central hub flange. Each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

In yet another aspect, one spoke of the plurality of spokes attached to the respective central hub flange can cross at least two another spokes of the plurality of spokes attached to the same respective central hub flange.

In yet another aspect, each leading edge spoke and each respective trailing edge spoke can be substantially parallel with one another.

In yet another aspect, the tension lifting wing wheel assembly can include a total of 36 spokes, 18 spokes per hub flange.

In yet another aspect, each spoke would preferably be assembled to the tension lifting wing wheel assembly having substantially equal tension.

In yet another aspect, the tension lifting wing wheel assembly (or tension turbine assembly) can include any number of spokes in multiples of four (4).

In yet another aspect, the tension lifting wing wheel assembly (or tension turbine assembly) can include thirty-six (36) spokes, wherein thirty-six (36) spokes is considered an optimal number of spokes.

In yet another aspect, tension can be applied to and retained within each spoke by a tension application system.

In yet another aspect, any suitable tensioning system or combination of tensioning systems can be employed.

In yet another aspect, one tension application system employs a spoke distal assembly tensioning nipple securing a threaded distal or rim end of the spoke to the rim.

In yet another aspect, a second tension application system employs a spoke proximal or hub assembly tensioning nipple securing a threaded proximal or hub end of the spoke to the hub. In one implementation, the proximal end of the spoke would be inserted through a hole or bore formed through a bracket or other axially extending feature. A threaded tensioning element would be threadably secured to the threaded proximal end of the spoke. The threaded tensioning element would be adjusted to increase or decrease the tension of the respective spoke.

In yet another aspect, a third tension application system employs a threaded coupling element securing a first centrally threaded section of a first segment of the spoke to a second centrally threaded section of a second segment of the spoke. The threaded segments would include threading in opposite directions. More specifically, the first centrally threaded section would including threading formed in a first rotational direction and the second centrally threaded section would including threading formed in a second, opposite rotational direction. The threaded coupling element would be formed having mating threading to each of the first centrally threaded section and the second centrally threaded section.

In another aspect, the spoke hub attachment holes can be even spaced about the hub flange. Alternatively, the spoke hub attachment holes can be arranged in pairs, wherein the pairs are arranged having a first spacing and each adjacent pair is arranged having a second spacing about the hub flange, wherein the first spacing and the second spacing differ from one another.

In another aspect, the series of spoke hub attachment holes of the tension lifting wing first central hub flange and the series of spoke hub attachment holes of the tension lifting wing second central hub flange are offset from one another.

In another aspect, the thickness or axial height of the tension lifting wing outer rim is determined by maximizing the desired strength of the tension lifting wing outer rim, while providing sufficient area to support a connection of each spoke.

In another aspect, the attachment locations of each spoke along an interior surface of the tension lifting wing outer rim are linear with one another. Alternatively, the attachment locations of each spoke along an interior surface of the tension lifting wing outer rim are located in an alternating configuration.

In another aspect, the tension lifting wing central hub assembly is preferably substantially centered axially respective to the tension lifting wing outer rim. Alternatively, the tension lifting wing central hub assembly can be offset axially respective to the tension lifting wing outer rim.

In another aspect, the angle of attack can be established by the arrangement of the, the height or span of the tension lifting wing central hub assembly, or the like, or any combination thereof.

In yet another aspect, the tension lifting wing wheel assembly can be rotationally driven by a rotational drive machine, such as a motor, an engine, a turbine, and the like.

In yet another aspect, the rotationally driven tension lifting wing wheel assembly can be integrated into a vehicle to provide at least one of lift and propulsion.

In yet another aspect, the rotationally driven tension lifting wing wheel assembly can be integrated into a vehicle in a substantially vertical orientation to provide propulsion to the vehicle.

In yet another aspect, the rotationally driven tension lifting wing wheel assembly can be integrated into a vehicle in a substantially horizontal orientation to provide lift to the vehicle.

In another application, a heavy-lift helicopter comprising:
a heavy-lift helicopter body;
at least one rotational drive machine carried by said heavy-lift helicopter body;
a tension lifting wing wheel assembly including:
  a peripheral rim having a rim radius defined from a rim center to an interior edge of the rim;
  a central hub having a hub radius defined from a hub center to an exterior edge of the hub;
  a radial span dimension being defined as rim radius minus the hub radius;
  a plurality of spokes assembling the central hub to a rotationally centralized position within the peripheral rim; and
  a series of wings, each wing having an aerodynamically lifting shape extending between a leading edge and a trailing edge,
  wherein the each wing of the series of wings is assembled to the tension lifting wing wheel assembly by coupling an area of the wing proximate the leading edge to a leading edge spoke and an area of the wing proximate the trailing edge to a trailing edge spoke,
  wherein the wings are arranged having a gap provided between the wing trailing edge of each forward located wing and the wing leading edge of each trailing located wing,
wherein each of the at least one tension lifting wing wheel assembly is assembled to a respective at least one rotational drive machine.

In a second aspect, the heavy-lift helicopter is a tandem rotor heavy-lift helicopter, comprising a pair of rotational drive machines supported by the body, each rotational drive machine having a respective tension lifting wing wheel assembly attached thereto.

In another aspect, the heavy-lift helicopter includes at least one of one horizontally oriented tension lifting wing wheel assembly and one vertically oriented tension lifting wing wheel assembly.

An optional feature of the tension wheel assembly is a spoke breakaway feature. The spoke breakaway feature is preferably integrated at a location along the spoke proximate the rim.

In a second aspect, the spoke can include one or more spoke breakaway features.

In another aspect, the spoke breakaway feature retains the spoke in an assembled configuration when the spoke is subjected to a tensile force (tension).

In yet another aspect, the spoke breakaway feature releases or decouples the spoke from the assembly when the tension is removed from the spoke.

In yet another aspect, the spoke breakaway feature includes a nipple flange or spoke flange formed or provided at a breakaway end of the spoke.

In yet another aspect, the spoke breakaway feature includes a tension generating feature.

In yet another aspect, the tension generating feature is provided in a form of a nipple assembly.

In yet another aspect, the spoke breakaway feature includes a nipple assembly comprising a nipple body and a nipple flange.

In yet another aspect, the nipple body includes a threaded section (male or female threading).

In yet another aspect, the nipple body includes a threaded section (male or female threading), wherein the threading of the threaded section is sized to mate with a mating threading (female or male threading) formed on the associated end of the spoke.

In yet another aspect, the nipple body includes a threaded interior bore.

In yet another aspect, the nipple body includes a threaded interior bore, wherein the threading of the threaded interior bore is sized to mate with a mating threading formed on the associated end of the spoke.

In yet another aspect, the spoke breakaway feature includes a stud assembly comprising a stud trunk and a stud flange.

In yet another aspect, the stud trunk is mechanically coupled to the rim.

In yet another aspect, the stud trunk is mechanically affixed to the rim.

In yet another aspect, the stud trunk is mechanically coupled to the hub.

In yet another aspect, the stud trunk is mechanically affixed to the hub.

In yet another aspect, the stud trunk is mechanically coupled to at least one of the rim and the hub.

In yet another aspect, the stud trunk is mechanically affixed to at least one of the rim and the hub.

In yet another aspect, the spoke breakaway feature includes a coupling element that bridges a nipple flange and a stud flange into a single assembly while tension is applied to the spoke.

In yet another aspect, the coupling element comprises at least two separate elements.

In yet another aspect, the coupling element comprises at least two separate elements hingeably assembled with one another.

In yet another aspect, the spoke breakaway feature includes an embossed surface mating with a debossed surface to retain mechanical communication between the coupling element and the nipple flange.

In yet another aspect, the spoke breakaway feature includes an embossed surface mating with a debossed surface to retain mechanical communication between the coupling element and the stud flange.

In yet another aspect, each surface of the coupling assembly applying a compression force is formed having an embossed surface.

In yet another aspect, each surface of the coupling assembly receiving the compression force is formed having a debossed surface.

In yet another aspect, the embossed surface is convex.

In yet another aspect, the debossed surface is concave.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 10 presents an elevation side view of a turbine wheel integrated into a wind power harnessing structure;

FIG. 11 presents an elevation front view of the wind power harnessing structure of FIG. 10;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

Figure 1:
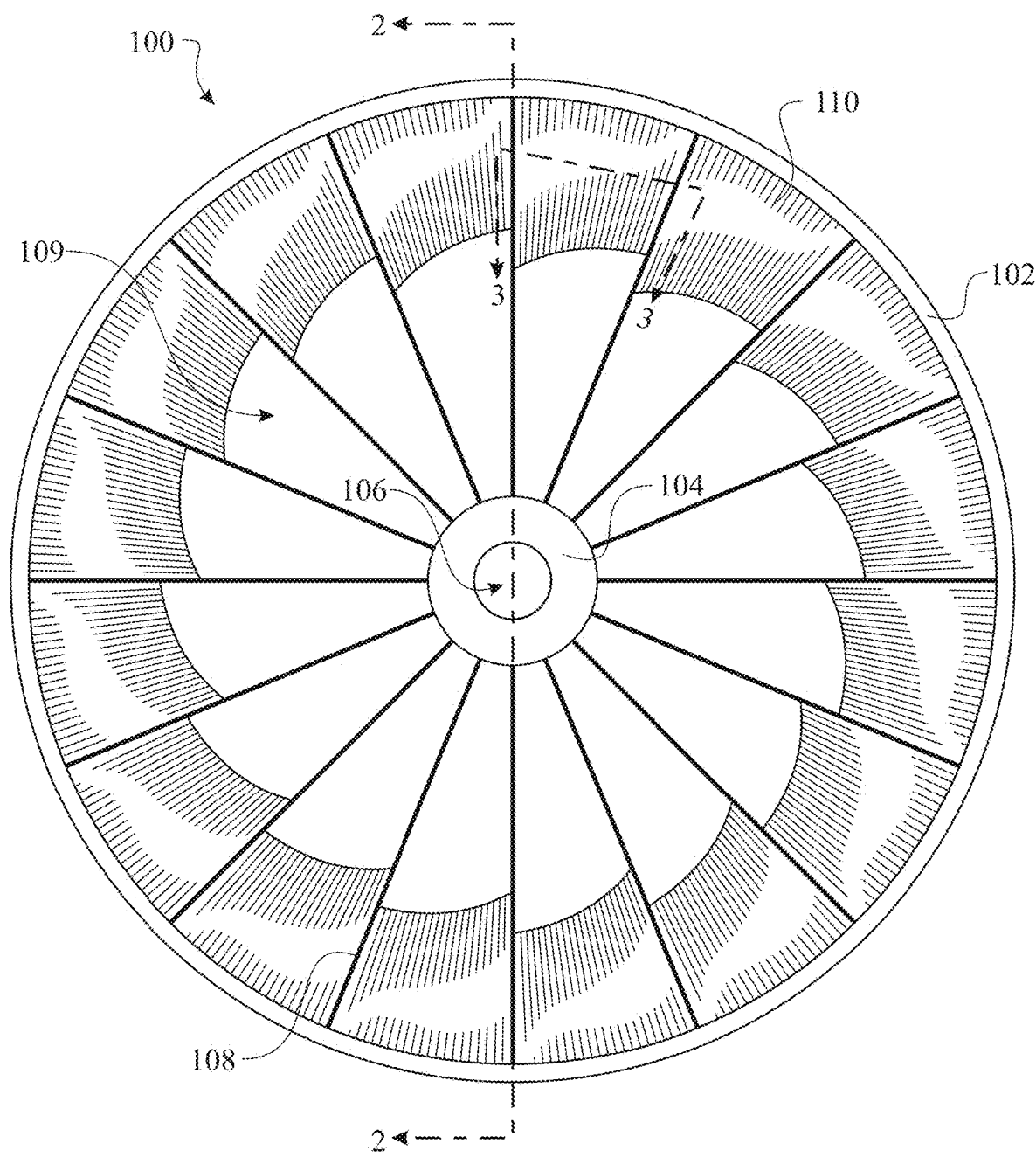
FIG. 1 presents a front view of an exemplary embodiment of a turbine wheel illustrating the general components of the present invention.

For purposes of description herein, the terms "upper", "lower", "left", "rear", "right", "front", "vertical", "horizontal", and derivatives thereof shall relate to the invention as oriented in FIG. 1, where applicable. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally directed to a turbine wheel 100 and the integration of the turbine wheel 100 onto a turbine deployment assembly 200. The turbine wheel 100 and the respective application are detailed hereinafter.

Figure 2:
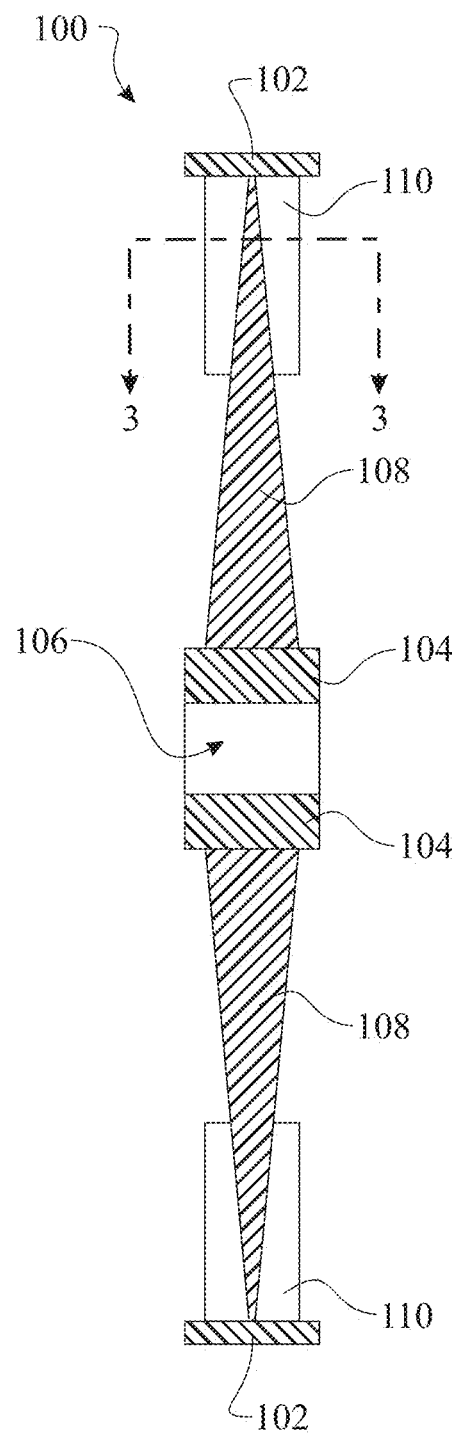
FIG. 2 presents a sectional side view of the turbine wheel taken along section line 2-2 of FIG. 1.
Figure 3:
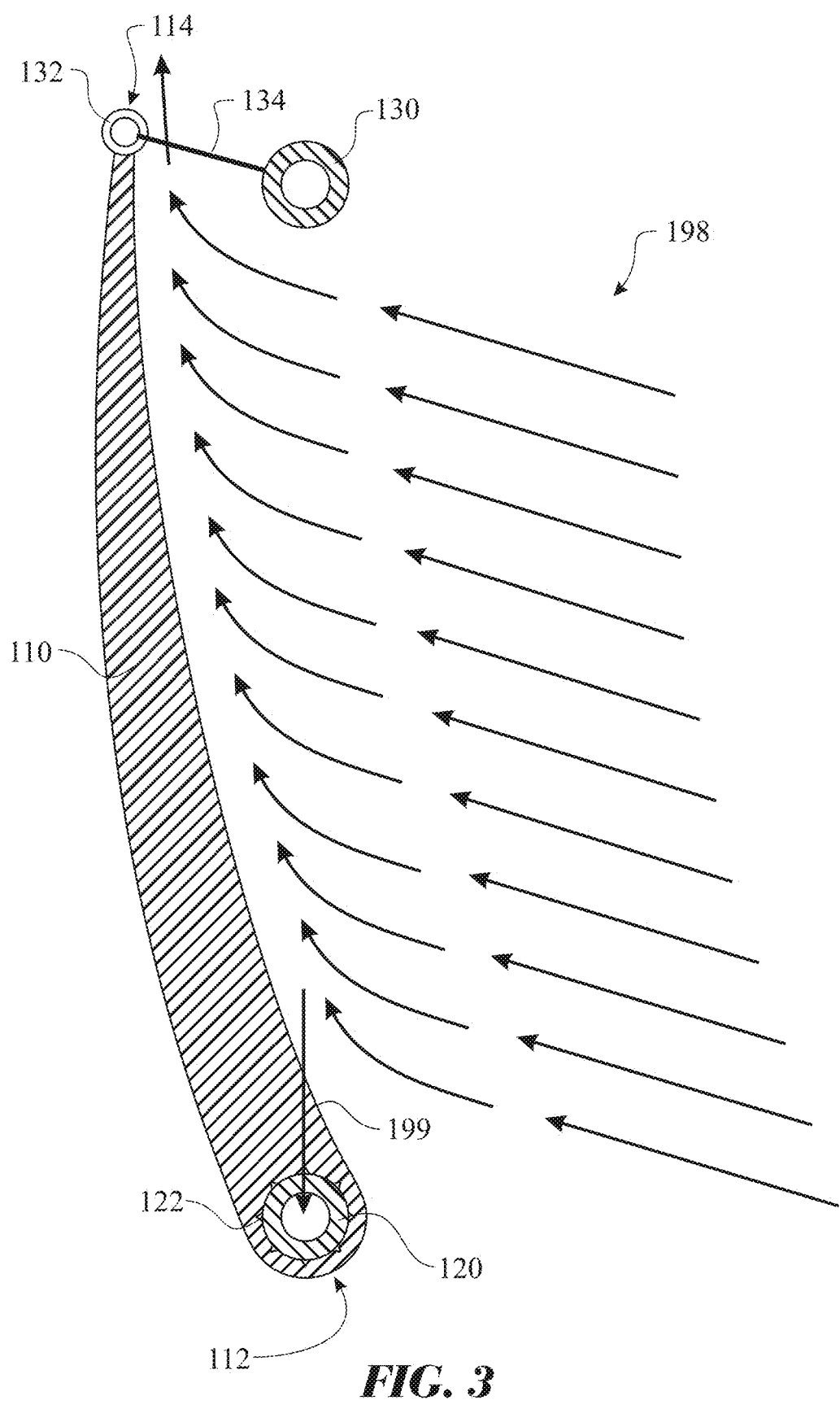
FIG. 3 presents a sectional end view of a turbine blade taken along section line 3-3 of FIG. 1 introducing an effect of wind flow on the blade.

Referring initially to FIGS. 1 through 3 of the drawings, an illustrative embodiment of a turbine wheel, hereinafter apparatus is generally indicated by reference numeral 100 in FIG. 1. The turbine wheel assembly 100 includes a turbine central hub 104 being centrally assembled to a turbine outer rim 102 via a plurality of turbine spokes 108. The turbine central hub 104 includes an axle bearing 106, which is centrally assembled, allowing the turbine central hub 104 to rotate about an axle that would be assembled to the axle bearing 106. The axle and axle bearing 106 can be of any known rotational interface capable of supporting the forces exerted by the wind and respective motion of the turbine wheel assembly 100 about the axle. The turbine spokes 108 are preferably assembled having a tensile force. The distributed tensile force ensures the turbine outer rim 102 remains in the circular shape, while reinforcing the assembly.

A series of turbine blades 110 are provided, having a blade leading edge 112 and a blade trailing edge 114. The distance between the blade leading edge 112 and the blade trailing edge 114 is preferably equal to or greater than a span between two adjacent spokes 108. This shape allows for the blade leading edge 112 to be assembled to a respective lead turbine spoke 108 and the blade trailing edge 114 to be assembled to the respective trailing turbine spoke 108. It would be preferable that the blade leading edge 112 be pivotally assembled to a blade leading edge pivot 120, wherein the blade leading edge pivot 120 can be utilized as the lead turbine spoke 108. The blade leading edge pivot 120 can include a hollow centerline, allowing the turbine spoke 108 to be inserted therethrough. A plurality of anti-slip interface 122 can be included ensuring the blade leading edge pivot 120 rotates in conjunction with the turbine blades 110, or excluded allowing the blade leading edge pivot 120 to rotate independently respective to the turbine blades 110.

The turbine blades 110 has a length parallel to the turbine spoke 108 that is significantly shorter than the distance between the exterior of the turbine central hub 104 and the interior of the turbine outer rim 102. This provides an airflow interior region 109 within an interior of the turbine outer rim 102 allowing airflow 198 to pass through the turbine wheel assembly 100. This configuration provides a centroid of the effective force closer to the turbine outer rim 102, thus increasing the generated torque, reduces the rotational resistance, thus increasing the efficiency.

The trailing edge can include an incident angle control mechanism, including an incident angle controller 130, an angle control cleat 132 and an angle control tether 134. In the exemplary embodiment, the turbine blade 110 pivots about the blade leading edge pivot 120 and is retained at an incident angle via the angle control tether 134. The angle control tether 134 is a cabling, which is released or retracted via an incident angle controller 130. The incident angle controller 130 can either rotate to adjust a released length of the angle control tether 134, or the angle control tether 134 can be routed through the incident angle controller 130 and released or retracted via a remotely located winding mechanism (not shown, but well understood as a motor, gearing and spool). The angle control tether 134 is secured to the turbine blades 110 via an angle control cleat 132 located proximate the blade trailing edge 114 of the turbine blades 110.

Figure 4:
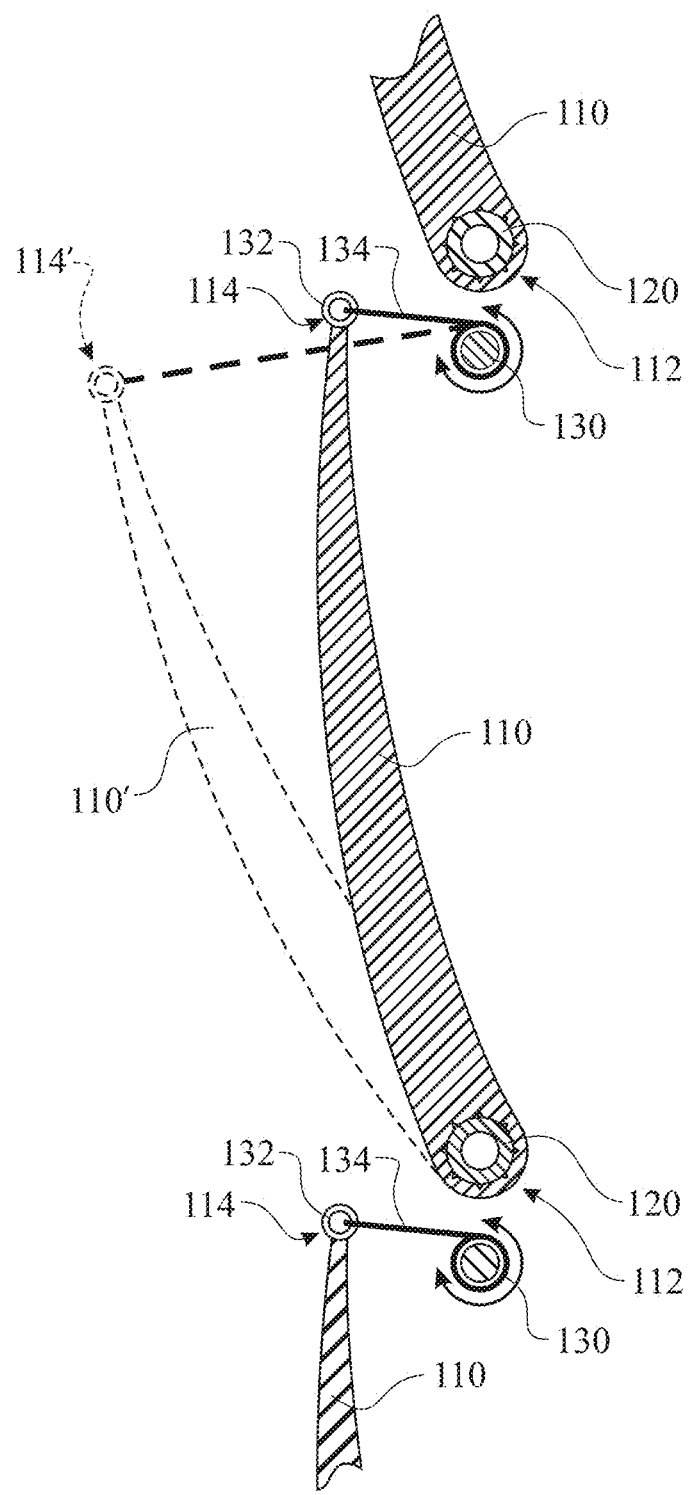
FIG. 4 presents a sectional end view of a series of turbine blades introducing an incident angle controlling mechanism.

As the incident angle controller 130 releases the angle control tether 134, a wind flow 198 applies a force to the facing side of the turbine blades 110 allowing the turbine blades 110 to rotate into position turbine blades 110' and repositioning the blade trailing edge 114 to position blade trailing edge 114' as shown in FIG. 4. The illustration presents an embodiment where the incident angle controller 130 is solid and rotates to release or retract the angle control tether 134 to adjust the released length. The angle of incident changes the resultant rotational speed of the turbine blades 110, as referenced as a resultant blade motion 199. The turbine blades 110 are positioned having the blade leading edge 112 overlapping the blade trailing edge 114, with the blade leading edge 112 being arranged on the wind receiving side of the turbine blades 110.

It is understood that other incident angle control mechanisms can be used, including a cam and respective control arm, and the like.

Figure 5:
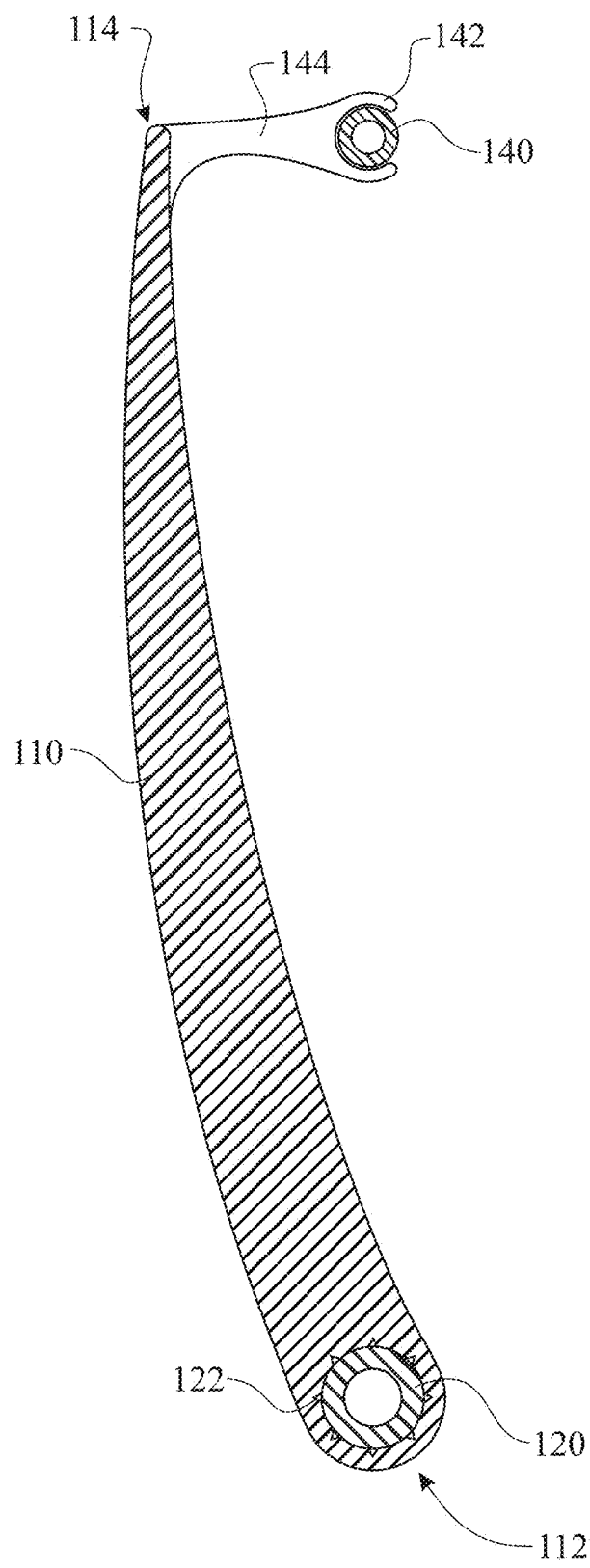
FIG. 5 presents a sectional end view of a turbine blade introducing an exemplary breakaway mechanism.
Figure 6:
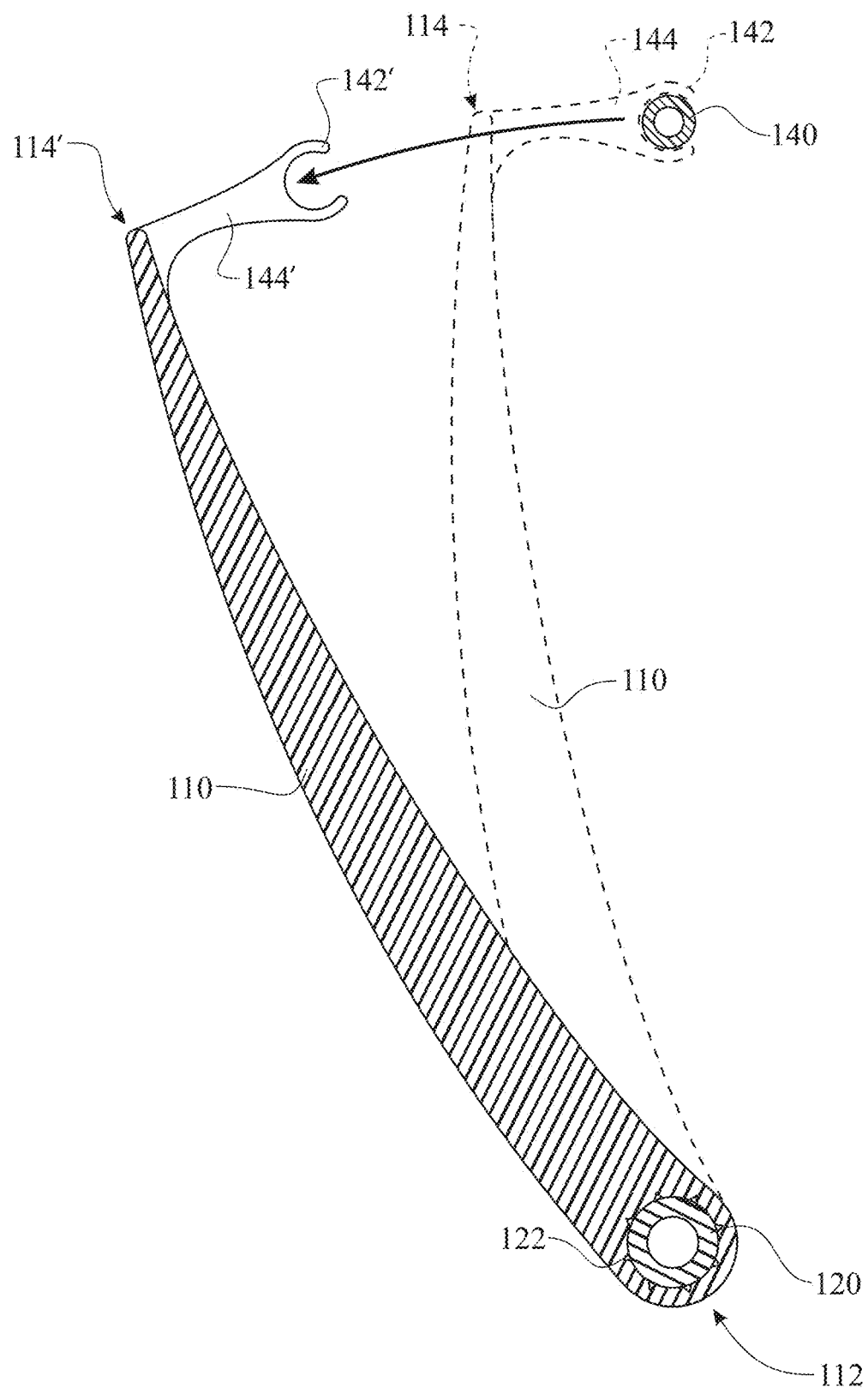
FIG. 6 presents a sectional end view of a turbine blade illustrating the operation of the breakaway mechanism of FIG. 5.

A breakaway mechanism can be incorporated to compensate when the turbine wheel assembly 100 encounters any unexpected excessive wind forces 198. One exemplary embodiment is presented in FIGS. 5 and 6. The breakaway mechanism detachably engages a breakaway clip 142 with a breakaway anchor 140. The breakaway clip 142 is secured to the blade trailing edge 114 via a breakaway frame 144. The breakaway clip 142 would detach from the breakaway anchor 140 when subjected to a predetermined force. An alternate configuration would utilize the incident angle mechanism of FIGS. 3 and 4. The incident angle controller 130 would include a ratcheting mechanism, which releases or free spools the angle control tether 134 when subjected to a predetermined force. It is understood that other configurations known by those skilled in the art can be integrated with the turbine wheel assembly 100, providing a breakaway mechanism.

Figure 7:
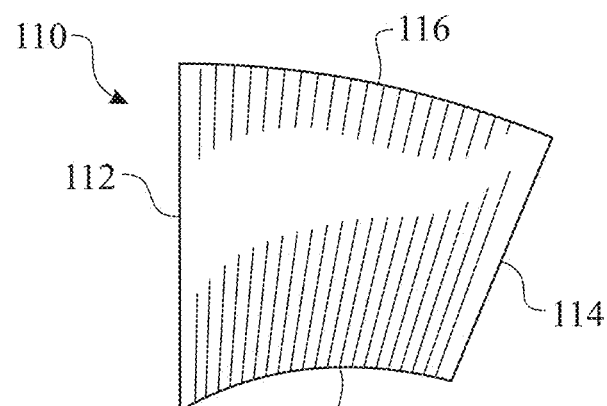
FIG. 7 presents a front view of a first exemplary turbine blade shape.
Figure 8:
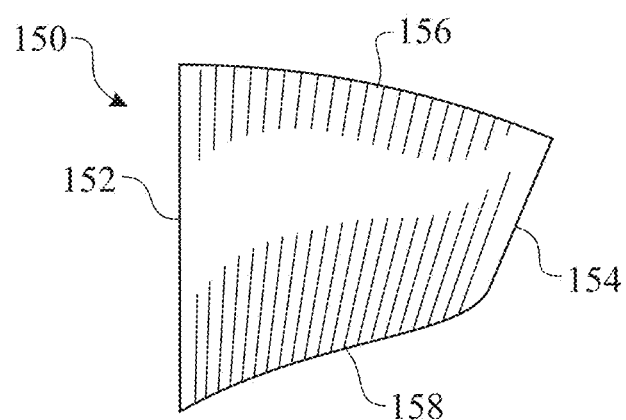
FIG. 8 presents a front view of a second exemplary turbine blade shape.
Figure 9:
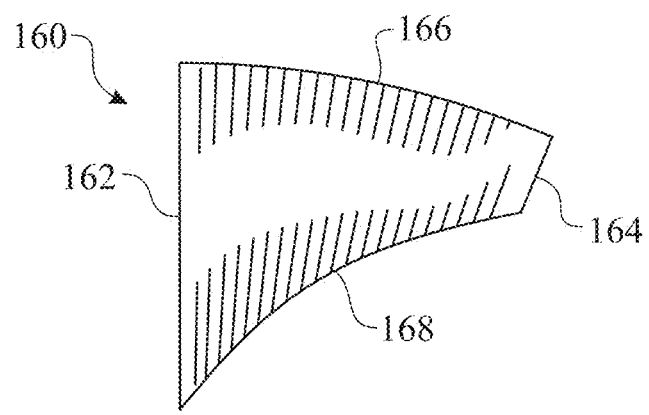
FIG. 9 presents a front view of a third exemplary turbine blade shape.

The turbine blades can be configured in a variety of shapes, as illustrated in FIGS. 7 through 9. A planar view of the turbine blades 110 is presented in FIG. 7, having an airfoil cross sectional shape bounded by a blade leading edge 112, a blade trailing edge 114, a posterior edge 116 and an interior edge 118. The turbine blades can be configured of a variety of cross sectional and peripheral shapes. The configuration defines the total surface area. The surface area, cross sectional shapes and peripheral shape all affect the efficiency of the turbine blades 110. The interior edge 118 provides an arched lower edge wherein the blade trailing edge 114 is equal to or slightly shorter than the blade leading edge 112. A planar view of a turbine blade 150 is presented in FIG. 8, having an airfoil cross sectional shape bounded by a blade leading edge 152, a blade trailing edge 154, a posterior edge 156 and an interior edge 158. The interior edge 158 provides an "S" shaped lower edge having a continuous line blending into the blade trailing edge 114, and wherein the blade trailing edge 114 is shorter than the blade leading edge 112. A planar view of a turbine blade 160 is presented in FIG. 9, having an airfoil cross sectional shape bounded by a blade leading edge 162, a blade trailing edge 164, a posterior edge 166 and an interior edge 168. The interior edge 168 provides an arched shaped lower edge wherein the blade trailing edge 164 is significantly shorter than the blade leading edge 162.

A turbine deployment assembly 200 is illustrated in FIGS. 10 through 15. A vertical riser support 202 provides a base member for the turbine deployment assembly 200. An electrical power generator 204 is pivotally assembled to the upper portion of the vertical riser support 202. The turbine wheel assembly 100 is in rotational communication with the electrical power generator 204 via a turbine wheel shaft 206. A counterbalance 210 can be incorporated providing a counterbalance to the turbine wheel assembly 100. The counterbalance 210 would be assembled to the turbine deployment assembly 200 via a counterbalance support beam 212.

Figure 12:
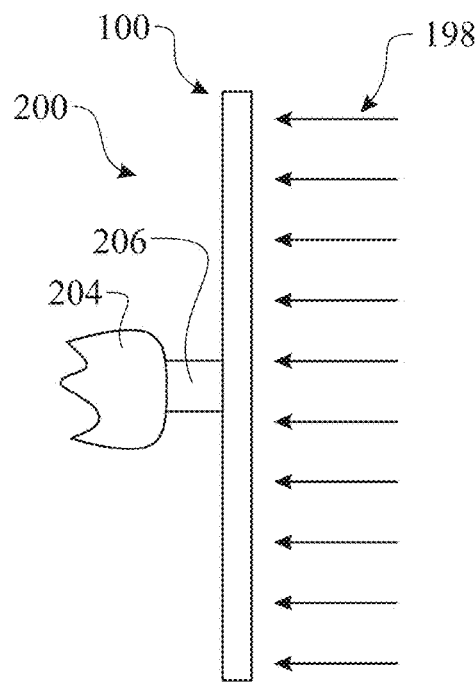
FIG. 12 presents a partial top view of the wind power harnessing structure of FIG. 10, configured perpendicular to an airflow.
Figure 13:
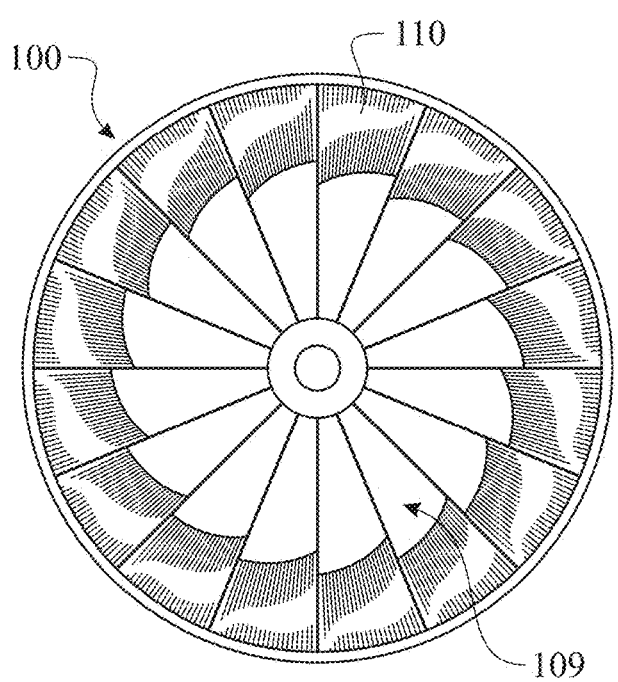
FIG. 13 presents a front view of the turbine wheel configured perpendicular to the airflow.
Figure 14:
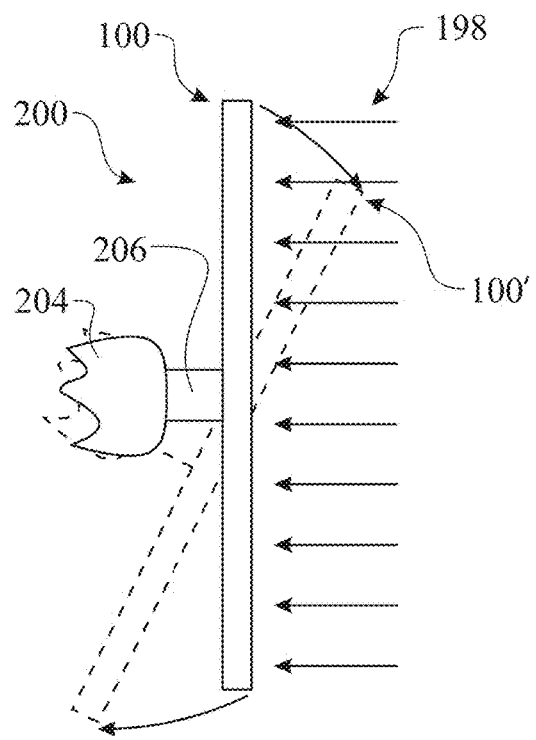
FIG. 14 presents a partial top view of the wind power harnessing structure of FIG. 10, rotated away from being perpendicular to the airflow.
Figure 15:
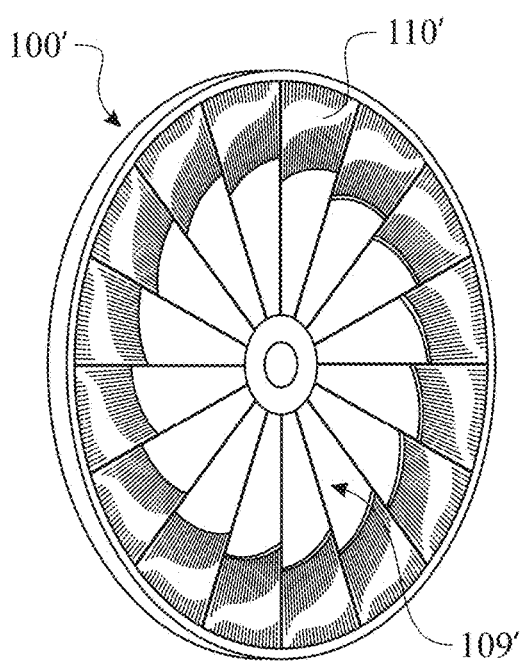
FIG. 15 presents a front view of the turbine wheel, rotated away from being perpendicular to the airflow.

The electrical power generator 204 is designed to rotate about a vertical axis parallel to a longitudinal axis of the vertical riser support 202 as shown in the top views of FIG. 14. The rotation positions the turbine wheel assembly 100 to rotated position turbine wheel assembly 100'. The rotation allows for several capabilities. The first, being positioning the turbine wheel assembly 100 perpendicular to the wind flow 198 as shown in FIG. 12, thus maximizing the frontal surface area as illustrated in FIG. 13. The second, being positioning the turbine wheel assembly 100 at an angle that is not perpendicular to the wind flow 198 as shown in FIG. 14, thus reducing the frontal surface area exposed to the wind flow 198 as illustrated in FIG. 15. This reduces any potential damage from excessive winds. The incident angle mechanism and the breakaway mechanism both additionally contribute to efficiency, reliability, and protection of the turbine deployment assembly 200.

Figure 16:
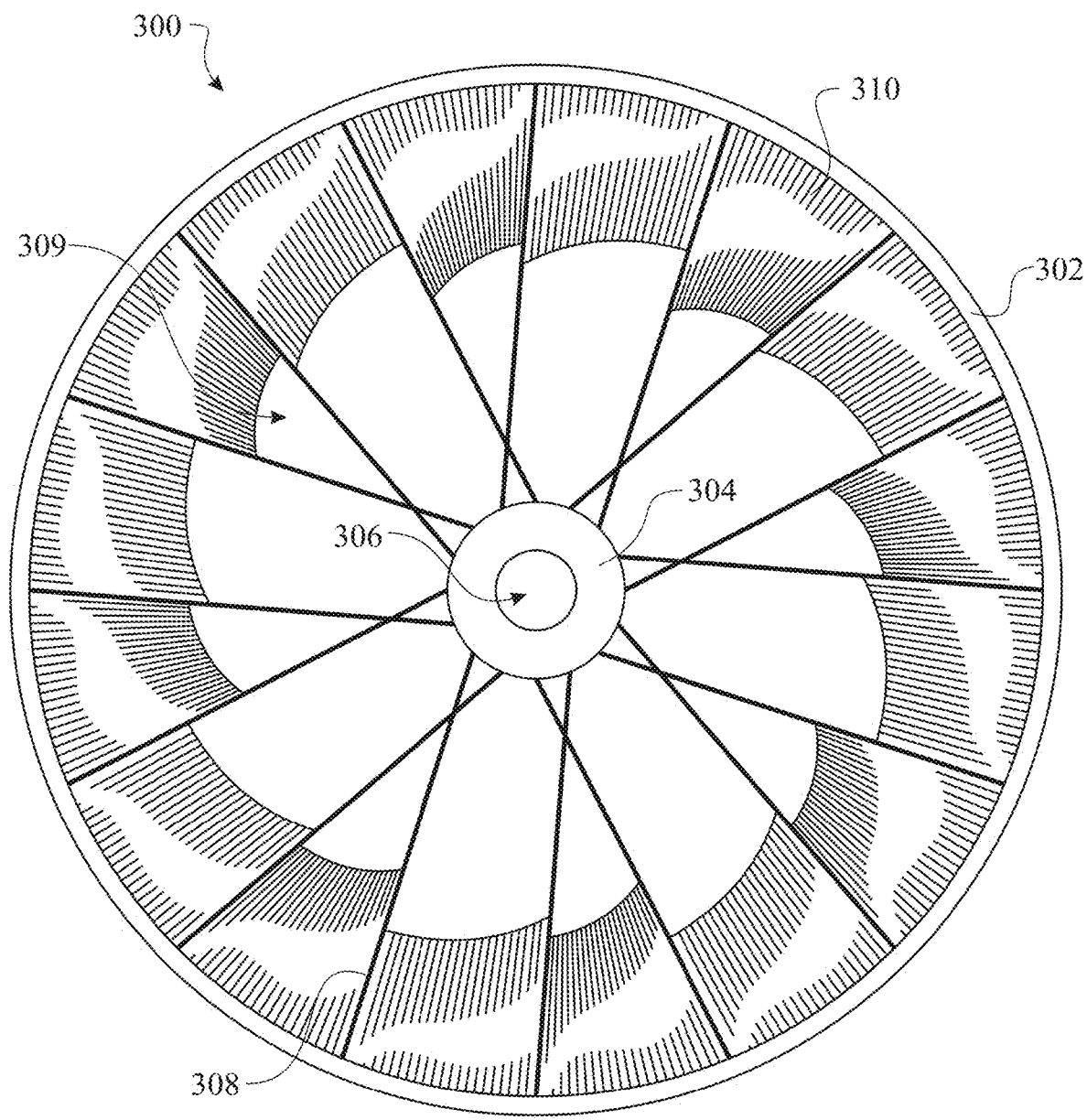
FIG. 16 presents a front view of a second exemplary embodiment of a turbine wheel assembling adjacent spokes in an overlapping configuration.

An alternate spoke configuration is presented in the exemplary embodiment referred to as a crossover spoke turbine wheel assembly 300, illustrated in FIG. 16. The crossover spoke turbine wheel assembly 300 is similar to the turbine wheel assembly 100. Like features of crossover spoke turbine wheel assembly 300 and turbine wheel assembly 100 are numbered the same except preceded by the numeral '3'. The turbine spokes 308 are arranged being fixed to the central hub 304 offset from the radial centerline. The turbine spokes 308 are configured whereby adjacent turbine spokes 308 overlap. The overlap between the spokes 308 occurs proximate the central hub 304.

Figure 17:
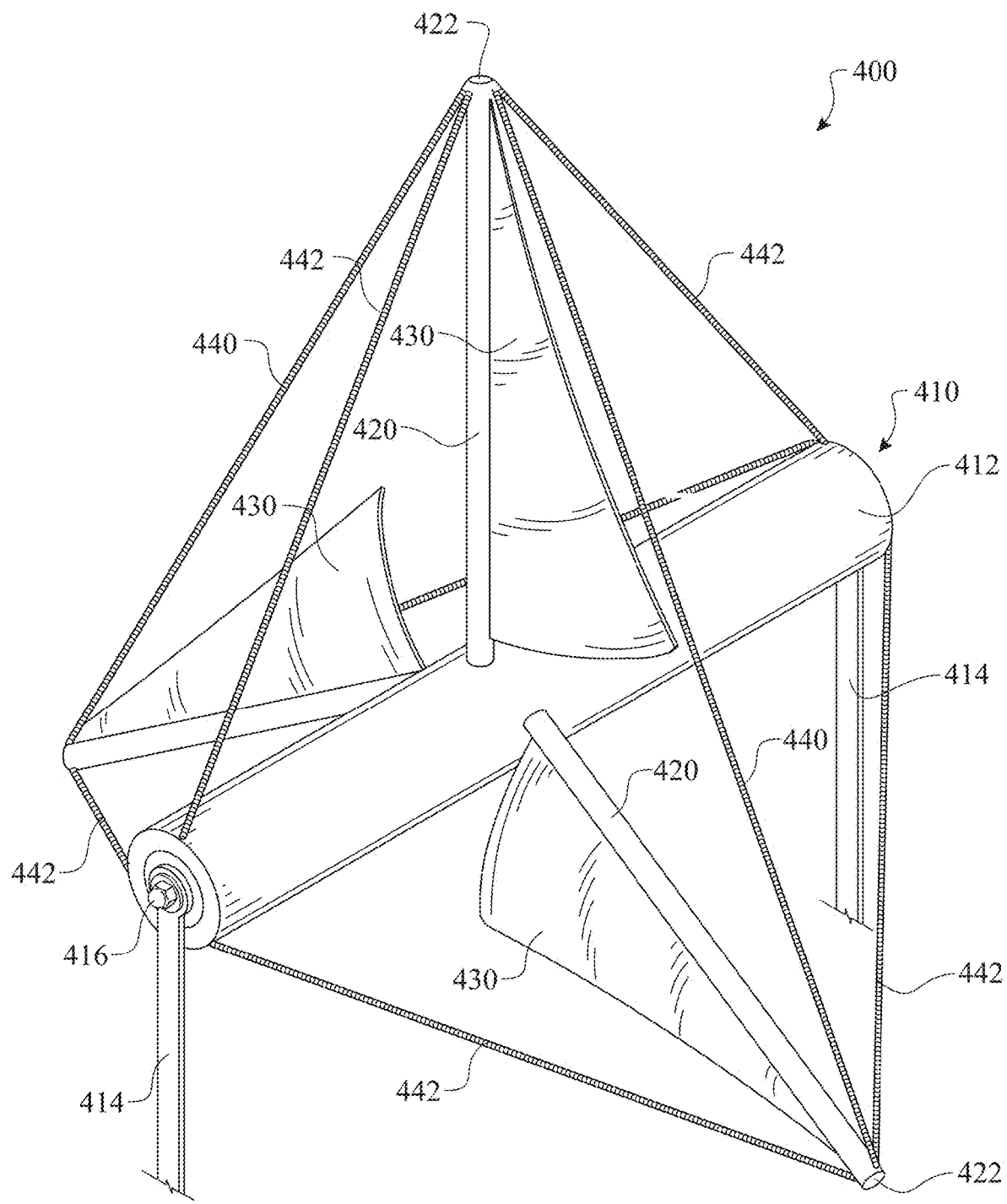
FIG. 17 presents an isometric view of a third exemplary embodiment of a turbine wheel utilizing a plurality of masts supported by an arrangement of tension cables.
Figure 18:
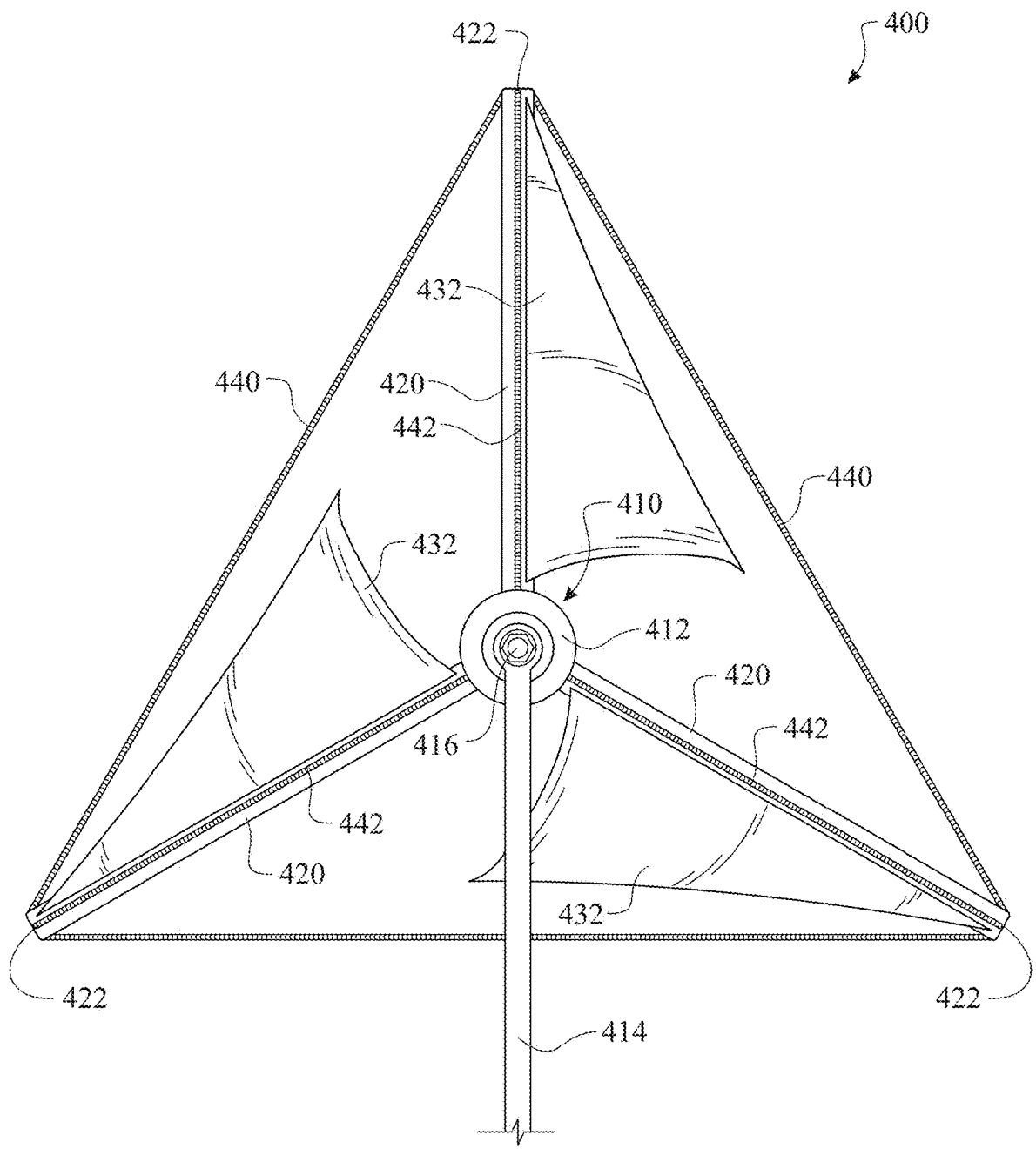
FIG. 18 presents a front elevation view of the third exemplary turbine wheel of FIG. 17.
Figure 19:
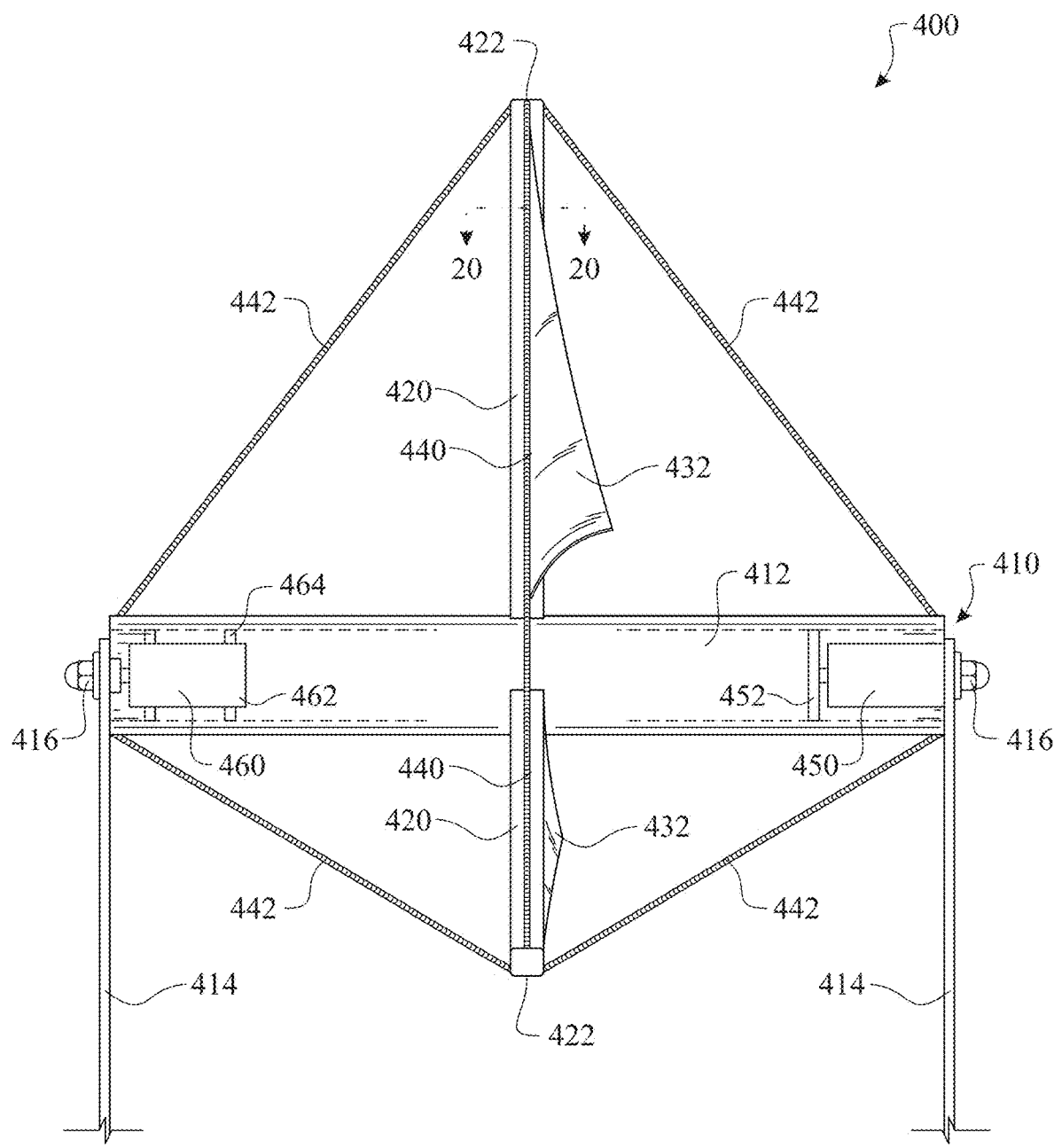
FIG. 19 presents a side elevation view of the third exemplary turbine wheel of FIG. 17.

Another exemplary embodiment is referred to as a cable supported mast turbine assembly 400, illustrated in FIGS. 17 through 19. The cable supported mast turbine assembly 400 is fabricated having a plurality of mast 420 extending radially from a central hub 412 of a power generating central hub assembly 410. The central hub 412 is supported by a pair of hub support members 414; having one hub support member 414 located at each end of the central hub 412. The central hub 412 is rotationally assembled to the hub support member 414 via a hub coupling member 416. A generator is provided in communication with the central hub 412, being placed within the central hub 412, adjacent to the central hub 412, or any other reasonable location. As the central hub 412 rotates, the generator creates electrical power. It is also understood that the rotational motion of the central hub 412 can be mechanically coupled to other objects to drive a motion of the other objects accordingly.

The masts 420 are supported by an arrangement of cabling. Mast-to-mast tension cables 440 span between mast distal ends 422 of each adjacent mast 420. Each mast-to-mast tension cable 440 is tightened having a tensile force equal to the others. The mast-to-mast tension cables 440 provide stability to the mast 420 against a torsional force generated by the rotation of the central hub 412. A mast-to-axle tension cable 442 spans between each end of the central hub 412 and the mast distal end 422 of each of the masts 420. The plurality of mast-to-axle tension cables 442 provides stability against any cross-directed forces, such as wind, vibrations, and the like.

The cables 440, 442 can be secured to the respective member using any reasonable and well-known interface. The interface can include a tensioning member, such as a turnbuckle, and the like. The cables 440, 442 can be fabricated using any of many well-known methods, including a single cable, a series of wrapped or bound smaller cables, and the like. The cross-sectional shape of the mast 420 are preferably aerodynamic, such as round (as shown), wing-shaped, and the like.

A turbine blade can be provided as either a pliant turbine blade 430 or a rigid turbine blade 432. When incorporating the pliant turbine blade 430, the cable supported mast turbine assembly 400 can include a tether or blade tensioning cable 444 spanning between an unattached corner or other region of the pliant turbine blade 430 and a location proximate an axial end of the central hub 412. The blade tensioning cable 444 can be fixed or adjustable. A motor can be utilized to retract or extend the blade tensioning cable 444, adjusting the tautness of the blade tensioning cable 444. A tensioning member can release the blade tensioning cable 444 should the blade tensioning cable 444 be subjected to a force above a predetermined limit, thus avoiding any damage to the cable supported mast turbine assembly 400.

Alternately, the rigid turbine blade 432 can be rigidly affixed to the mast 420. The mast 420 can be pivotally attached to the central hub 412, including a drive mechanism for rotating the mast 420, thus adjusting the angle of incidence of the pliant turbine blade 430.

Figure 20:
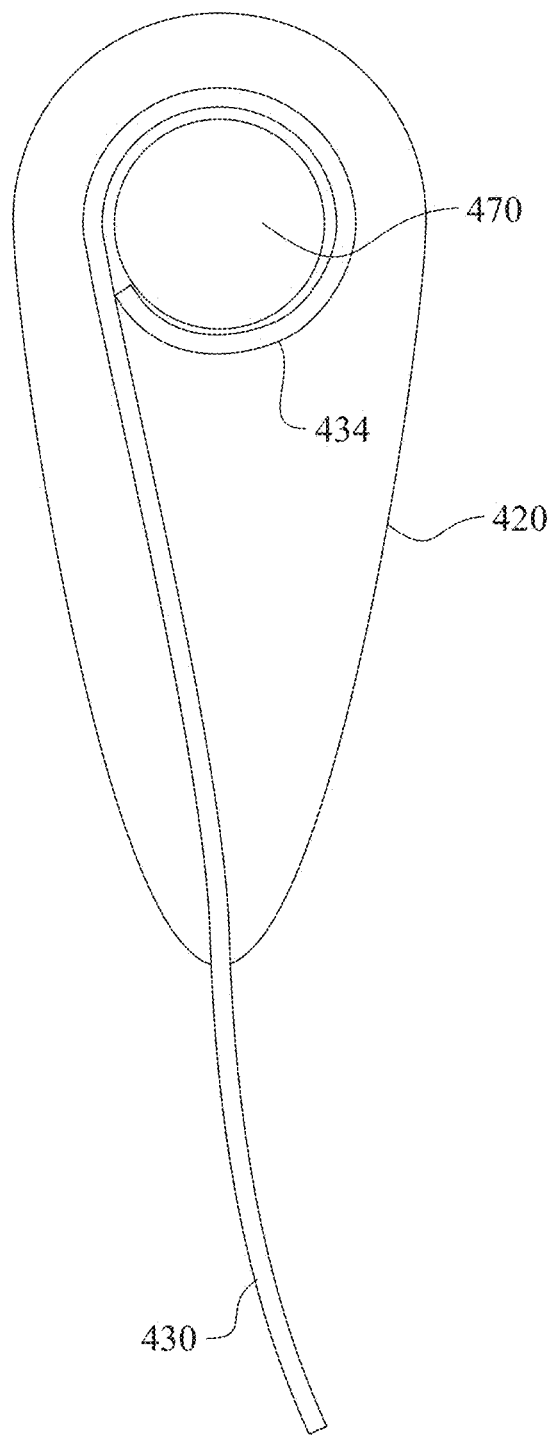
FIG. 20 presents a cross sectional view of the mast taken along section line 20-20 of FIG. 19, the illustration additionally introducing a blade retracting mechanism.

Any additional operational features of the turbine wheel assembly 100 can be applied to the cable supported mast turbine assembly 400. The mast 420 can include a hollow center, allowing the user to retract at least a portion of the pliant turbine blade 430 therein to reduce the exposed surface area thereof as illustrated in FIG. 20. A retracting mechanism 470 can be provided to gather the pliant turbine blade 430 within an interior section of the mast 420. One such means would be to rotate the retracting mechanism 470 collecting the pliant turbine blade 430, storing the excess material in a wrap referenced as a retracted turbine blade portion 434. The retracting mechanism 470 can be an elongated rotating structure such as an axle rotated by a motor or other rotational operating device.

The cable supported mast turbine assembly 400 is provided as a means for generating power. The cable supported mast turbine assembly 400 is designed whereby the central hub 412 is rotated by wind. The rotation of the central hub 412 is then converted into useable energy. A mechanical interface can engage with the central hub 412 to transfer mechanical power to drive a secondary apparatus. The mechanical interface can direct mechanical motion of a secondary apparatus. Alternately, an electricity generating apparatus 450 can engage with the central hub 412 to create electrical power. The electricity generating apparatus 450 can be located within an interior of the central hub 412 or external to the central hub 412. One portion of the electricity generating apparatus 450 remains stable and a second portion of the electricity generating apparatus 450 engages with the central hub 412 to rotate. The rotating motion drives the electricity generating apparatus 450 to create the electrical output. As illustrated on the right side of FIG. 19, the electricity generating apparatus 450 is secured to the hub support member 414. A generator interface 452 is attached to an axle of the electricity generating apparatus 450 and engages with an interior surface of the central hub 412. The central hub 412 rotationally drives the generator interface 452. The generator interface 452 rotates windings of a generator, which pass across fixed stators creating the electrical output. Conversely, as illustrated on the left side of FIG. 19, an electricity generating apparatus 460 can be secured to the interior surface of the central hub 412 via a generator mount 464. A generator interface 462 is attached to a fixed member, such as the hub support member 414. The motion of the central hub 412 causes the electricity generating apparatus 460 to rotate respective to the generator interface 462, thus generating the electrical output.

The turbine assemblies 100, 400 can be utilized for gas flow, such as gaseous flows, such as wind, or fluid flows, such as wave motion, currents, tidal flow, and the like. It is also understood that the turbine assembly 100, 400 can be attached to a moving object. The turbine assembly 100, 400 creates an output power based upon the relative motion between the turbine assembly 100, 400 and a fluid (either gaseous or liquid).

The previously described embodiments integrate the electric power generator 204, 450, 460 into the power generating central hub assembly 410 of the turbine assembly 200, 400. Electric power generators 204, 450, 460 are generally heavy, wherein the weight impacts the structural design and directional rotatability of the turbine assembly 200, 400.

Figure 21:
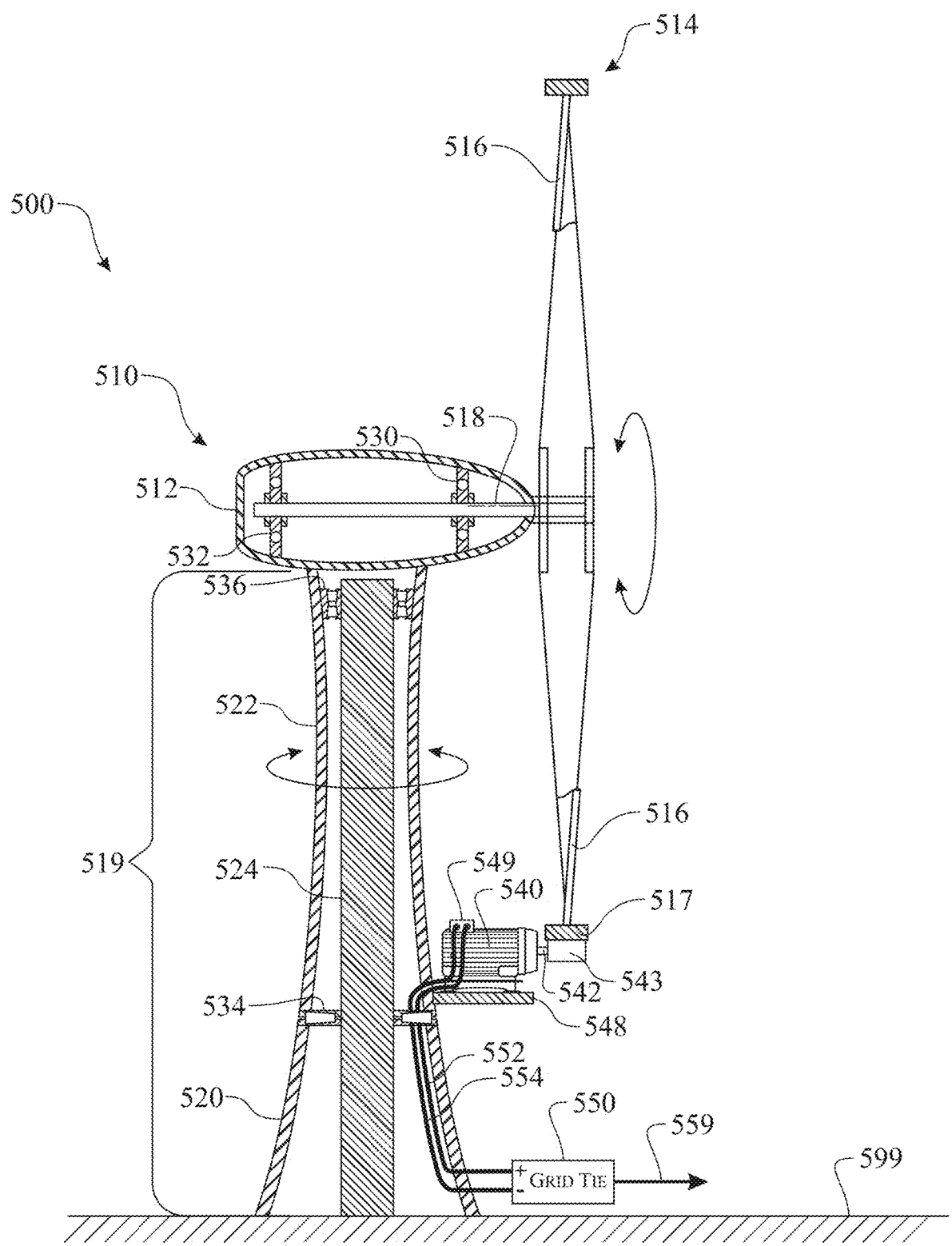
FIG. 21 presents a partially sectioned view of an exemplary wind operated electrical power generating system employing a peripheral edge of an outer rim of the exemplary turbine wheel to drive a generator.

A wind operated electrical power generating system 500, as shown in an exemplary illustration presented in FIG. 21, introduces an alternative configuration for transferring wind energy to an electric generator 540. In the exemplary illustration, The wind operated turbine assembly 510 includes a turbine housing 512 carried by a vertical riser support structure 519. The vertical riser support structure 519 is structurally supported by a system supporting surface 599. In a preferred configuration, the vertical riser support structure 519 is rigidly mounted to the system supporting surface 599. The system supporting surface 599 can be a cement slab; a natural earth surface, such as dirt, rocks, and the like; a wooden structure, a mobile vehicle, a floating vessel, and the like. The mounting configuration would be determined based upon the selected supporting material. The turbine housing 512 is preferably located atop a distal end of the vertical riser support structure 519. The turbine housing 512 includes various features required for operation of the wind operated turbine assembly 510. A turbine blade subassembly 514 is rotationally assembled to the turbine housing 512 using a turbine blade subassembly shaft 518. The turbine blade subassembly 514 can be of any suitable design, including a three blade 516 design as illustrated, the turbine wheel assembly 100, the crossover spoke turbine wheel assembly 300, the cable supported mast turbine assembly 400, a tension airfoil assembly 1100 (oriented in a horizontal arrangement for lift, and referred to as a tension airfoil lifting assembly 1100 as introduced in FIG. 32 and oriented in a vertical orientation for use as a wind collecting device and referred to as a tension airfoil turbine assembly 1100) (and any of the associated variants), and any other suitable wind power collecting design.

The turbine blade subassembly shaft 518 can be supported by a series of bearing assemblies, such as a turbine blade shaft supporting forward bearing assembly 530 and a turbine blade shaft supporting rear bearing assembly 532 illustrated in FIG. 21. The bearing assemblies 530, 532 can employ spherical bearings, cylindrical rolling elements, tapered rolling elements, barrel shaped rolling elements, and the like. Each bearing assembly 530, 532 would include an inner ring and an outer ring (not identified but well known by description by those skilled in the art). The bearing assemblies 530, 532 enable rotation of the turbine blade subassembly shaft 518 with minimal friction. It is understood that any arrangement can be utilized to enable rotation of the turbine blade subassembly 514 about a substantially horizontal axis.

In the exemplary illustration, the electric generator 540 engages with a peripheral surface or of a turbine blade outer rim surface 517 of the turbine blade subassembly 514. More specifically, an electric generator turbine rim engagement wheel 543 is secured to a distal or free end of an electric generator shaft 542 of the electric generator 540. The electric generator turbine rim engagement wheel 543 can be directly engaging with the peripheral surface of an electric generator turbine rim engagement wheel 543, engaging via a gearing arrangement or a transmission, engaging using a belt that partially circumscribes the peripheral surface of an electric generator turbine rim engagement wheel 543, engaging using a belt that partially circumscribes the turbine blade subassembly shaft 518, or any other suitable arrangement to transfer a rotational motion caused by the turbine blade subassembly 514 to the electric generator shaft 542 of a distally mounted electric generator 540. The electric generator 540 is preferably supported by an electric generator support component 548, where the electric generator 540 is mechanically coupled to the electric generator support component 548 and the electric generator support component 548 is mechanically assembled to a vertical riser support structure rotating section 522 of the vertical riser support structure 519.

In the arrangement of the wind operated electrical power generating system 500, the electric generator 540 should remain in alignment with rotational transferring element of the turbine blade subassembly 514. In order to accomplish this, the vertical riser support structure 519 is arranged in at least two sections: a vertical riser support structure rotating section 522 rotationally assembled to a vertical riser support structure base section 520. Rotation and support between the vertical riser support structure rotating section 522 and the vertical riser support structure base section 520 can be provided by a vertical riser support structure base bearing assembly 534. The vertical riser support structure base bearing assembly 534 would be arranged similar to any rotating mechanism that rotates an upper element respective to a lower element about a vertical axis. The rotation can be provided by a powered arrangement or a free motion, where wind could orient the direction of the vertical riser support structure rotating section 522. In the exemplary illustration, tapered rolling elements are contained between an outer ring and an inner ring forming the vertical riser support structure base bearing assembly 534. An inner diameter of one of the bearing assembly rings can be assembled to a vertical riser support structure stabilizing column 524, where the vertical riser support structure stabilizing column 524 provides support along a length of the vertical riser support structure 519. A vertical riser support structure upper stabilizing bearing assembly 536 can be assembled at an upper end of the vertical riser support structure 519 to provide additional support of the vertical riser support structure rotating section 522. The vertical riser support structure upper stabilizing bearing assembly 536 could be arranged having an inner ring assembled to the vertical riser support structure stabilizing column 524 and an outer ring assembled to the vertical riser support structure rotating section 522. In the exemplary illustration, the vertical riser support structure upper stabilizing bearing assembly 536 employs pairs of tapered rolling elements to maintain support of the bearing elements in a vertical direction, while stabilizing the vertical riser support structure rotating section 522 in a horizontal direction.

The turbine housing 512 can be rigidly fixed to the vertical riser support structure 519 or rotationally carried by the vertical riser support structure 519. In a configuration where the turbine housing 512 is rotationally carried by the vertical riser support structure 519, the turbine housing 512 would rotate to optimize the directional relationship between the turbine blade subassembly 514 and the direction of the wind. In the exemplary embodiment, the vertical riser support structure rotating section 522 would rotate respective to the vertical riser support structure base section 520. The combination of the vertical riser support structure base section 520 and the vertical riser support structure stabilizing column 524 provides support to the vertical riser support structure rotating section 522.

Electrical power generated by the electric generator 540 would be collected and transferred to a grid tie 550 by an electric output panel 549, a positive electrical output cable 552, and a negative electrical output cable 554. The grid tie 550 would, in turn, transfer the generated electrical power to a power grid 559 for collection and use.

Figure 22:
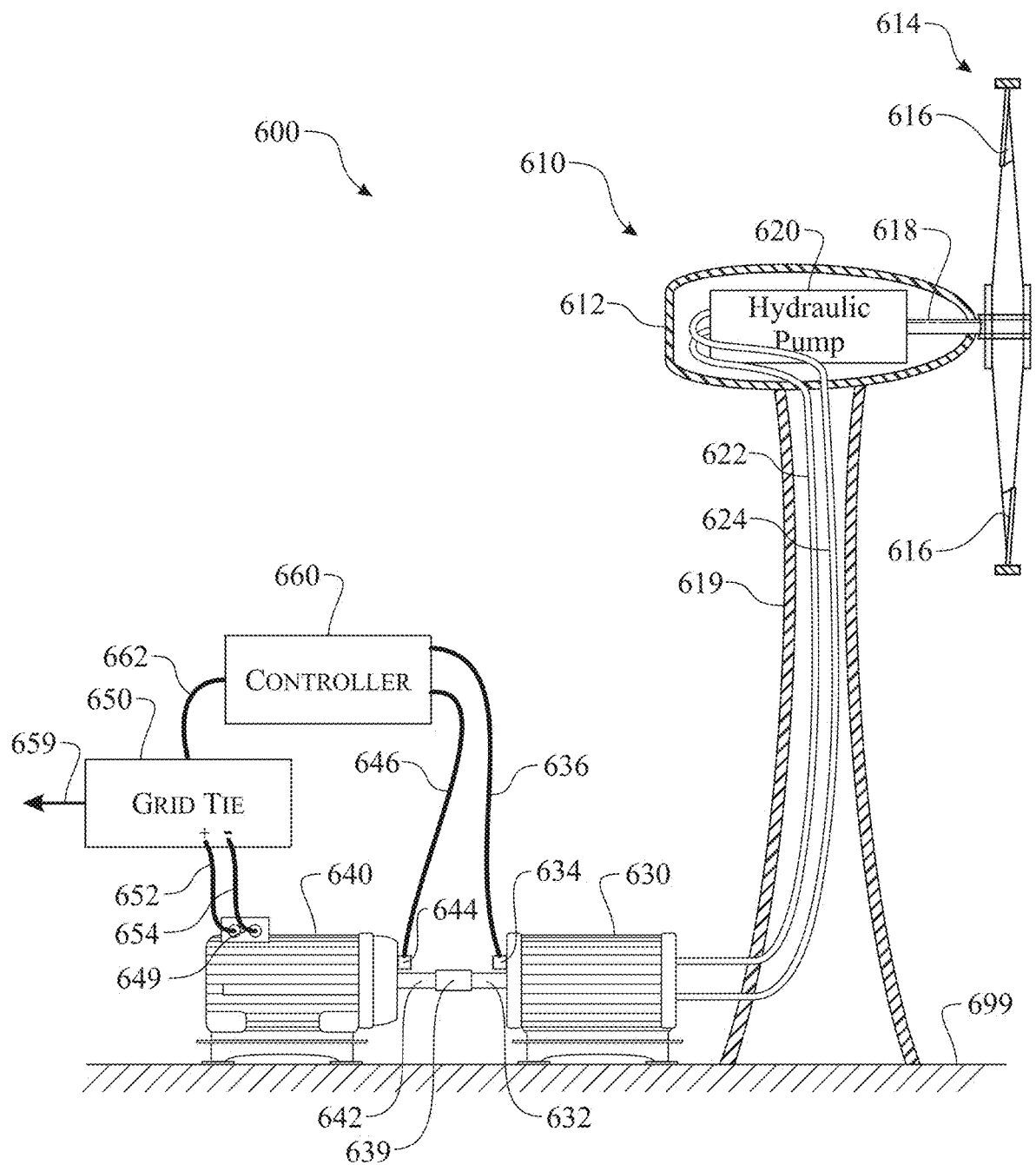
FIG. 22 presents a partially sectioned view of an exemplary wind operated electrical power generating system employing a hydraulic power transfer system and a power optimizing controller.

A wind operated electrical power generating system 600, as shown in an exemplary illustration presented in FIG. 22, introduces another alternative configuration for transferring wind energy to an electric generator 640. The wind operated electrical power generating system 600 and the wind operated electrical power generating system 500 include a number of like elements. Like elements of the wind operated electrical power generating system 600 and the wind operated electrical power generating system 500 are numbered the same, where elements associated with the wind operated electrical power generating system 600 are preceded by the numeral "6", except where disclosed herein. The wind operated electrical power generating system 600 employs a hydraulic system for transferring energy collected from wind to the electric generator 640. In the exemplary configuration, the vertical riser support structure 619 is rigidly mounted to the system supporting surface 699 (similar to the system supporting surface 599). The turbine housing 612 is preferably located atop a distal end of the vertical riser support structure 619. The turbine housing 612 includes various features required for operation of the wind operated turbine assembly 610. The turbine housing 612 can be rigidly fixed to the vertical riser support structure 619 or rotationally carried by the vertical riser support structure 619. In a configuration where the turbine housing 612 is rotationally carried by the vertical riser support structure 619, the turbine housing 612 would rotate to optimize the directional relationship between the turbine blade subassembly 614 and the direction of the wind. In the exemplary illustration, the turbine housing 612 would be rotationally assembled to a distal, free end of the vertical riser support structure 619.

The hydraulic system includes a hydraulic pump 620 carried by the turbine housing 612, a hydraulic motor 630 distally located from the turbine housing 612 and preferably carried by the system supporting surface 699. A pair of hydraulic pipes, tubes or lines 622, 624 extends fluid communication between the hydraulic pump 620 and the hydraulic motor 630. The hydraulic lines 622, 624 can be routed within an interior of the vertical riser support structure 619, along an interior surface of the vertical riser support structure 619, along an exterior surface of the vertical riser support structure 619, or along any other supporting structure. The hydraulic lines 622, 624 can be fabricated of any suitable material. The hydraulic lines 622, 624 can be fabricated of a rigid material, such as PVC, copper, and the like, of a flexible material, such as plastic, nylon, rubber, and the like, or any combination thereof. The structure of the hydraulic lines 622, 624 can be rigid or include features to introduce flexure.

The hydraulic motor 630 is assembled in rotational communication with an electric generator 640. The hydraulic motor 630 includes a hydraulic motor shaft 632 that is rotationally driven by fluid flowing through the hydraulic lines 622, 624. The electric generator 640 includes an electric generator shaft 642, which is arranged in rotational communication with the hydraulic motor shaft 632 of the hydraulic motor 630. The hydraulic motor 630 and electric generator 640 are preferably rigidly mounted in a manner that provides and maintains dynamic alignment between the hydraulic motor shaft 632 and the electric generator shaft 642. In the exemplary embodiment, the hydraulic motor shaft 632 and the electric generator shaft 642 are coupled to one another using a shaft coupling 639. It is understood that the operational engagement can transfer a rotational force from the hydraulic motor shaft 632 to the electric generator shaft 642 using any suitable interface, including one or more gears, a clutch, a transmission, and the like.

A power control module 660 can be integrated into the wind operated electrical power generating system 600 to optimize power. The power control module 660 monitors the rotational speed of either shaft 632, 642. The wind operated electrical power generating system 600 can include at least one of a hydraulic motor shaft rotational speed sensor 634 and an electric generator shaft rotational speed sensor 644. The hydraulic motor shaft rotational speed sensor 634 would be arranged to monitor the rotational speed of the hydraulic motor shaft 632. A hydraulic motor shaft rotational speed sensor signal communication link 636 provides signal communication between the hydraulic motor shaft 632 and the power control module 660. The electric generator shaft rotational speed sensor 644 would be arranged to monitor the rotational speed of the electric generator shaft 642. An electric generator shaft rotational speed sensor signal communication link 646 provides signal communication between the electric generator shaft 642 and the power control module 660. The power control module 660 can operate using the hydraulic motor shaft rotational speed sensor 634, the electric generator shaft rotational speed sensor 644 or both. It is understood that the power control module 660 can include compensation information when gears, a transmission, or any other ratio translating interface is integrated between the hydraulic motor shaft 632 and the electric generator shaft 642. The components of the power control module 660 can be assembled into and/or onto a power controller enclosure 664.

The controller governs the power output from the electric generator 640 to a grid tie 650. The power control module 660 is in electric communication with the grid tie 650 using a power control module electrical communication link 662. Alternatively, the power control module 660 can be in electric communication with the electric generator 640 to accomplish the same end result using an alternate power control module electrical communication link 561.

Electrical power generated during operation of the electric generator 640 is transferred from the electric generator 640 through an electric output panel 649. In the exemplary embodiment, a pair of electrical output cables (a positive electrical output cable 652 and a negative electrical output cable 654) is used to provide electric communication between the electric generator 640 and the grid tie 650. The grid tie 650 provides electrical communication between at least one of the controller 660 and the generator 640 and an electric power grid 659. The generated electric power is transferred to a power grid 659 for use.

In operation, rotation of the turbine blade subassembly 614 is transferred to the hydraulic pump 620 by the turbine blade subassembly shaft 618. The rotational input to the hydraulic pump 620 generates a hydraulic fluid flowing down the first hydraulic line 622 and returning through the second hydraulic line 624. The hydraulic fluid flows through the hydraulic motor 630 causing the hydraulic motor 630 to rotate. The rotational motion of the hydraulic motor shaft 632 created by the hydraulic fluid flow drives a rotation of the electric generator shaft 642. The rotational motion of the electric generator shaft 642 powers the electric generator 640 to generate electric power. The electric power is fed to the electric output panel 649, which distributes the generated electric power through any number of electrical output cables 652, 654. It is understood that a grounding connection can be provided through a casing, frame, or other electrically conductive component of the electric generator 640.

Figure 23:
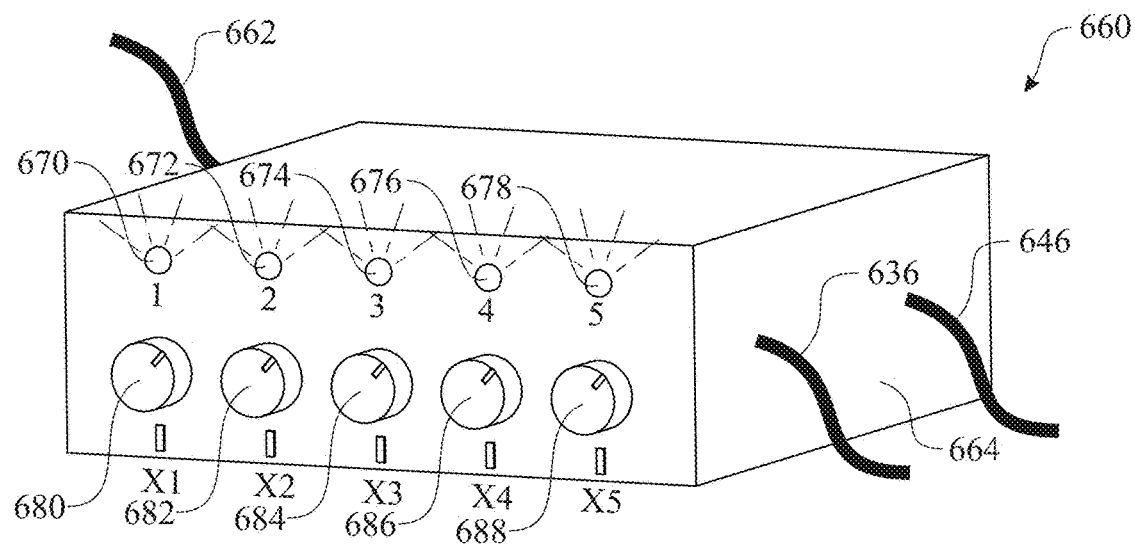
FIG. 23 presents an enlarged view of the power optimizing controller introduced in FIG. 22.

The power control module 660 is integrated into the wind operated electrical power generating system 600 to optimize or maximize electric output. Details of the power control module 660 are provided in FIG. 23. Integration of the power control module 660 is illustrated in an exemplary schematic diagram shown in FIG. 24.

The power control module 660 includes a circuit that monitors the rotational speed of either or both of the hydraulic motor shaft 632 and electric generator shaft 642 using the hydraulic motor shaft rotational speed sensor 634 and/or the electric generator shaft rotational speed sensor 644. The circuit includes a microprocessor, a digital memory device, at least one rotational speed indicator and at least one potentiometer (variable resistor) 680, 682, 684, 686, 688, wherein each of the at least one potentiometer (variable resistor) 680, 682, 684, 686, 688 is associated with a respective rotational speed indicator 670, 672, 674, 676, 678 of the at least one rotational speed indicator 670, 672, 674, 676, 678. The rotational speed indicator can be any suitable alert, including an audible alert, a visual alert, a transmitted message, a tactile alert, and the like, and any combination thereof. The audible alert can be a continuous audible signal, a cyclical or pulsed audible signal, a siren, and the like. The visual alert can be a continuously illuminated light, a flashing light, a light changing color, and the like. The light can be a Light Emitting Diode (LED), an incandescent bulb, a fluorescent bulb, and the like. A transmitted message can be a text message, an email, a broadcast message, an audible or recorded message, an audible message transmitted to a cellular phone, and the like.

Each employed rotational speed sensor 634, 644 is in signal communication with the microprocessor by any suitable communication element, including hardwired, wireless, magnetic communication, and the like, and any combination thereof. As the rotational speed of the shafts 632, 642 approach a predetermined rotational speed, the associated rotational speed indicator 670, 672, 674, 676, 678 changes state to alert an individual monitoring the system. The individual monitoring the system would subsequently adjust the associated potentiometer (variable resistor) 680, 682, 684, 686, 688 to optimize the electric power output. Each of the rotational speed indicators 670, 672, 674, 676, 678 is associated with a specific predetermined rotational speed. It is understood that the predetermined rotational speed can be programmable, adjustable, or automatically determined by an algorithm programmed into the microprocessor/memory. The change in resistance is conveyed through the power control module electrical communication link 662. It is understood that any suitable circuitry can be employed to introduce the variable resistance from the associated potentiometer (variable resistor) 680, 682, 684, 686, 688 into the electric circuit of the electric generator 640 and/or the grid tie 650, such as integration of a transformer 690. Although the exemplary power control module 660 presents a manual implementation, it is understood that the process can be automated.

Figure 24:
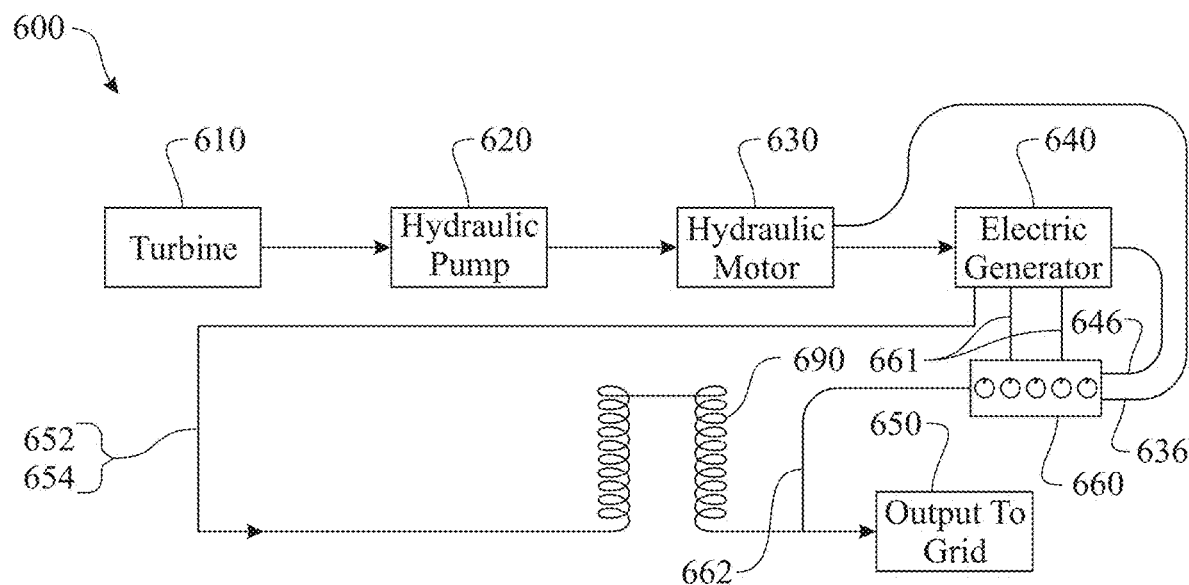
FIG. 24 presents an exemplary schematic diagram illustrating operational interactions between various components of the exemplary wind operated electrical power generating system introduced in FIG. 22.

The exemplary schematic diagram shown in FIG. 24 additionally illustrates the interaction between each of the primary components, as previously described herein.

The exemplary wind operated electrical power generating system 800 can be referred to as a horizontal axis wind turbine (HAWT). Horizontal axis wind turbines (HAWTs) play a vital role in the development of renewable energy. Their aerodynamic characteristics are receiving extensive focus to optimize the efficiency of the wind turbine. Unsteady inflow and blade oscillations are the primary causes of unsteady loads on wind turbine blades, including dynamic stall. For example, gust, yaw misalignment, wind shear, and tower shadow can cause notable fluctuations in the effective angle of attack (AOA) of the blades. Moreover, the leading edge and trailing edge windward under parked conditions can reduce the load, but they may also cause dynamic stall at large AOA. So with a specific combination of large AOA as well as unsteady change of AOA, the massive flow separation occurs, referred to as dynamic stall. The angle of attack in conjunction with the wind velocity defines the amount of lift. The aerodynamic hysteresis and the complex motion of the separation vortex introduce significant nonlinear and unsteady aerodynamic forces, causing load changes, power abnormalities and even blade flutter. The condition referred to as serve dynamic stall can reduce the annual energy production of wind turbines. Additionally, as the size of wind turbines becomes larger, such as the wind operated electrical power generating system 800, the dynamic stall has an increasing impact on the efficiency of the blades. This leads to the necessity of one or more systems to calculate, predict, and manage a rotational speed of the turbine blade subassembly 814 based upon the operating criteria to avoid stall and optimize the power generation.

Figure 25:
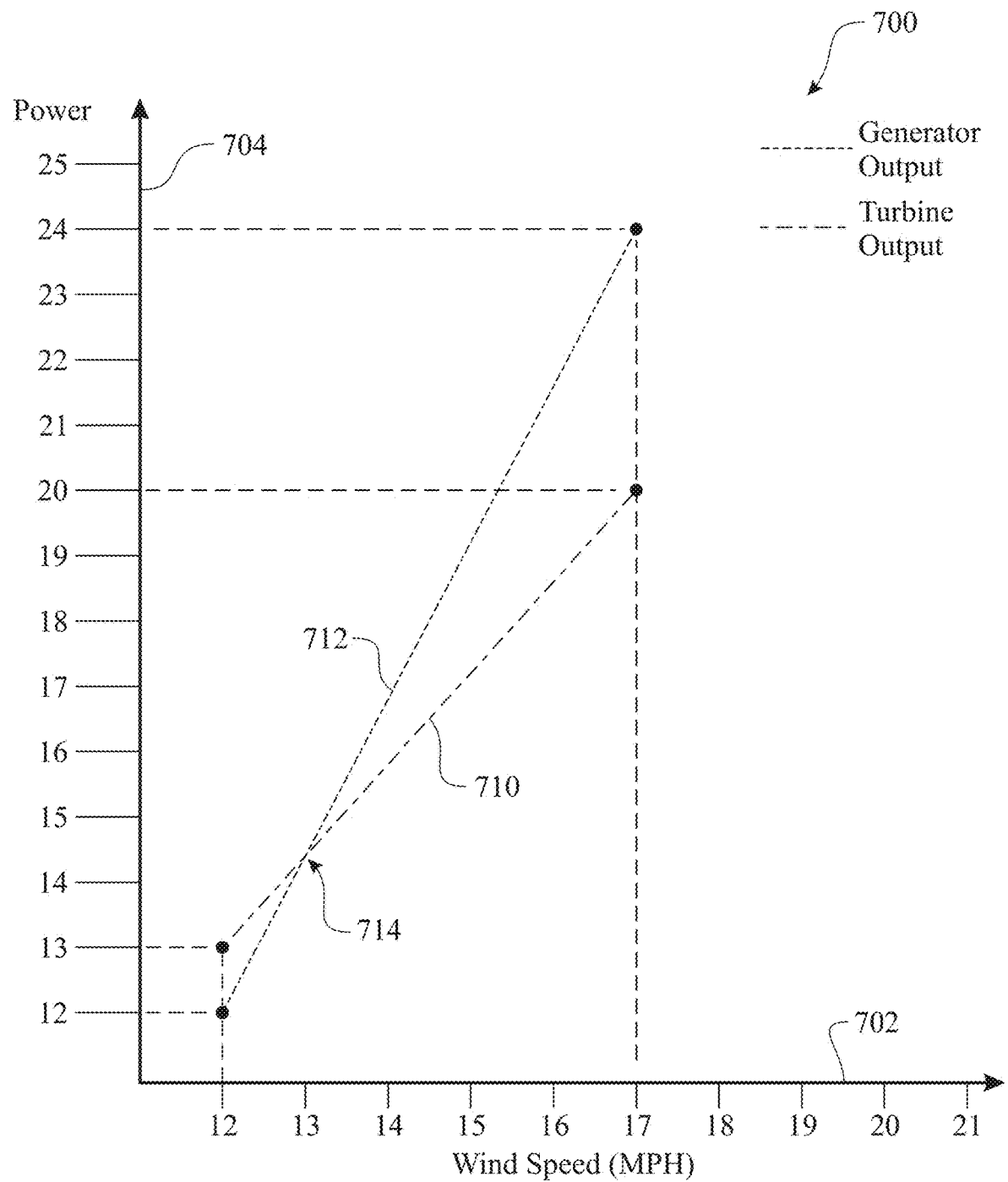
FIG. 25 presents an exemplary power output chart illustrating a power output to rotational speed relationship.

An exemplary power output chart 700 is presented in FIG. 25. The power output chart 700 plots a power output based upon a rotational speed of each of a generator (illustrated as a turbine theoretical output power curve 710) and a wind turbine (illustrated as a generator theoretical output power curve 712). The rotational speed of the associated element is referenced along a rotational speed axis 702. The output power of the associated element is referenced along a power output axis 704. The power output of the generator increases at a greater rate compared to the output of the turbine. The speed in which the generator theoretical output power curve 712 crosses over the turbine theoretical output power curve 710 defines a stall point 714. It is desired to optimize the electric power output by the generator, wherein the electric power output by the generator remains slightly below the power output by the turbine.

Figure 26:
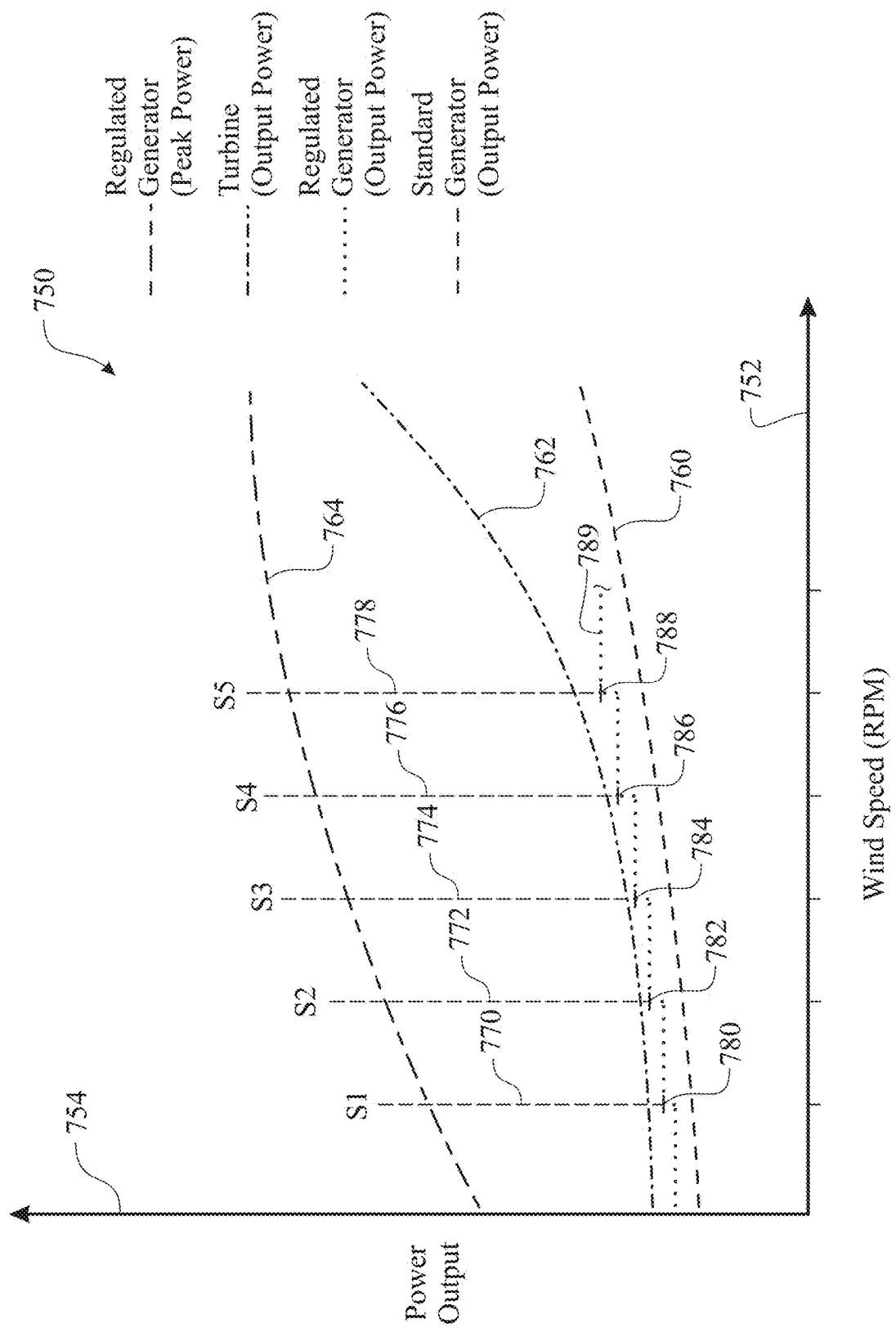
FIG. 26 presents an exemplary power output chart illustrating benefits of the power optimizing controller introduced in FIG. 22.

An exemplary power output chart 750 is presented in FIG. 26 by plotting a power output (that is associated with a wind velocity. The wind or associated rotational speed is referenced along a wind velocity generated RPM axis 752. The output power of the associated element is referenced along a power output axis 754.

The current technology employs a generator that has a lower output than the power captured by the wind operated turbine assembly 610. The infrastructure is configured in this manner to avoid overpowering the turbine, where a larger or excessive generator would overdrive the turbine. Alternatively stated, if the power extracted from the wind operated turbine assembly 610 is greater than the 100% of the power allowed by the wind operated turbine assembly 610, the wind operated turbine assembly 610 stalls. Therefore, it had been established that the generators should remain below the stall point of the associated turbine 610. This principle was understood to be a fundamental requirement, thus limiting the power output to the maximum capabilities of the currently utilized generators. An exemplary input, or power captured by the wind operated turbine assembly 610, is represented by a turbine power curve 762. The associated power output using currently deployed generators is represented by a current generator curve 760. The vertical gap between the turbine power curve 762 and the current generator curve 760 depicts losses.

Conversely, implementation of a larger generator in conjunction with the power control module 660 enables optimization of the power output while avoiding overpowering or governing the wind operated turbine assembly 610. The associated power output using a regulated generator is represented by a regulated generator curve 764, wherein the regulated generator creates excessive power or power greater than the power obtained by the turbine 610. Power optimization is accomplished by introducing a variable resistance into the electric network. The process is further optimized by monitoring for predetermined rotational speeds 770, 772, 774, 777, 778 of the electric generator 640 (or calibrated to determine an associated rotational speed) and adjusting the resistance accordingly by adjusting an associated potentiometer (variable resistor) 680, 682, 684, 686, 688. The goal is to maintain or govern a power output, identified as an adjusted power output 780, 782, 784, 786, 788 at a level slightly less than the power obtained by the wind operated turbine assembly 610. The power output chart 750 illustrates the small gap between each adjusted power output point 780, 782, 784, 786, 788 and the associated curve of the turbine power curve 762. The power output remains constant, independent of the speed of rotation of the turbine blade assembly 614, as illustrated by the regulated power output curve 789. The resulting regulated power output curve 789 has a step curve shape. The exemplary power output chart 750 illustrates the additional electric power output at each respective rotational speed 770, 772, 774, 777, 778 compared to the power output from the standard generator 760. The gap parallel to the power output axis 754 between each adjusted power output level 780, 782, 784, 786, 788 and the associated power output level of the standard generator 760 defines the increase in power output, based upon the same energy created by the wind operated turbine assembly 610. Those skilled in the art would understand that the number of predetermined rotational speeds 770, 772, 774, 777, 778 and the number of associated potentiometer (variable resistor) 680, 682, 684, 686, 688 can vary based upon the characteristics and engineering of the system.

In operation, as the rotational speed approaches each predetermined rotational speed, the respective rotational speed indicator 670, 672, 674, 676, 678 converts to a notification state. The service person adjusts the associated potentiometer (variable resistor) 680, 682, 684, 686, 688 to optimize the power output to the desired level of slightly lower than the turbine power curve 762. The associated potentiometer (variable resistor) is in electrical communication 561 with the electric generator 560, providing a varied resistance or load to the electric generator 560. The increased load acts as a brake and decreases the rotational speed of the turbine blade subassembly 614. By varying the electric load, the rotational speed of the turbine blade subassembly 614 changes to optimize the power generated across many different bands of rotational speeds.

Although the exemplary embodiment integrates a controller 660 into a system employing a hydraulically driven system, it is understood that the power control module 660 can be integrated into any system employing a wind driven turbine used to power an electric generator.

Figure 27:
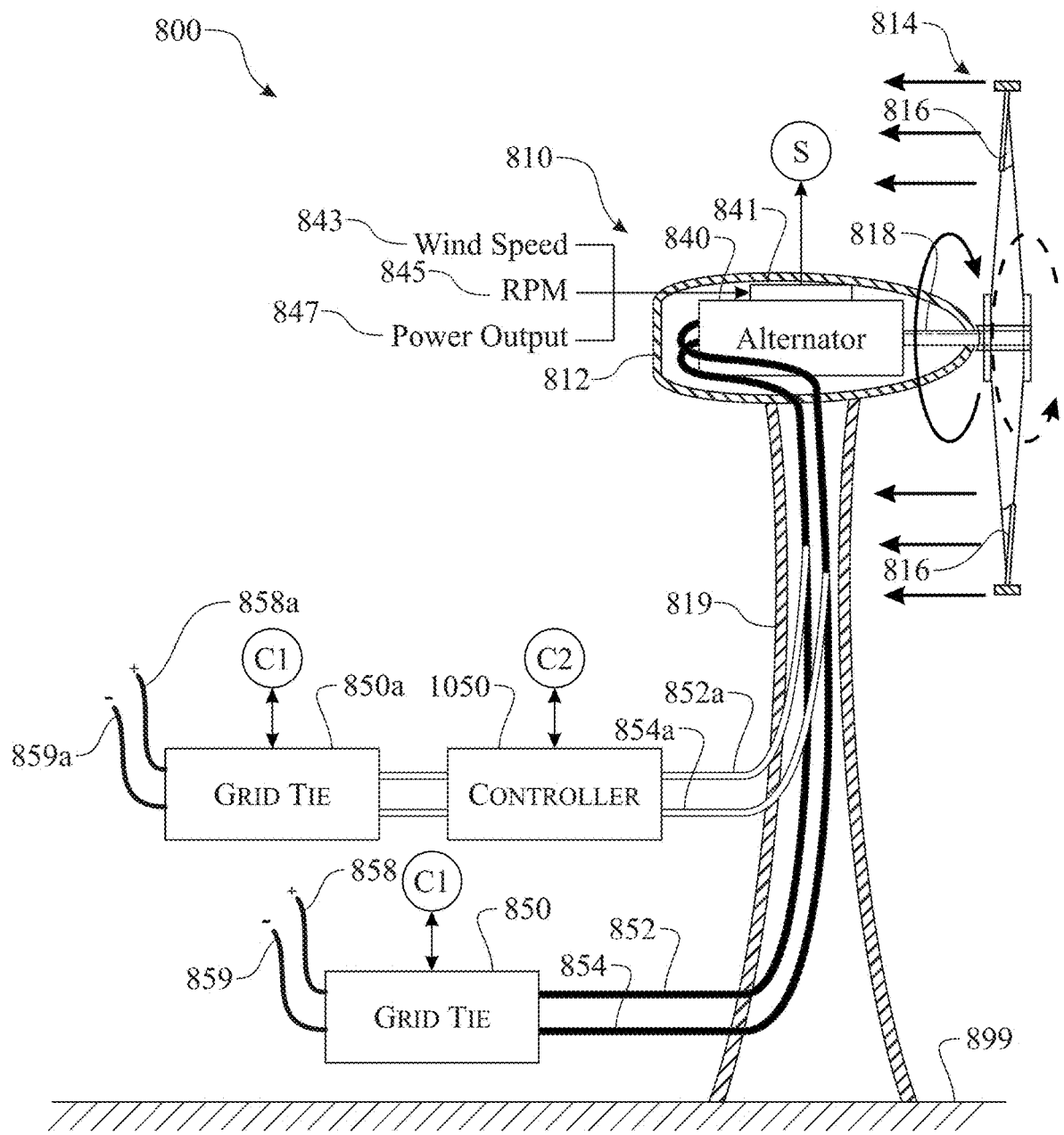
FIG. 27 presents a partially sectioned view of an exemplary wind operated electrical power generating system employing a power optimizing controller.

A wind operated electrical power generating system 800, illustrated in FIG. 27, presents a more conventional arrangement of a wind operated electrical power generating system. The wind operated electrical power generating system 800 and the wind operated electrical power generating system 600 include a large number of like elements. Like elements of the wind operated electrical power generating system 600 and the wind operated electrical power generating system 800 are numbered the same, where the elements of the wind operated electrical power generating system 600 are preceded by the numeral "6" and elements of the wind operated electrical power generating system 800 are preceded by the numeral "8". The distinctions between the wind operated electrical power generating system 600 and the wind operated electrical power generating system 800 are described below.

The wind operated electrical power generating system 800 employs a turbine blade subassembly 814 to mechanically drive an electrical power generating machine 840. The turbine blade subassembly 814 rotates a turbine blade subassembly shaft 818. The rotation of the turbine blade subassembly shaft 818 can directly rotate a like shaft of an electrical power generating machine 840 or utilize a gear set or a transmission to drive the shaft of the electrical power generating machine 840. A sensor system 841 is employed to obtain various operating parameters of the wind operated electrical power generating system 800, including but not limited to a wind velocity sensor 843, an electrical power generating machine rotational speed sensor 845, a power output sensor 847 and the like. The sensor system 841 can include a communication circuit for conveying the acquired operating parameters to a wind velocity-load chart for wind turbine arrangement 900 (introduced in FIG. 28).

Electrical power generated by the electrical power generating machine 840 is transferred to a grid via a positive electrical output cable 852 and a negative electrical output cable 854, which transfer the electrical power from the electrical power generating machine 840 to a grid tie 850. The power is then injected into the power grid via a positive power grid electrical connection 858 and a negative power grid electrical connection 859. Although the exemplary illustrations present a positive power grid electrical connection 858 and a negative power grid electrical connection 859, it is understood that any suitable electrically conductive arrangement can be utilized, including, but not limited to, a three phase arrangement.

Figure 31:
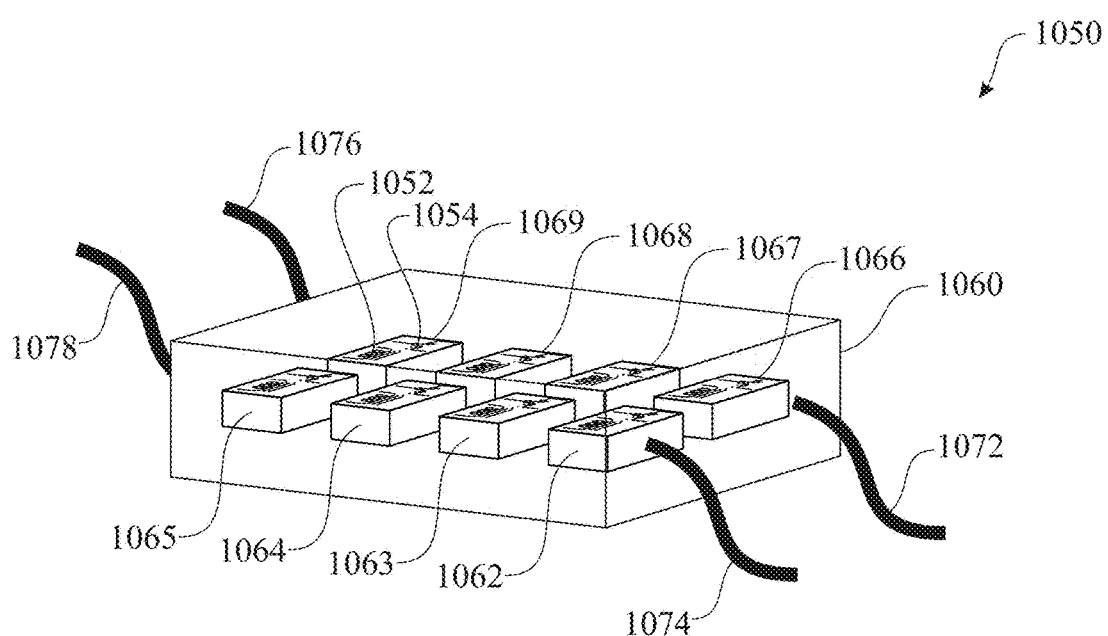
FIG. 31 presents a transparent isometric view of an exemplary load applying arrangement that operates in conjunction with the power optimizing controller that operates based upon the chart illustrated in FIG. 27.

In an alternative arrangement, electrical power generated by the electrical power generating machine 840 is transferred to a grid via a positive electrical output cable 852*a* and a negative electrical output cable 854*a*, which transfer the electrical power from the electrical power generating machine 840 to a loading controlled grid tie 850*a* via a efficiency management system load management subsystem 1050 (detailed in FIG. 31). The efficiency management system load management subsystem 1050 manages a loading applied to the system, where the loading optimizes the efficiency of the turbine blade subassembly 814 respective to wind velocity. The power is then injected into the power grid via a positive power grid electrical connection 858*a* and a negative power grid electrical connection 859*a*.

Although the exemplary embodiments are directed towards a wind powered system, it is understood that the same power optimization system can be applied to a water driven turbine system.

Figure 28:
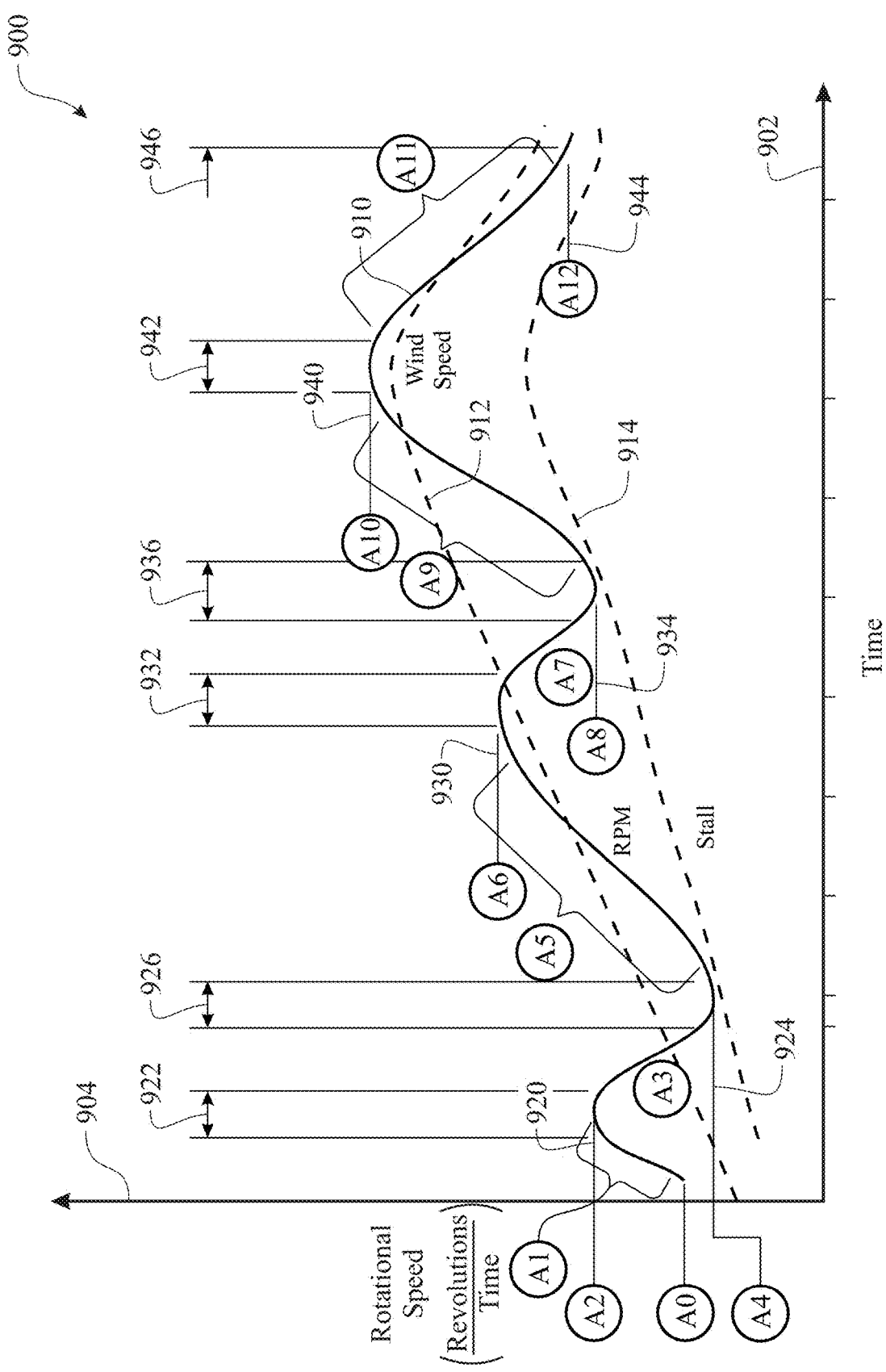
FIG. 28 presents a chart illustrating effects of applying a load to a wind turbine to optimize efficiency during varying wind velocities for use with the power optimizing controller introduced in FIG. 27.
Figure 29:
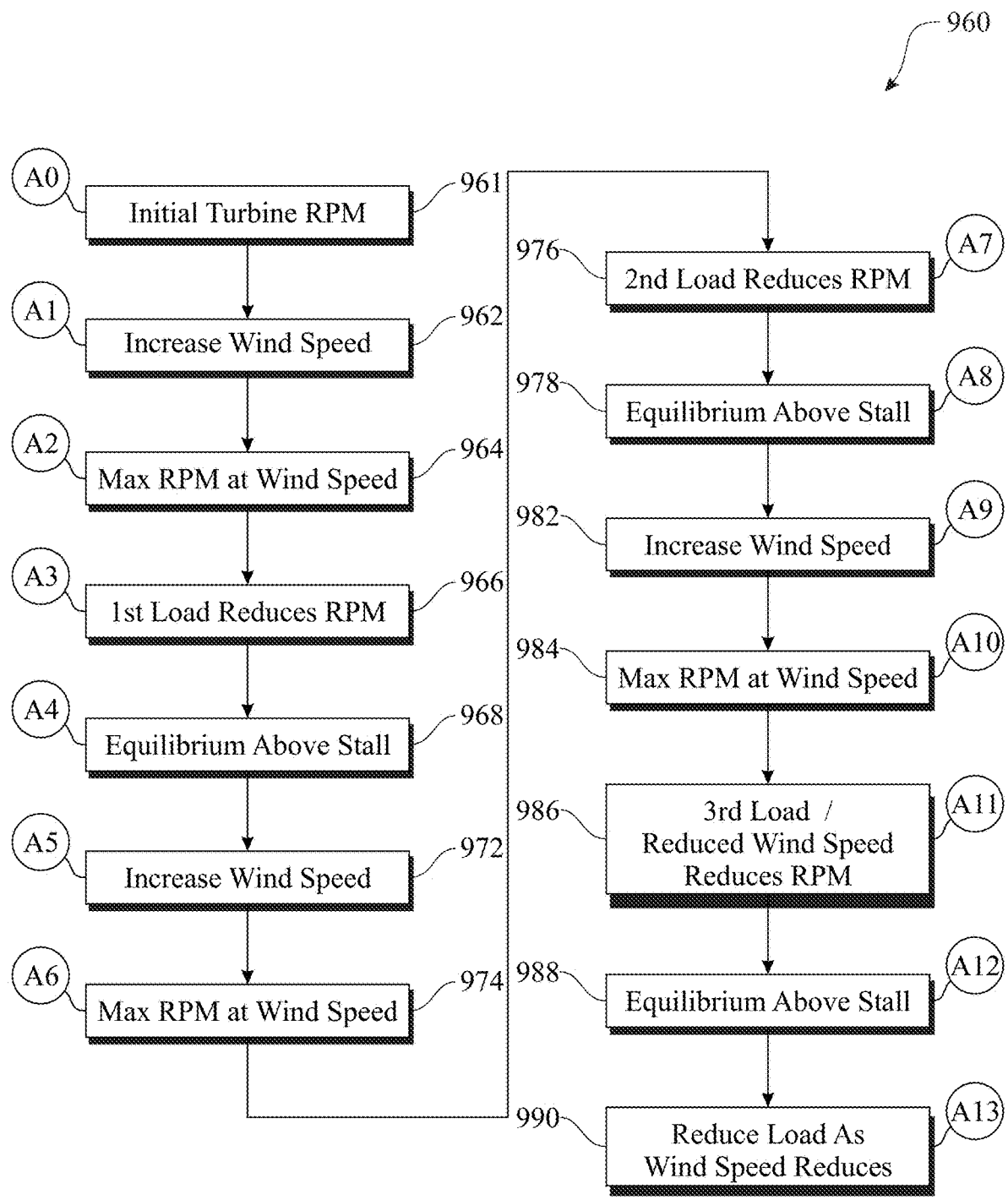
FIG. 29 presents an exemplary flow diagram illustrating steps associated with a wind turbine optimization process.

The efficiency of the wind operated electrical power generating system 600 and the wind operated electrical power generating system 800 can be optimized by applying and removing loads at various operating conditions, as illustrated in a wind velocity-load chart for wind turbine arrangement 900 presented in FIG. 28 in conjunction with the wind turbine optimization process 960 illustrated in FIG. 29.

Figure 30:
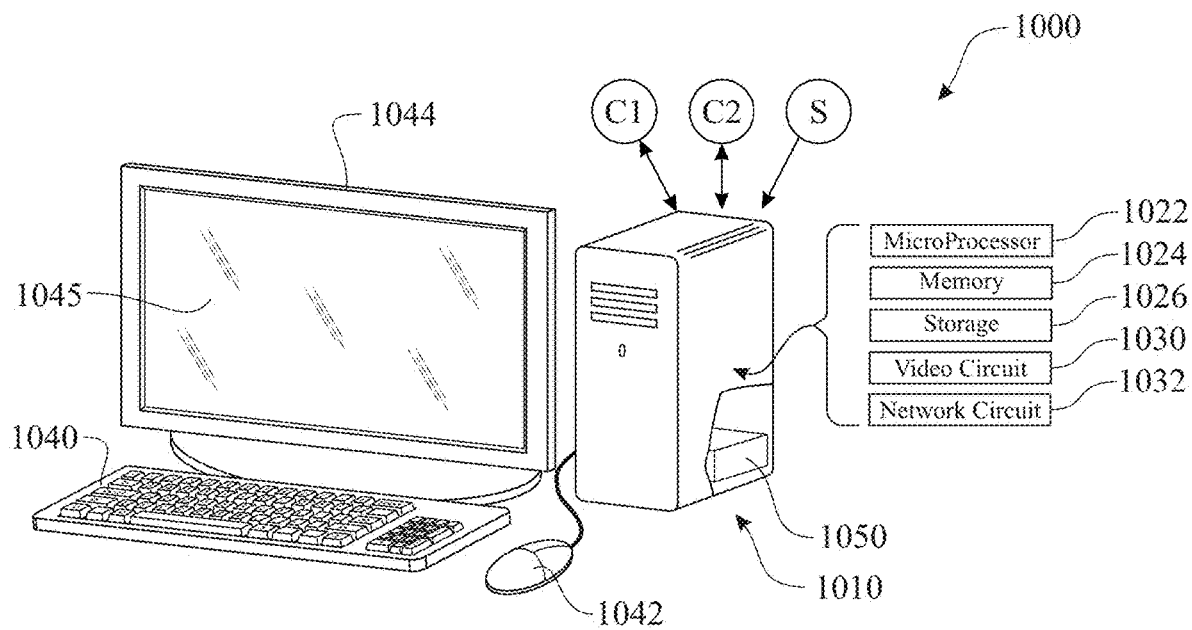
FIG. 30 presents a partially sectioned isometric view of an exemplary power optimizing controller that operates based upon the chart illustrated in FIG. 27.

Implementation of the wind velocity-load chart for wind turbine arrangement 900 upon the wind operated electrical power generating system 600 and the wind operated electrical power generating system 800 is accomplished by using an efficiency management system 1000, introduced in FIG. 30. The efficiency management system 1000 includes an efficiency management system computer 1010. The efficiency management system computer 1010 can be any suitable computing device which is characterized by an inclusion of a microprocessor 1022, a memory 1024 in signal communication with the microprocessor 1022, and a digital storage device 1026 in signal communication with the microprocessor 1022. In addition to basic computing devices, the efficiency management system 1000 preferably includes a video circuit 1030 in signal communication with the microprocessor 1022, and a communication or network circuit 1032 in signal communication with the microprocessor 1022. The communication or network circuit 1032 enables communication between the efficiency management system computer 1010 and the sensor system 841, the grid communication link C1, and the controller communication link C2. Power would be provided to the efficiency management system 1000 using any suitable power source, including power supplied from the wind velocity-load chart for wind turbine arrangement 900, the power supplied from the grid, a portable power supply (such as an uninterrupted power supply (UPS), a battery, etc.), a generator and the like.

The efficiency management system computer 1010 communicates with the user via any suitable user interface or interfaces. Examples illustrated include a keyboard 1040, a pointer device 1042, and a monitor 1044 having a monitor display 1045. The keyboard 1040 can be a wired keyboard, a wireless keyboard, or a virtual keyboard. The keyboard can be provided in any arrangement. The pointer device 1042 can be any pointer device, including a mouse, a trackball, a track pad, a pen and tablet, or any other suitable pointing device. The monitor 1044 can include a standard display or a touch screen display. In an arrangement where the monitor 1044 is a touch screen, the efficiency management system computer 1010 can include or exclude the keyboard 1040 and/or the pointer device 1042.

An efficiency management system load management subsystem 1050 is in signal communication between the efficiency management system computer 1010 and the wind operated electrical power generating system 800. The efficiency management system load management subsystem 1050 can be arranged as a separate component or integrated into the efficiency management system computer 1010 as illustrated in FIG. 30. The efficiency management system load management subsystem 1050 includes a series of relays 1062, 1063, 1064, 1065, 1066, 1067, 1068, 1069 that provide an electrical load. The electrical load can be adjusted by changing the number of activated relays 1062, 1063, 1064, 1065, 1066, 1067, 1068, 1069. Each relay 1062, 1063, 1064, 1065, 1066, 1067, 1068, 1069 includes an electromagnetic coil 1052 operated by a switch 1054. Each relay may be arranged to introduce or remove an electrical resistor or any other electrical element from the circuit, where the introduction of the electrical element would impact the rotational rate of the turbine blade subassembly 814 as well as the electrical power generated by the electrical power generating machine 840. In an alternative arrangement, the relay can operate a resistor. The efficiency management system load management subsystem 1050 can be integral with the efficiency management system computer 1010 (as shown in FIG. 30), packaged within an efficiency management system load management subsystem enclosure 1060 (as shown in FIG. 31), or both (where the subassembly as illustrated in FIG. 31 is installed within the efficiency management system computer 1010).

A first portion of a load circuit is provided to the efficiency management system load management subsystem 1050 via a positive input conductor 1072 and a negative input conductor 1074 (or any suitable electrically conductive arrangement). The load is introduced to the load circuit and the load circuit is completed via a positive output conductor 1076 and a negative output conductor 1078 (or any suitable electrically conductive arrangement).

The loading is determined based upon operating conditions of the wind velocity-load chart for wind turbine arrangement 900. The goal is to maintain a rotational speed of the turbine blade subassembly 814 at a rate that is slightly above stall 914. Stall is a condition where the turbine blade subassembly 814 experiences a sudden reduction in the lift generated by the aerofoil shape of the turbine blade 816 when the critical angle of attack is reached or exceeded. The angle of attack is the angle at which relative wind meets the aerofoil. The angle of attack is the angle formed by the chord CH of the aerofoil and the direction of the relative wind or the vector representing the relative motion between the turbine blade subassembly 814 and the direction of the wind.

Details of a process of optimizing the wind operated electrical power generating system 800 are provided by the wind velocity-load chart for wind turbine arrangement 900 illustrated in FIG. 28 and the respective wind turbine optimization process 960 presented in FIG. 29. The wind velocity-load chart for wind turbine arrangement 900 provides a visual representation of a process for optimizing an efficiency of the wind velocity-load chart for wind turbine arrangement 900. The wind velocity-load chart for wind turbine arrangement 900 operates at optimal efficiency where the turbine blade subassembly 814 is rotating at a rotational rate that is approximately near a stall. A load is applied to a circuit associated with the electrical power generating machine 840, where when the load is applied to the circuit, the load causes a reduction in a rotational rate of the turbine blade subassembly 814. When the turbine blade subassembly 814 is subjected to an excessive load level, the wind would not be sufficient to rotate the turbine blade subassembly 814. When the turbine blade subassembly 814 is subjected to an insufficient load level, the turbine blade subassembly 814 would rotate at an excessively high rotational rate, which can cause overheating of the electrical power generating machine 840, prematurely wear bearings of the turbine blade subassembly 814 and/or the electrical power generating machine 840, excessive stress on the turbine blades 816 and the remaining components of the turbine blade subassembly 814, and the like.

The wind velocity-load chart for wind turbine arrangement 900 presents a revolutions per minute (rotational speed) 910 of the turbine blade subassembly 814, a wind velocity 912 of a wind subjected to the turbine blade subassembly 814, and a stall speed 914 of the turbine blade subassembly 814 based upon a respective wind velocity 912. The curves are placed upon a chart having a time axis 902 along a horizontal axis and a wind velocity axis 904 along a vertical axis. It is noted that the rotational speed and the stall speed (also a rotational speed) parallel the wind velocity axis 904, where the lower values are near the origin and the values increase as the distance from the origin increases.

Use of the wind operated electrical power generating system 800 initiates at an initial turbine rotational speed 961 identified by marker A0 accordingly. The turbine blade subassembly 814 would be rotating at a constant rate that is slightly above the stall speed 914 at a respective wind velocity 912. The wind velocity 912 includes a wind velocity and can include a wind direction, where the wind direction may be defined by cardinal directions (referenced geographical or using true north) or respective to an orientation of the turbine blade subassembly 814. As a wind velocity 912 increases (increase in wind velocity (step 962)) (marker A1), the revolutions per minute (rotational speed) 910 of the turbine blade subassembly 814 also increases. As the revolutions per minute (rotational speed) 910 increases, the revolutions per minute (rotational speed) 910 reaches an undesirable revolutions per minute (rotational speed) 910 or maximum desired rotational speed at wind velocity (step 964) (marker A2), the efficiency management system computer 1010 directs the efficiency management system load management subsystem 1050 to apply a determined quantity of a load. Marker A2 identifies a first maximum desired rotational rate at wind velocity 920. The quantity of load would be determined based upon the wind velocity 912 and a calculated stall speed 914 based upon the wind velocity 912. The efficiency management system computer 1010 would calculate a quantity of load to reduce the revolutions per minute (rotational speed) 910 of the turbine blade subassembly 814 to a rate that is slightly above the stall speed. The calculations can be accomplished using past data, calculations, and/or artificial intelligence. As the calculated quantity of load is applied to the circuit, the rotational speed of the turbine blade subassembly 814 exhibits a first load application transition period 922. Once the quantity of load is applied, the rotational speed of the turbine blade subassembly 814 is reduced in accordance with an introduced 1st load reduces rotational speed (step 966) (marker A3). It is noted that the wind velocity 912 remains the same, while the revolutions per minute (rotational speed) 910 is reduced. The revolutions per minute (rotational speed) 910 would be reduced to a rotational speed that is slightly above stall speed 914 in accordance with rotational speed reaches equilibrium above stall (step 968) (marker A4). Marker A4 identifies a first target minimal rotational rate at wind velocity to induce load 924. As the rotational speed of the turbine blade subassembly 814 reaches equilibrium between the newly applied increased loading and the currently increasing wind velocity 910 (at the rotational rate that is slightly above stall) the rotational rate of the turbine blade subassembly 814 would transition from a braking to an acceleration (first minimum rotational rate transition period 926), again beginning to increase the rotational rate 910.

In the exemplary wind velocity-load chart for wind turbine arrangement 900, the wind velocity 912 continues to increase (increase in wind velocity (step 972)) (marker A5). As a wind velocity 912 continues to increase (increase in wind velocity (step 972)) (marker A5), the revolutions per minute (rotational speed) 910 of the turbine blade subassembly 814 also increases. As the revolutions per minute (rotational speed) 910 increases, the revolutions per minute (rotational speed) 910 (already restrained by a 1st applied load) again approaches an undesirable revolutions per minute (rotational speed) 910 or maximum desired rotational speed at wind velocity (step 974) (marker A6), the efficiency management system computer 1010 directs the efficiency management system load management subsystem 1050 to apply an increased determined quantity of a load. Marker A6 identifies a second maximum desired rotational rate at wind velocity 930. The increased quantity (or second total) of load would be determined based upon the wind velocity 912 and a calculated stall speed 914 based upon the wind velocity 912. The efficiency management system computer 1010 would calculate an increased quantity (or second total) of load to, again, reduce the revolutions per minute (rotational speed) 910 of the turbine blade subassembly 814 to a rate that is slightly above the stall speed based upon the current wind velocity 912. The calculations for the new, increased load can be accomplished using past data, calculations, and/or artificial intelligence. As the calculated increasing quantity of load is applied to the circuit, the rotational speed of the turbine blade subassembly 814 exhibits a second load application transition period 932. Once the quantity of load is applied, the rotational speed of the turbine blade subassembly 814 is reduced in accordance with an introduced 2nd load reduces rotational speed (step 976) (marker A7). It is noted that the current wind velocity 912 remains the same, while the revolutions per minute (rotational speed) 910 is again reduced. The revolutions per minute (rotational speed) 910 would be reduced to a rotational speed that is slightly above stall speed 914 in accordance with rotational speed reaches equilibrium above stall (step 978) (marker A8). Marker A8 identifies a second target minimal rotational rate at wind velocity to induce load 934. As the rotational speed of the turbine blade subassembly 814 again reaches equilibrium between the newly applied increased loading and the continued increasing wind velocity 910 (at the rotational rate that is slightly above stall) the rotational rate of the turbine blade subassembly 814 would transition from a braking to an acceleration (second minimum rotational rate transition period 936), again beginning to increase the rotational rate 910.

The exemplary wind velocity-load chart for wind turbine arrangement 900 illustrates a scenario where the process is repeated a third time, where the wind velocity 912 continues to increase (increase in wind velocity (step 982)) (marker A9). As a wind velocity 912 continues to increase 982 (marker A9), the revolutions per minute (rotational speed) 910 of the turbine blade subassembly 814 also increases. As the revolutions per minute (rotational speed) 910 increases, the revolutions per minute (rotational speed) 910 (already restrained by a 2nd applied load) again approaches an undesirable revolutions per minute (rotational speed) 910 or maximum desired rotational speed at wind velocity (step 984) (marker A10), the efficiency management system computer 1010 directs the efficiency management system load management subsystem 1050 to apply an additional increased determined quantity of a load. Marker A10 identifies a third maximum desired rotational rate at wind velocity 940. The additional increased quantity (or second total) of load would be determined based upon the wind velocity 912 and a calculated stall speed 914 based upon the wind velocity 912. The efficiency management system computer 1010 would calculate an increased quantity (or second total) of load to, again, reduce the revolutions per minute (rotational speed) 910 of the turbine blade subassembly 814 to a rate that is slightly above the stall speed based upon the current wind velocity 912. The calculations additionally take into account a predicted future wind velocity 912. The predicted future wind velocity 912 is based upon a recent history of the wind velocity 912.

The calculations for the new, increased load can be accomplished using past data, calculations, and/or artificial intelligence. As the calculated increasing quantity of load is applied to the circuit, the rotational speed of the turbine blade subassembly 814 exhibits a third load application transition period 942. During the third load application transition period 942, the efficiency management system 1000 recognizes that the wind velocity 912 is changing from an increasing rate to a decreasing rate. Once the quantity of load is applied, the rotational speed of the turbine blade subassembly 814 is reduced in accordance with a third minimum rotational rate transition period 946 (introduced 3rd load reduces rotational speed (step 986)) (marker A11). It is noted that the current wind velocity 912 remains the same and is presenting signs of reducing an increase in speed or actually decreasing in speed, while the revolutions per minute (rotational speed) 910 is again reduced. This change is taken into account in the calculations used to determine an increase in loading as well as a consideration for time period before a subsequent analysis. The time period before a subsequent analysis might be reduced to ensure the proper load is provided into the circuit. In this exemplary scenario, as the rotational speed 910 is decreasing, the wind velocity 912 is also decreasing. The revolutions per minute (rotational speed) 910 would be reduced to a rotational speed that is slightly above stall speed 914 in accordance with rotational speed reaches equilibrium above stall (step 988) (marker A12). Marker A12 identifies a third target minimal rotational rate at wind velocity to induce load 944. In the exemplary wind velocity-load chart for wind turbine arrangement 900, the wind velocity 912 is reduced sufficiently at the rotational speed reaches equilibrium above stall (step 988) (marker A12) where the efficiency management system 1000 would consider and reduce the applied load to the circuit by deactivating the relays 1062, 1063, 1064, 1065, 1066, 1067, 1068, 1069 of the efficiency management system load management subsystem 1050, thus reducing the load as wind velocity reduces (step 990) (marker A13). The process would continue accordingly.

When the wind velocity 912 increases, the efficiency management system 1000 would analyze the conditions and determine whether to apply or increase a load to the circuit and when the wind velocity 912 decreases, the efficiency management system 1000 would analyze the conditions and determine whether to decrease any load applied to the circuit.

Although the exemplary wind velocity-load chart for wind turbine arrangement 900 and respective wind turbine optimization process 960 employs one or more loads applied to the circuit, it is understood that other implementations can be utilized. For example, the wind velocity-load chart for wind turbine arrangement 900 can modify an angle of attack of each turbine blade 816 using any suitable method, such as those described herein.

Figure 32:
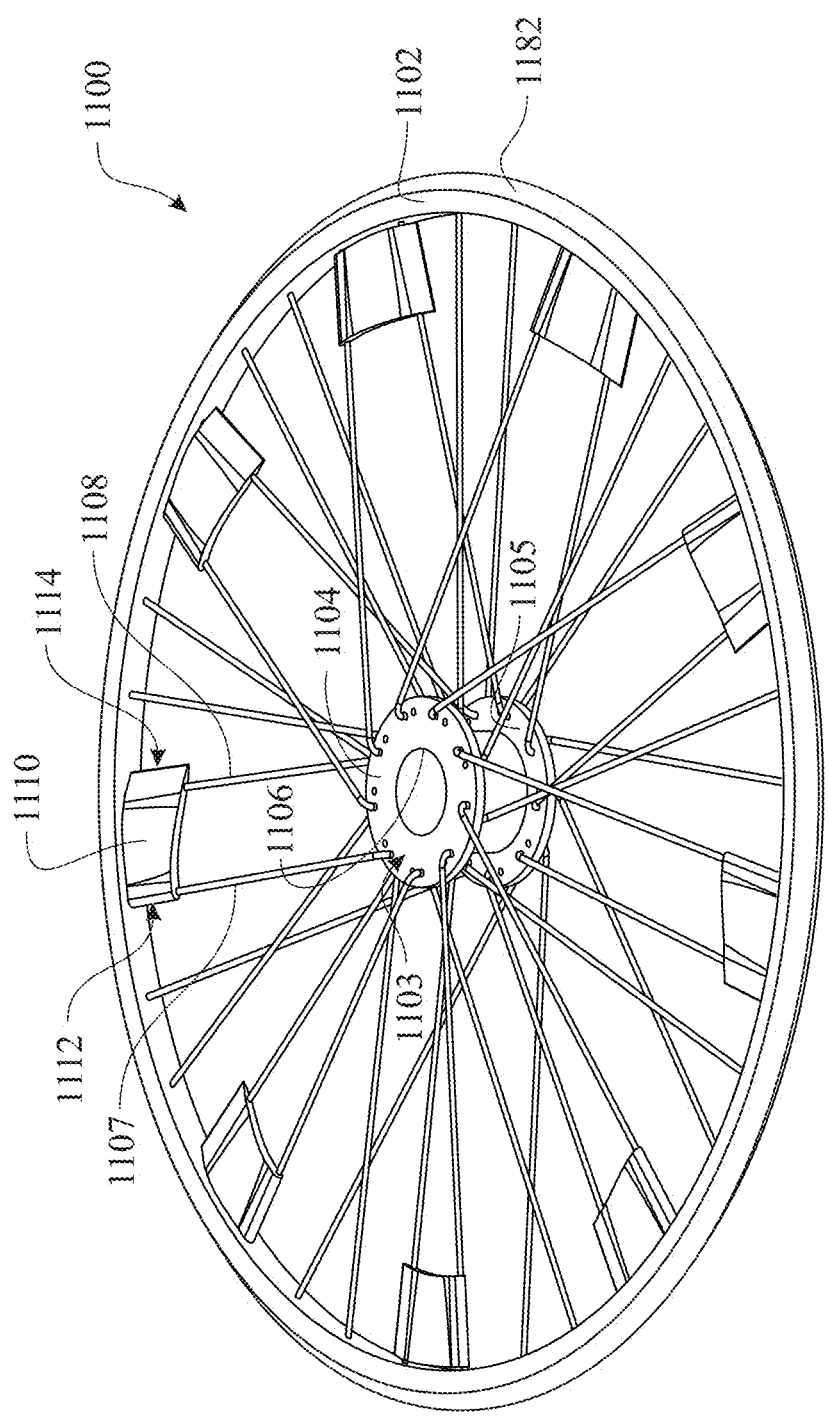
FIG. 32 presents an isometric view of an exemplary tension lifting wing wheel assembly.
Figure 33:
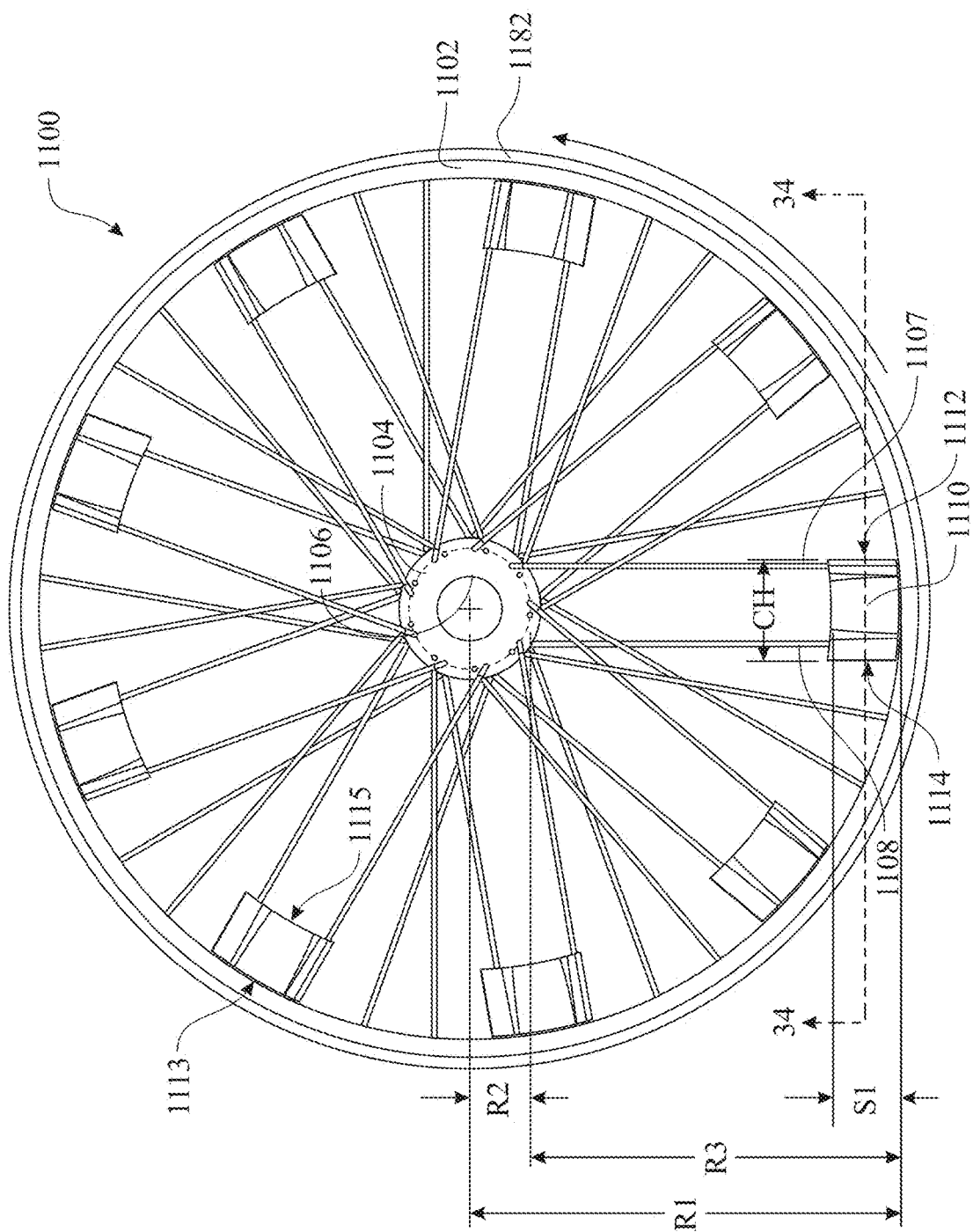
FIG. 33 presents a front view of the exemplary tension lifting wing wheel assembly originally introduced in FIG. 32.
Figure 34:
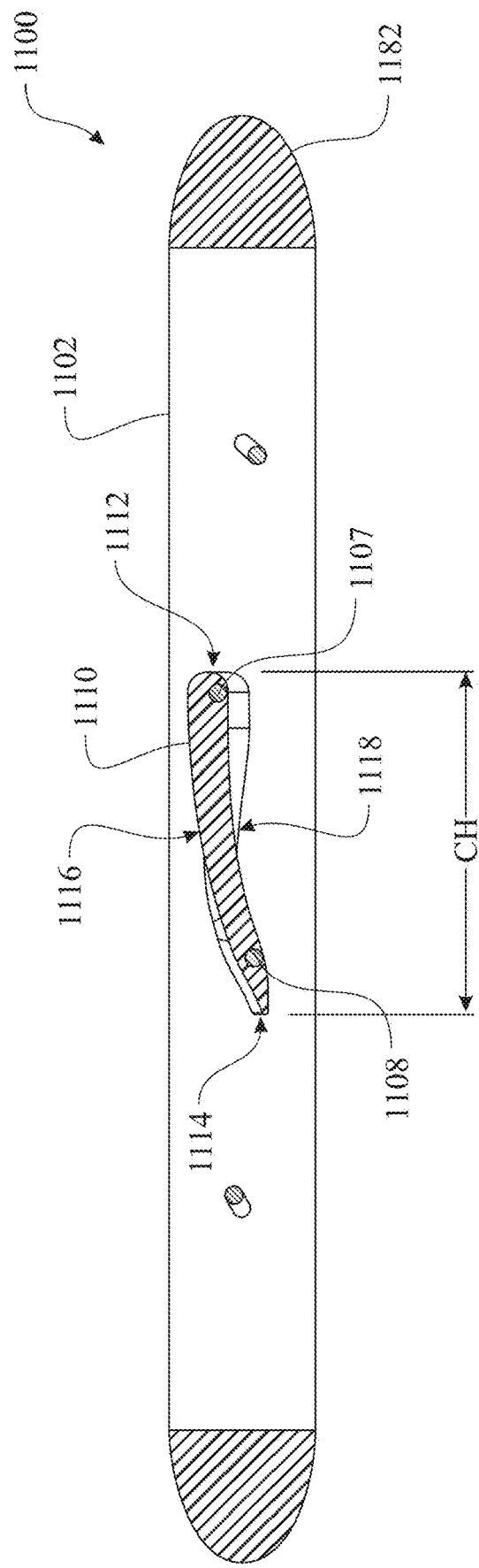
FIG. 34 presents a cross section view of the exemplary tension lifting wing wheel assembly originally introduced in FIG. 32, the section being taken along section line 34-34 of FIG. 33.

The turbine wheel assembly 100 can be modified and adapted for other applications. A tension airfoil turbine or lifting wing assembly 1100, illustrated in FIGS. 32 through 33, is an adaptation designed to provide lift. The tension airfoil turbine or lifting wing assembly 1100 and the turbine wheel assembly 100 comprise a number of like features. Like features of the tension airfoil turbine or lifting wing assembly 1100 and the turbine wheel assembly 100 are numbered the same except preceded by the numeral '8'. The tension airfoil turbine or lifting wing assembly 1100 is an assembly comprising a tension airfoil outer rim 1102 assembled to a tension airfoil central hub assembly 1103 by a series of spokes 1107, 1108. The tension airfoil central hub assembly 1103 includes a tension airfoil first central hub flange 1104 and a tension airfoil second central hub flange 1105 extending radially outward from opposite ends of an axle bearing 1106. The outer edge of the tension airfoil outer rim 1102 is preferably shaped having a tension airfoil outer rim aerodynamic surface 1182, as illustrated. The tension airfoil outer rim 1102 is designed having an internal radius R1. The central hub flanges 1104, 1105 are designed having an external radius R2. The hub external radius R2 is defined as a distance between the rotational axis of the hub 1106 and a ring defined by the centers of the spoke hub attachment holes or other spoke attachment features. A different between the radii R1 and R2 (R1–R2) defines an effective length (radial span of each spoke) R3 of each spoke 1107, 1108. The optimal design would include a R1 to R2 ratio of 6:1. The optimal ratio provides a configuration where the tension airfoil leading spoke 1107 and the tension airfoil trailing spoke 1108 are substantially parallel with one another and run parallel to a radial axis extending outward from a central point of the axle bearing 1106. Although the optimal ration is 6:1, it is recognized that the ratio can vary between 4:1 and 8:1.

As illustrated, a first end of each spoke 1107 is assembled to a respective central hub flange 1104, 1105 and a second end of each spoke is assembled to the outer rim 1102. A first spoke 1107 of the plurality of spokes 1107 is assembled to the respective central hub flange 1104, 1105 in an arrangement extending in an acute angular direction from a radial orientation in a first direction from a first side of the respective central hub flange 1104, 1105 and a second spoke 1107 of the plurality of spokes 1107 is assembled to the respective central hub flange 1104, 1105 in an arrangement extending in an acute angular direction from a radial orientation in a second direction from a second side of the respective central hub flange 1104, 1105. One spoke 1107 of the plurality of spokes 1107 attached to the respective central hub flange 1104, 1105 crosses at least one another spoke 1107 of the plurality of spokes 1107 attached to the same respective central hub flange 1104, 1105. Each airfoil 1110 of the series of airfoils 1110 is assembled to the tension airfoil assembly 1100 by coupling an area of the airfoil 1110 proximate the leading edge 1112 to a leading edge spoke 1107 of the plurality of spokes 1107 and by coupling an area of the airfoil 1110 proximate the trailing edge 1114 to a trailing edge spoke 1107 of the plurality of spokes 1107. In the exemplary illustrations, one spoke 1107 of the plurality of spokes 1107 attached to the respective central hub flange 1104, 1105 crosses at least two another spokes 1107 of the plurality of spokes 1107 attached to the same respective central hub flange 1104, 1105. This arrangement of the spokes dramatically increases the strength of the assembly. Radially arranged spokes are susceptible to non-radial forces and are known to bend, this reducing the integrity of the tension airfoil turbine or lifting wing assembly 1100. Conversely, having spokes 1107 arranged at acute angles from a radial orientation, and more so, having the first spoke 1107 of the plurality of spokes 1107 assembled to the respective central hub flange 1104, 1105 in an arrangement extending in the acute angular direction from the radial orientation in the first direction from the first side of the respective central hub flange 1104, 1105 and the second spoke 1107 of the plurality of spokes 1107 assembled to the respective central hub flange 1104, 1105 in the arrangement extending in the acute angular direction from the radial orientation in the second direction from the second side of the respective central hub flange 1104, 1105 provides an increase in strength when the tension airfoil turbine or lifting wing assembly 1100 is subjected to a force that is not in a radial direction respective to the tension airfoil outer rim 1102.

It is preferred that the airfoil 1110 be assembled to the tension airfoil turbine or lifting wing assembly 1100 having an airfoil outer edge 1113 being located proximate an inner surface of the tension airfoil outer rim 1102. Dimensions of the airfoil 1110 are defined by an airfoil span S1 and an airfoil chord CH. The airfoil span S1 refers to a distance between the airfoil outer edge 1113 and an airfoil inner edge 1115 of the airfoil 1110. The airfoil chord CH refers to a distance between the leading edge 1112 and the trailing edge 1114 of the airfoil 1110. The airfoil span S1 is preferably equal to or less than fifty percent (50%) of the effective length R3 of each spoke 1107, 1108. The airfoil span S1 is more preferably equal to or less than thirty three percent (33%) of the effective length R3 of each spoke 1107, 1108. The airfoil span S1 is even more preferably equal to or less than thirty percent (30%) of the effective length of each spoke 1107, 1108. The airfoil span S1 is even more preferably equal to or less than twenty-five percent (25%) of the effective length of each spoke 1107, 1108.

Other design features of the tension airfoil turbine or lifting wing assembly 1100 include:

a. Each spoke 1107, 1108 can cross other spokes defining three crossover locations.

b. The spokes 1107, 1108 can include a circular cross section shape, an aerodynamic cross section shape, or any other suitable cross section shape.

c. Spokes can be arranged to alternate between extending from an outer surface of each hub flange 1104, 1105 and from an inner surface of the same hub flange 1104, 1105.

d. It is preferred that the tension airfoil turbine or lifting wing assembly 1100 includes a total of 36 spokes, 18 per hub flange 1104, 1105. In an alternative, the tension airfoil turbine or lifting wing assembly 1100 can include any multiple of four (4) spokes per hub assembly 1103 or any multiple of two (2) spokes per hub flange 1104, 1105.

e. Each spoke 1107, 1108 would preferably be assembled having substantially equally tension.

f. The spoke hub attachment holes can be even spaced about the hub flange 1104, 1105. Alternatively, the spoke hub attachment holes can be arranged in pairs, wherein the pairs are arranged having a first spacing and each adjacent pair is arranged having a second spacing about the hub flange 1104, 1105, wherein the first spacing and the second spacing differ from one another.

g. The series of spoke hub attachment holes of the tension airfoil first central hub flange 1104 and the series of spoke hub attachment holes of the tension airfoil second central hub flange 1105 are offset from one another.

h. The axial height of the tension airfoil outer rim 1102 is determined by maximizing the desired strength of the tension airfoil outer rim 1102, while providing sufficient area to support a connection of each spoke 1107, 1108.

i. The attachment locations of each spoke 1107, 1108 along an interior surface of the tension airfoil outer rim 1102 are either linear with one another or located in an alternating configuration.

j. The tension airfoil central hub assembly 1103 is preferably substantially centered axially respective to the tension airfoil outer rim 1102. Alternatively, the tension airfoil central hub assembly 1103 can be offset axially respective to the tension airfoil outer rim 1102.

The tension airfoil turbine or lifting wing assembly 1100 includes a series of airfoils 1110. Each airfoil 1110 has an airfoil or lifting shape, where a length of an airfoil upper surface 1116, extending from an airfoil leading edge 1112 to an airfoil trailing edge 1114, is longer than a length of an airfoil lower surface 1118, extending from the airfoil leading edge 1112 to the airfoil trailing edge 1114. The airfoil upper surface 1116 is a preferably a convex surface. The airfoil lower surface 1118 is preferably a planar or a concave surface. The airfoil 1110 can be a solid assembly or hollowed to reduce weight. The airfoil 1110 can be of any suitable shape such as a Clarke airfoil shape. The exemplary airfoil 1110 is rectangular or square in shape. The airfoil leading edge 1112 preferably is formed having a rounded edge. The airfoil trailing edge 1114 preferably is formed having a tapering edge. Each airfoil 1110 is preferably located proximate the outer region of the tension airfoil turbine or lifting wing assembly 1100, or proximate the interior surface of the tension airfoil outer rim 1102.

In one configuration, the airfoil 1110 would be sized to extend along approximately thirty percent (30%) of the outermost or distal portion of the spoke 1107, 1108. In an alternate configuration, the airfoil 1110 would be sized to extend along between twenty percent (20%) and forty percent (40%) of the outermost or distal portion of the spoke 1107, 1108. In another alternate configuration, the airfoil 1110 would be sized to extend along between ten percent (10%) and fifty percent (50%) of the outermost or distal portion of the spoke 1107, 1108. The outermost portion of the tension airfoil turbine or lifting wing assembly 1100 travels at the greatest linear velocity. Lift is a function of velocity.

Each airfoil 1110 is assembled to a pair of spokes 1107, 1108 using any suitable mechanical assembly configuration. In the exemplary embodiment, the airfoil 1110 is assembled to the pair of spokes 1107, 1108 by inserting each spoke through a respective bore formed through the airfoil 1110. The airfoils 1110 are spatially arranged about the tension airfoil turbine or lifting wing assembly 1100. A space or gap is provided between the airfoil trailing edge 1114 of a forward located airfoil 1110 and an airfoil leading edge 1112 of a trailing located airfoil 1110. The airfoil 1110 can be formed having a slight twist, as illustrated, to accommodate the respective angles of the respective spokes 1107, 1108. Alternatively, the airfoil 1110 can have a greater thickness. The twisted blade shape of the airfoil 1110 produces more power or lift compared to straight airfoils. This is because as the airfoil 1110 gets closer to the hub 1103, the wind velocity becomes less, requiring more a greater angle of attack to produce lift.

Figure 35:
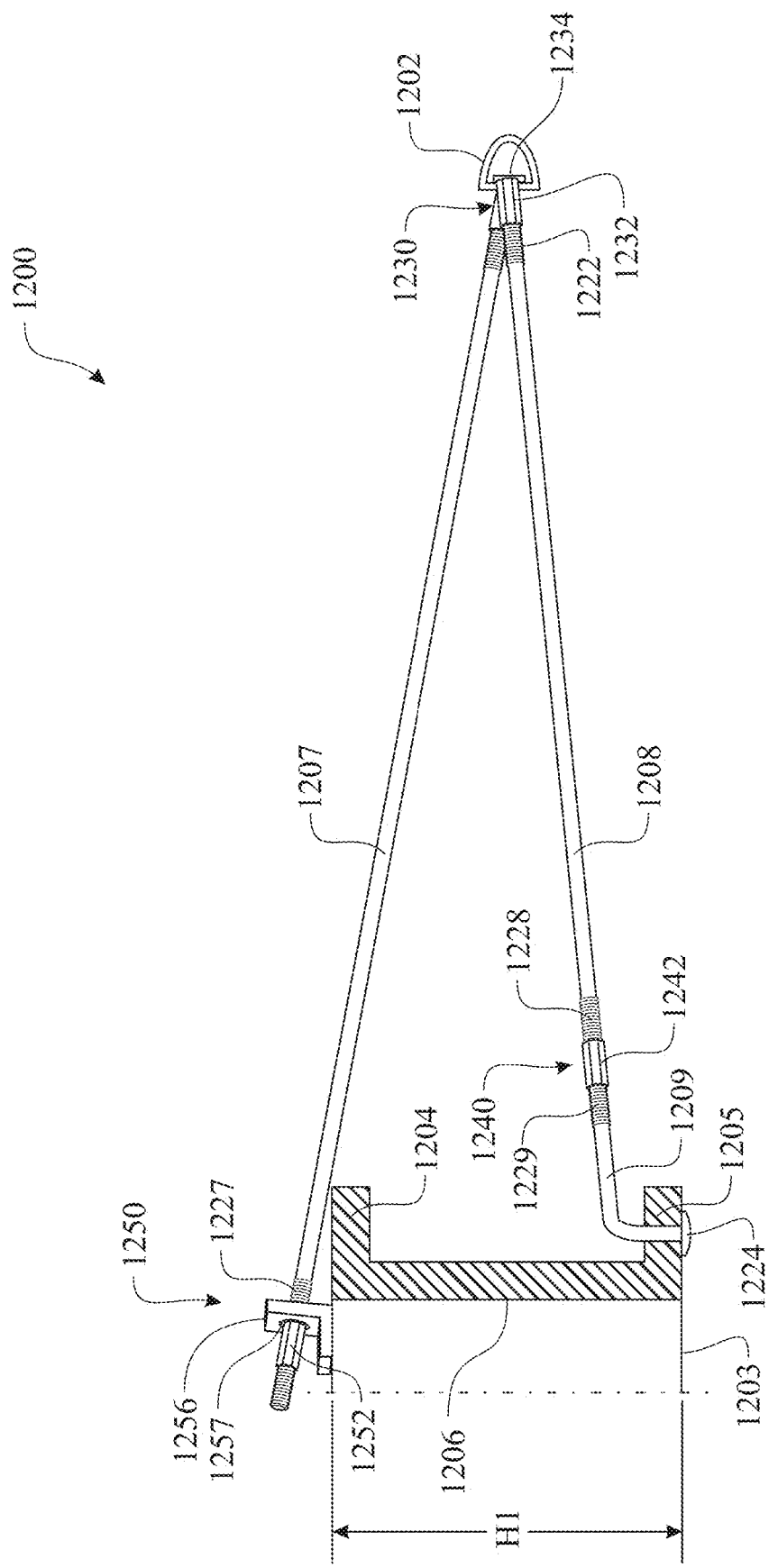
FIG. 35 presents a cross section view of an enhanced exemplary tension lifting wing wheel assembly introducing several optional tension adjusting configurations.

The angle of attack can be established by the arrangement of the spokes 1107, 1108, the height H1 (identified in FIG. 35) of the tension airfoil central hub assembly 1103, or the like, or any combination thereof. The greater the height of hub H1 or the span between the hub flanges 1104, 1105, the greater the angle of attack.

The tension airfoil turbine or lifting wing assembly 1100 is designed to be implemented to provide lift. The tension airfoil turbine or lifting wing assembly 1100 includes features to drive a rotational motion. For example, the axle bearing 1106 can include one or more features which would engage with a rotating shaft of a drive system, such as a motor. In another example, one or both hub flanges 1104, 1105 can be fixed to the rotating shaft of a drive system. In yet another example, the tension airfoil central hub assembly 1103 can include a unidirectional drive mechanism, wherein the drive system drives a rotation in a lifting direction, but when necessary, the tension airfoil turbine or lifting wing assembly 1100 can rotate freely in a reverse direction.

It is understood that the tension airfoil turbine or lifting wing assembly 1100 would be rotationally balanced. Rotational balancing can be accomplished by any known method of balancing a rotating assembly, including by design, balancing of components, balancing of the assembly, and the like, or any combination thereof.

The spokes are assembled having a tension. The tension can be created by any suitable tension generating system or any combination of suitable tension generating systems. Examples of various suitable tension generating systems, including a spoke distal assembly tensioning nipple 1230, a spoke distal assembly central tensioning system 1240, and a hub located spoke tensioning system 1250, are illustrated being employed on a tension airfoil turbine or lifting wing assembly 1200, as presented in FIG. 37. Like features of the tension airfoil turbine or lifting wing assembly 1200 and the tension airfoil turbine or lifting wing assembly 1100 are numbered the same except preceded by the numeral '9'. One or more of the spoke distal assembly tensioning nipple 1230, the spoke distal assembly central tensioning system 1240, and the hub located spoke tensioning system 1250 would be integrated into the tension airfoil turbine or lifting wing assembly 1100, providing to and retaining tension in the spokes 1107, 1108.

The spoke distal assembly tensioning nipple 1230 includes a spoke distal assembly tensioning nipple body 1234 formed at a distal end of a spoke distal assembly tensioning nipple flange 1232. The spoke distal assembly tensioning nipple body 1234 is sized and shaped to adequately support tension applied to the spoke 1207, 1208 against a mating surface of the tension airfoil outer rim 1202. The spoke distal assembly tensioning nipple body 1234 can be of a fixed size and shape or capable of changing shape after being inserted through a respective receiving aperture formed through the tension airfoil outer rim 1202. For example, the spoke distal assembly tensioning nipple body 1234 can be shaped and function similar to a wall molly, a rivet, or the like. A spoke distal threading 1222 is formed at a distal end of each spoke 1207, 1208. Threading (not shown, but well understood) is formed within an interior cylindrical surface of a cavity of each spoke distal assembly tensioning nipple flange 1232, wherein the threading has the same thread size and pitch to mate with the spoke distal threading 1222.

In the exemplary tension airfoil turbine or lifting wing assembly 1200, the tension airfoil trailing spoke 1108 is represented by a spoke segmented into a tension airfoil trailing spoke distal segment 1208 and a tension airfoil trailing spoke proximal segment 1209; the segments 1208, 1209 being assembled by the spoke distal assembly central tensioning system 1240. A spoke distal segment proximal threading 1228 is formed at a proximal end of the tension airfoil trailing spoke distal segment 1208. A spoke proximal segment distal threading 1229 is formed at a distal end of the tension airfoil trailing spoke proximal segment 1209. The spoke distal segment proximal threading 1228 and the spoke proximal segment distal threading 1229 would have counter rotating threading, wherein a rotational direction the spoke distal segment proximal threading 1228 is formed having a first rotational direction and the rotational direction of the spoke proximal segment distal threading 1229 is formed having an opposite rotational direction. A spoke distal assembly central tensioning element 1242 of the spoke distal assembly central tensioning system 1240 would include a central bore having threaded ends. The threaded ends would also include counter rotating threading to mate with the spoke threading 1228, 1229. Tension can be adjusted by rotating the spoke distal assembly central tensioning element 1242 in a first rotational direction to increase tension or rotating the spoke distal assembly central tensioning element 1242 in a second rotational direction to decrease tension. The tensioning element 1242 can be any suitable component or series of components enabling creation and/or adjustment of a tension of the respective spoke 1207.

A proximal or hub end of each spoke, such as the exemplary tension airfoil trailing spoke proximal segment 1209 can be bent and formed creating a spoke anchor flange 1224. The spoke anchor flange 1224 engages with a mating surface of the hub flange 1204, 1205 to adequately support the tension generated along the spoke 1208, 1209. The bend in the tension airfoil trailing spoke proximal segment 1209, when inserted through the spoke hub attachment hole, also refrains the tension airfoil trailing spoke proximal segment 1209 from rotating.

The hub located spoke tensioning system 1250 employs an alternative assembly configuration compared to the bend and formation of the spoke anchor flange 1224 of the tension airfoil trailing spoke proximal segment 1209. The hub located spoke tensioning system 1250 includes a spoke proximal threading 1227 formed at a proximal or hub end of the tension airfoil leading spoke 1207. A hub located spoke tensioning bracket 1256 would be integrally formed with or assembled to the tension airfoil first central hub flange 1204. The tension airfoil leading spoke 1207 would be inserted through an aperture formed through the hub located spoke tensioning bracket 1256. A hub located spoke tensioning element 1252 would be threadably secured to the proximal end of the spoke proximal threading 1227 on a hub side of the hub located spoke tensioning bracket 1256 and adjusted to generate and retain a tension along the tension airfoil leading spoke 1207. An optional tensioning bracket cavity 1257 can be formed within the hub located spoke tensioning bracket 1256 to seat the hub located spoke tensioning element 1252 accordingly.

It is understood that the spoke distal assembly tensioning nipple 1230, the spoke distal assembly central tensioning system 1240, and the hub located spoke tensioning system 1250 can be used individually, or in any suitable combination thereof. The spoke distal assembly tensioning nipple 1230, the spoke distal assembly central tensioning system 1240, and the hub located spoke tensioning system 1250 are only exemplary and any suitable tension generating system or systems can be integrated into the tension airfoil turbine or lifting wing assembly 1100, 1200.

The spoke assembly configuration can be adapted to include a spoke breakaway feature 1350. An exemplary spoke breakaway feature 1350 is introduced in FIGS. 36 and 37. The spoke tensioning breakaway assembly 1350 is integrated into a tension airfoil turbine or lifting wing assembly 1300, wherein the tension airfoil turbine or lifting wing assembly 1300 is a modified variant of the tension airfoil turbine or lifting wing assembly 1100 and/or tension airfoil turbine or lifting wing assembly 1200. Like elements of the tension airfoil turbine or lifting wing assembly 1300 and the tension airfoil turbine or lifting wing assembly 1200 are numbered the same, except preceded by a numeral "10". The exemplary illustration integrates the spoke tensioning breakaway assembly 1350 at an end of each spoke 1307, 1308 located proximate a tension airfoil outer rim 1302. It is understood that the spoke tensioning breakaway assembly 1350 can be integrated at a location proximate the turbine wheel assembly 100 or the hub (not shown). In another alternative configuration, the spoke tensioning breakaway assembly 1350 can be integrated at any position along a length of the spoke.

The concept behind operation of the spoke tensioning breakaway assembly 1350 is that while a tension is applied along a length of the spoke 1307, 1308, at least one tensioning assembly coupling element 1370 retains a coupling between a tensioning nipple assembly 1330 and a tensioning stud 1360. In a preferred configuration, the spoke tensioning breakaway assembly 1350 employs at least two tensioning assembly coupling elements 1370.

The tensioning nipple assembly 1330 includes a spoke tensioning nipple flange 1334 extending radially outward from a distal end of a spoke tensioning nipple body 1332, as shown, or from a distal end of a segment of the respective spoke. The spoke tensioning nipple body 1332 can include a threaded surface to matingly engage with a mating threaded portion 1322 of the spoke 1308, as illustrated. In the exemplary embodiment, the spoke tensioning nipple body 1332 includes a female threaded bore and the spoke distal threading 1322 is formed having male threading. It is understood that the spoke tensioning nipple body 1332 can comprise male threading and the spoke distal threading 1322 can be formed as female threading. Inclusion of threaded mating surfaces enables the tensioning nipple assembly 1330 to be used to generate tension along the spoke 1308. It is understood that alternate configurations, such as those included in the tension airfoil turbine or lifting wing assembly 1200 can be employed to create and maintain tension within the spoke 1308.

The tensioning stud 1360 includes a tensioning stud flange 1364 extending radially outward from a distal end of a tensioning stud trunk 1362. The tensioning stud trunk 1362 can be attached to a tension airfoil rim inner surface 1384 of the tension airfoil outer rim 1302, an end of a segment of the spoke 1307, 1308, a flange of the hub (not shown), or any other suitable element of the tension airfoil turbine or lifting wing assembly 1300. The tensioning stud 1360 can be mechanically assembled to the respective element of the tension airfoil turbine or lifting wing assembly 1300 using a permanent assembly method or a temporary mechanical interface. The tensioning stud 1360 can be welded to the respective element of the tension airfoil turbine or lifting wing assembly 1300, bolted to the respective element of the tension airfoil turbine or lifting wing assembly 1300, or any other permanent assembly method. Alternatively, the tensioning stud 1360 can include a suitable flange, wherein the flange would be larger than a respective aperture formed through the respective element of the tension airfoil turbine or lifting wing assembly 1300, or any other temporarily assembly configuration. In another alternate configuration, the tensioning stud 1360 can be integrally formed with the respective element of the tension airfoil turbine or lifting wing assembly 1300, such as by machining, casting, and the like. In yet another configuration, the tensioning stud 1360 can be integrated into an end of a segment of the spoke 1307, 1308 using any suitable manufacturing process.

Figure 36:
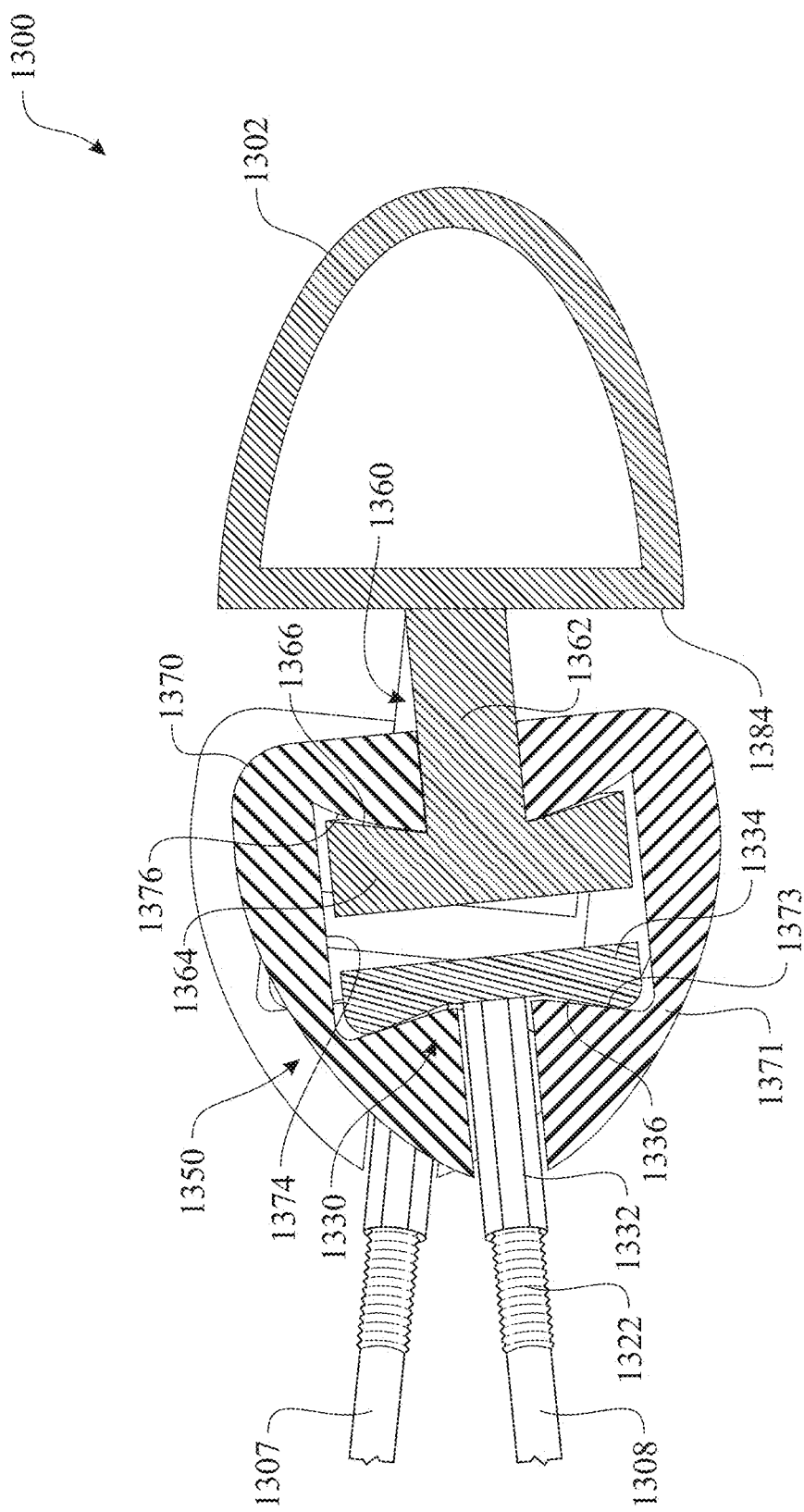
FIG. 36 presents a cross section view of an enhanced exemplary tension lifting wing wheel assembly introducing a spoke breakaway feature, wherein the spoke breakaway feature is shown in an assembled state, retained by tension within the spoke.
Figure 37:
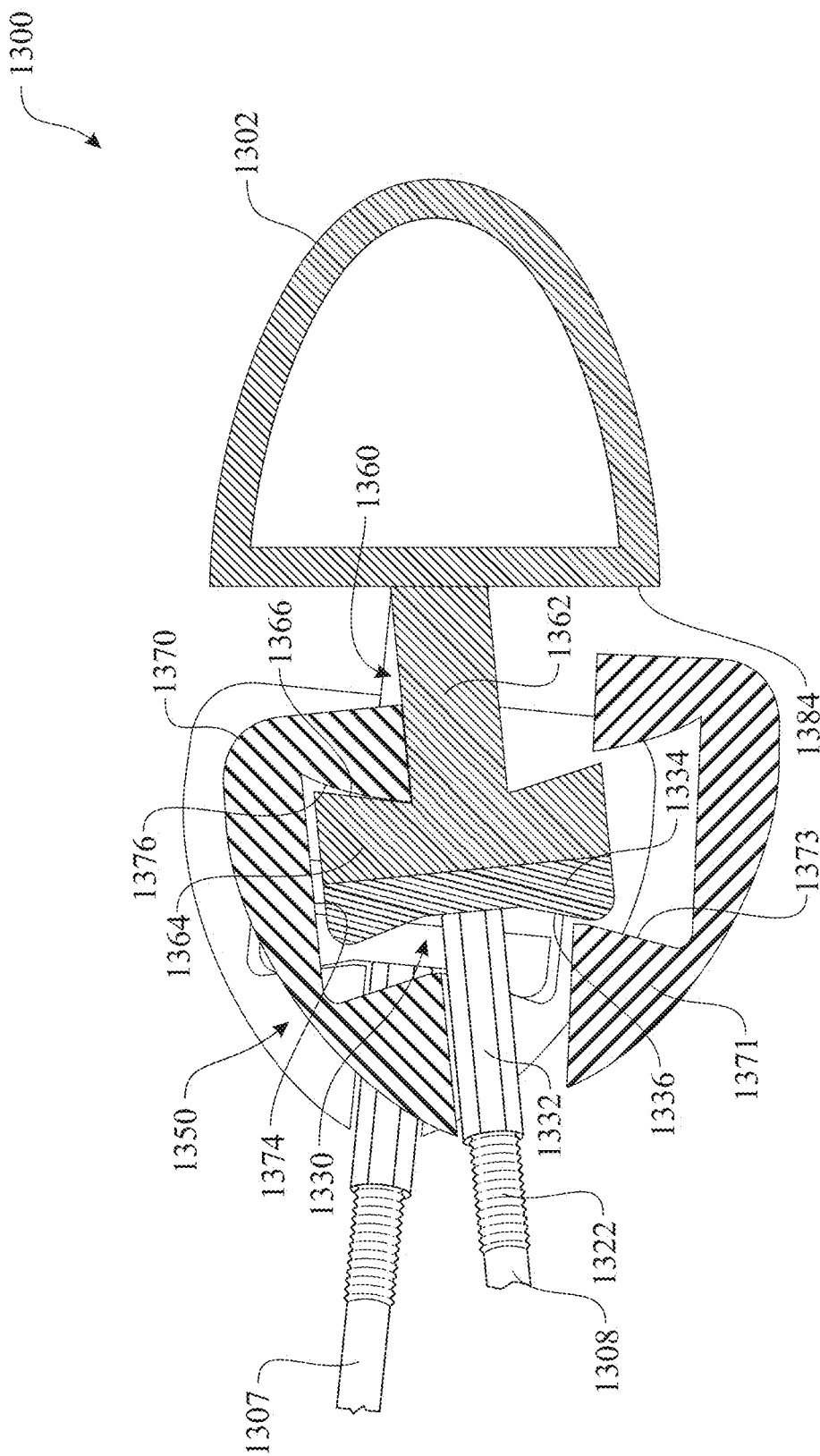
FIG. 37 presents a cross section view of the enhanced exemplary tension lifting wing wheel assembly previously illustrated in FIG. 36, wherein the spoke breakaway feature is shown in a partially separated state, initiated by a broken spoke.

A tensioning assembly coupling element connection cavity 1374 is formed within the tensioning assembly coupling element 1370. The tensioning assembly coupling element connection cavity 1374 is sized and shaped to enclose each of the spoke tensioning nipple flange 1334 and the tensioning stud flange 1364, as illustrated in FIG. 36. Additionally, the tensioning assembly coupling element connection cavity 1374 is sized to enable the spoke tensioning nipple flange 1334 and the tensioning stud flange 1364 to become dislodged from within the tensioning assembly coupling element connection cavity 1374, freeing a broken spoke 1307, 1308 from the tension airfoil turbine or lifting wing assembly 1300, as illustrated in FIG. 37. Details of the operation of the spoke tensioning breakaway assembly 1350 are described later within this disclosure.

A tensioning stud flange assembly retention surface 1366 is formed within the tensioning stud flange 1364. The tensioning stud flange assembly retention surface 1366 is formed having a debossed or inwardly extending shape. The debossed surface can be of any suitable shape, including a concave surface, as illustrated, a conically shaped surface, a "V" shaped surface, and the like. A tensioning coupling element stud flange retention surface 1376 is formed within the tensioning assembly coupling element 1370. The tensioning coupling element stud flange retention surface 1376 is shaped to matingly engage with the tensioning stud flange assembly retention surface 1366. The tensioning coupling element stud flange retention surface 1376 of the tensioning assembly coupling element 1370 would have a shape that mirrors that of the tensioning stud flange assembly retention surface 1366. More specifically, the tensioning coupling element stud flange retention surface 1376 would have a bossed or outwardly extending surface. The shape of the tensioning coupling element stud flange retention surface 1376 is preferably exaggerated compared to the shape of the surface of the tensioning stud flange assembly retention surface 1366, as illustrated. This differential in shapes of the mating surfaces focusing the contacting surfaces towards the centers accordingly.

Similarly, a spoke tensioning nipple spoke assembly retention surface 1336 is formed within the spoke tensioning nipple flange 1334. The spoke tensioning nipple spoke assembly retention surface 1336 is formed having a debossed or inwardly extending shape. The debossed surface can be of any suitable shape, including a concave surface, as illustrated, a conically shaped surface, a "V" shaped surface, and the like. A tensioning coupling element nipple flange retention surface 1373 is formed within the tensioning assembly coupling element 1370. The tensioning coupling element nipple flange retention surface 1373 is shaped to matingly engage with the spoke tensioning nipple spoke assembly retention surface 1336. The tensioning coupling element nipple flange retention surface 1373 would have a shape that mirrors that of the spoke tensioning nipple spoke assembly retention surface 1336. More specifically, the tensioning coupling element nipple flange retention surface 1373 would have a bossed or outwardly extending surface. The shape of the tensioning coupling element nipple flange retention surface 1373 is preferably exaggerated compared to the shape of the surface of the spoke tensioning nipple spoke assembly retention surface 1336, as illustrated. This differential in shapes of the mating surfaces focusing the contacting surfaces towards the centers accordingly.

As a tension is applied to the respective spoke 1308, the tension separates the spoke tensioning nipple flange 1334 and the tensioning stud flange 1364 from one another. During the separation between the spoke tensioning nipple flange 1334 and the tensioning stud flange 1364, the spoke tensioning nipple spoke assembly retention surface 1336 engages with the tensioning coupling element nipple flange retention surface 1373, pulling the tensioning assembly coupling element 1370, causing the tensioning coupling element stud flange retention surface 1376 to engage with the tensioning stud flange assembly retention surface 1366. The shape of the tensioning stud flange assembly retention surface 1366 and the tensioning coupling element stud flange retention surface 1376 draws the tensioning assembly coupling element 1370 to center along the tensioning stud trunk 1362. Similarly, the shape of the spoke tensioning nipple spoke assembly retention surface 1336 and the tensioning coupling element nipple flange retention surface 1373 draws the tensioning assembly coupling element 1370 to center along the spoke tensioning nipple body 1332. It is preferred to employ a pair of tensioning assembly coupling elements 1370 (identified as a 1370 and a 1371), thus balancing the spoke tensioning breakaway assembly 1350. The pair of tensioning assembly coupling elements 1370 can be independent of one another or hingeably coupled to one another.

When a spoke 1308 breaks, as illustrated in FIG. 37, the centrifugal force draws the spoke tensioning nipple flange 1334 towards the tensioning stud flange 1364. This enables the tensioning assembly coupling element 1370 to separate from the tensioning nipple assembly 1330 and the tensioning stud 1360. The tensioning assembly coupling element connection cavity 1374 is shaped and sized to allow each tensioning assembly coupling element 1370 to separate from the tensioning nipple assembly 1330 and the tensioning stud 1360. Once separated, the associated section of the spoke 1308 becomes free from the tension airfoil turbine or lifting wing assembly 1300. The exemplary configuration locates the spoke tensioning breakaway assembly 1350 proximate or integral with the tension airfoil outer rim 1302. A second spoke tensioning breakaway assembly 1350 can be integral with the hub. The inclusion of the pair of spoke tensioning breakaway assemblies 1350 enables complete release of an entire broken spoke 1308.

Although the exemplary illustrations present one configuration of the 1350, it is understood that any broken spoke ejection system can be employed by the tension airfoil turbine or lifting wing assembly 1300.

Figure 38:
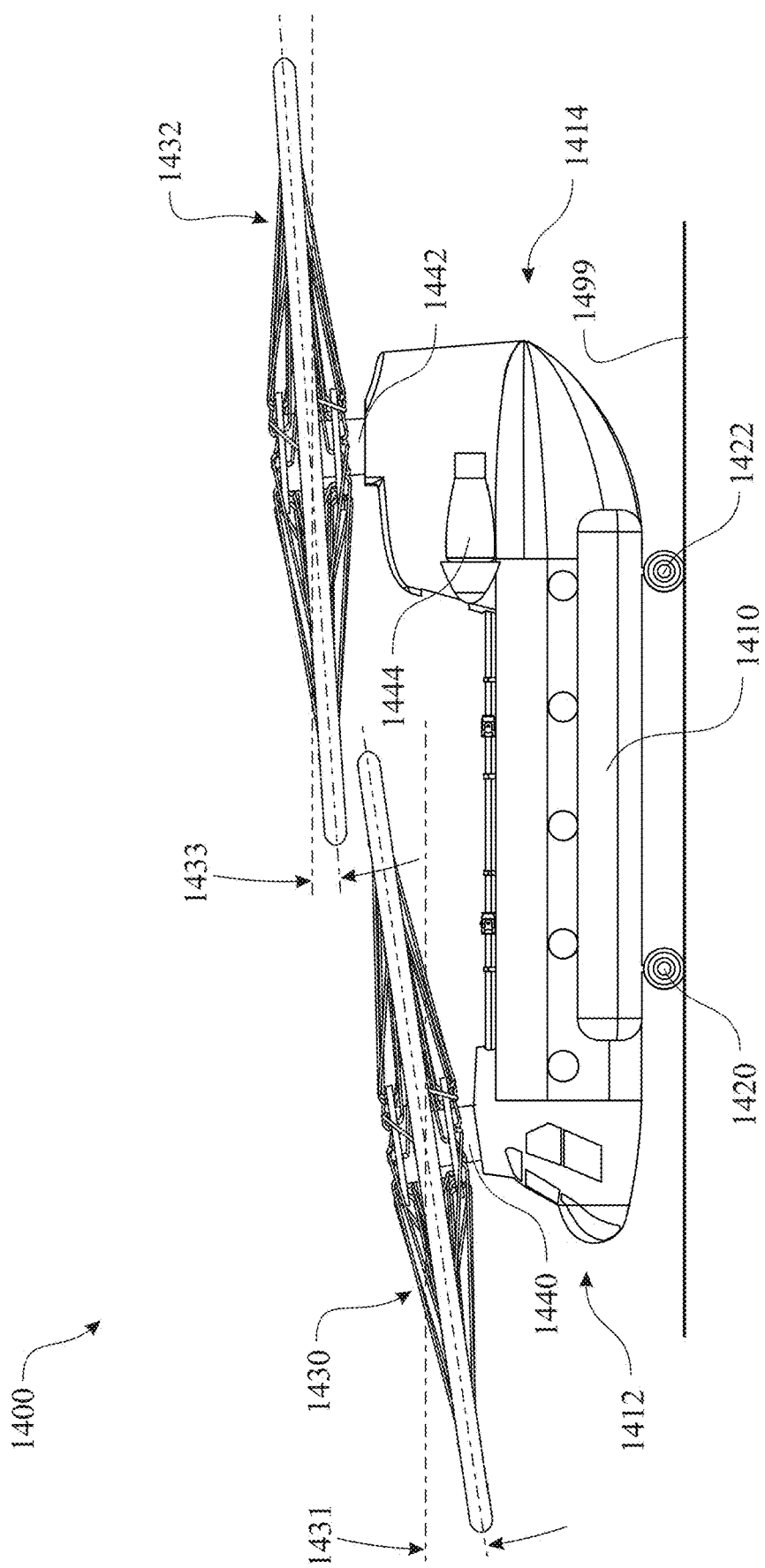
FIG. 38 presents a side view of an exemplary tandem rotor heavy-lift helicopter employing the tension lifting wing wheel assembly.
Figure 39:
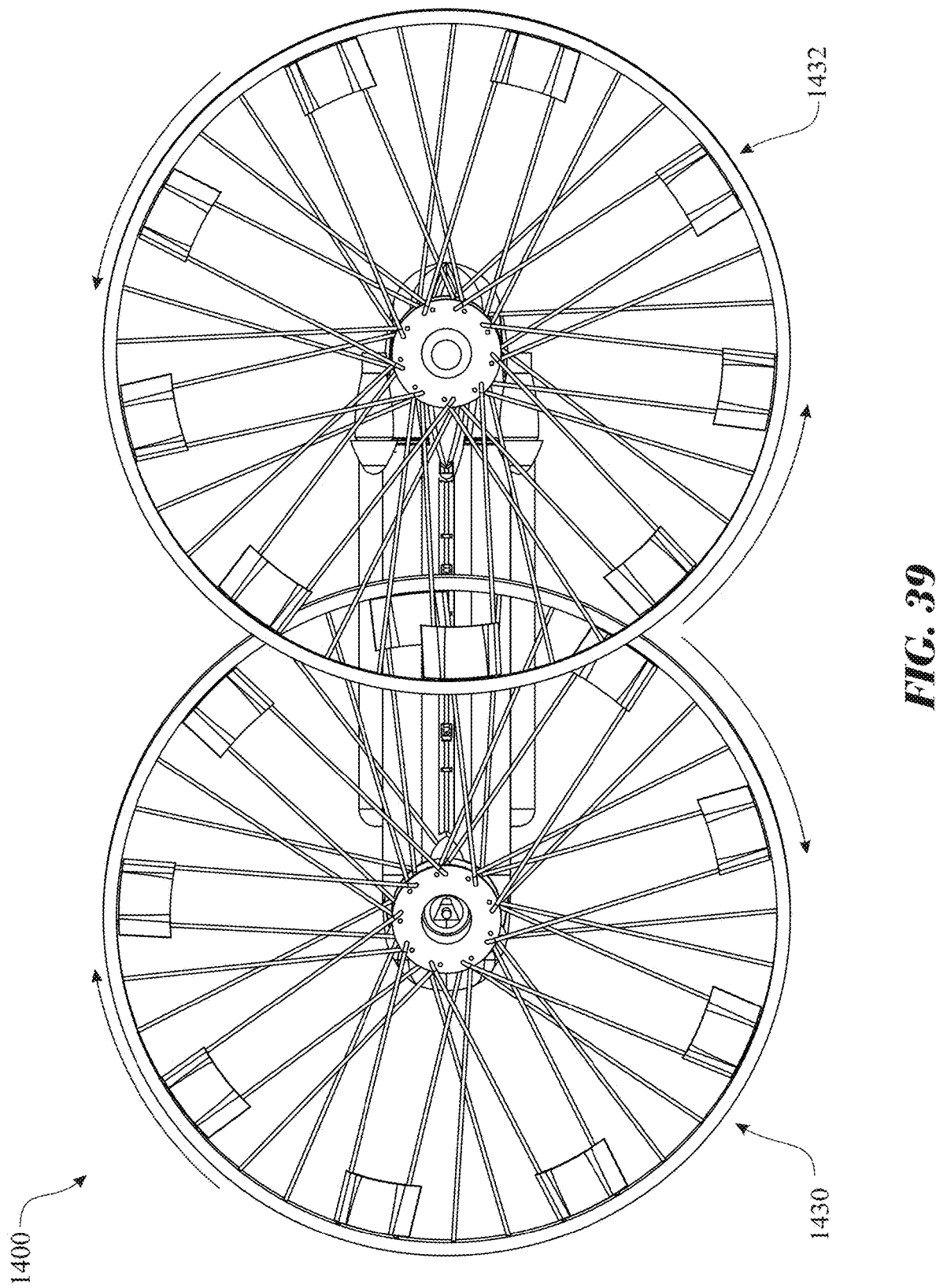
FIG. 39 presents a top view of the exemplary tandem rotor heavy-lift helicopter originally introduced in FIG. 38.

The tension airfoil turbine or lifting wing assembly 1100 is designed to provide lift for heavy loads. In one application, an aircraft 1400, such as an exemplary tandem rotor heavy-lift helicopter 1400 employs a pair of tension airfoil turbine or lifting wing assemblies 1100 (identified as a tandem rotor heavy-lift helicopter forward rotor assembly 1430 and a tandem rotor heavy-lift helicopter rearward rotor assembly 1432), as illustrated in FIGS. 38 and 39, to provide vertical lift. The tandem rotor heavy-lift helicopter 1400 includes an aircraft body 1410, such as a tandem rotor heavy-lift helicopter fuselage 1410, which provides structural support of the various flight and other operational components as well as storage for passengers and cargo. The orientation of the tandem rotor heavy-lift helicopter 1400 can be references by a tandem rotor heavy-lift helicopter front end 1412 and a tandem rotor heavy-lift helicopter rear end 1414. The tandem rotor heavy-lift helicopter rotor assemblies 1430, 1432 are operated by a rotor drive machine 1440, 1442. The rotor drive machines 1440, 1442 rotate each of the tandem rotor heavy-lift helicopter rotor assemblies 1430, 1432 in opposite or counter rotating directions. In the illustrated example, the tandem rotor heavy-lift helicopter forward rotor assembly 1430 rotates in a clockwise direction and the tandem rotor heavy-lift helicopter rearward rotor assembly 1432 rotates in a counterclockwise direction, as illustrated in FIG. 39. Each tandem rotor heavy-lift helicopter rotor assembly 1430, 1432 would be arranged having an angle 1431, 1433 that is slight forward from horizontal (horizontal can be reference by a landing surface 1499). As illustrated in FIG. 38, the tandem rotor heavy-lift helicopter forward rotor assembly angle 1431 is greater from horizontal compared to the tandem rotor heavy-lift helicopter rearward rotor assembly angle 1433. The tandem rotor heavy-lift helicopter forward rotor assembly 1430 and the tandem rotor heavy-lift helicopter rearward rotor assembly 1432 can include rims 1102 having equally diameters, as illustrated, or rims 1102 having different diameters. The tandem rotor heavy-lift helicopter forward rotor assembly 1430 and the tandem rotor heavy-lift helicopter rearward rotor assembly 1132 can be located where the tandem rotor heavy-lift helicopter forward rotor assembly 1430 and the tandem rotor heavy-lift helicopter rearward rotor assembly 1432 would overlap one another, as illustrated, or the tandem rotor heavy-lift helicopter forward rotor assembly 1430 and the tandem rotor heavy-lift helicopter rearward rotor assembly 1432 can be located having a gap therebetween.

The tandem rotor heavy-lift helicopter 1400 is designed for heavy lifting. The tandem rotor heavy-lift helicopter fuselage 1410 would include a structural frame suitable for supporting heavy loads.

Although the tandem rotor heavy-lift helicopter 1400 is illustrated having a pair of rotor assemblies 1430, 1432, it is understood that the helicopter 1400 can be configured having a single horizontally oriented rotor assembly 1430, 1432 and a second, vertically oriented rotor assembly 1130, 1432. It is understood that one of the horizontally oriented rotor assembly 1430, 1432 and the second, vertically oriented rotor assembly 1430, 1432 can be the tension airfoil turbine or lifting wing assembly 1100 and the second of the horizontally oriented rotor assembly 1430, 1432 and the second, vertically oriented rotor assembly 1430, 1432 can be a currently employed rotor configuration.

Other noted features of the tandem rotor heavy-lift helicopter 1400 include landing gear 1420, 1422 and a tandem rotor heavy-lift helicopter propulsion jet 1444. The landing gear 1420, 1422 can be fixed or retractable. The landing gear 1420, 1422 can be of any suitable format, including wheels (as shown), landing skids, floatation pontoons, and the like.

Control of the tandem rotor heavy-lift helicopter 1400 can be achieved by use of a constant velocity (CV) joint integrated with at least one of the tandem rotor heavy-lift helicopter rotor assembly 1430, 1432. When integrated, the respective CV joint enables tilting of an associated tandem rotor heavy-lift helicopter rotor assembly 1430, 1432.

Figure 40:
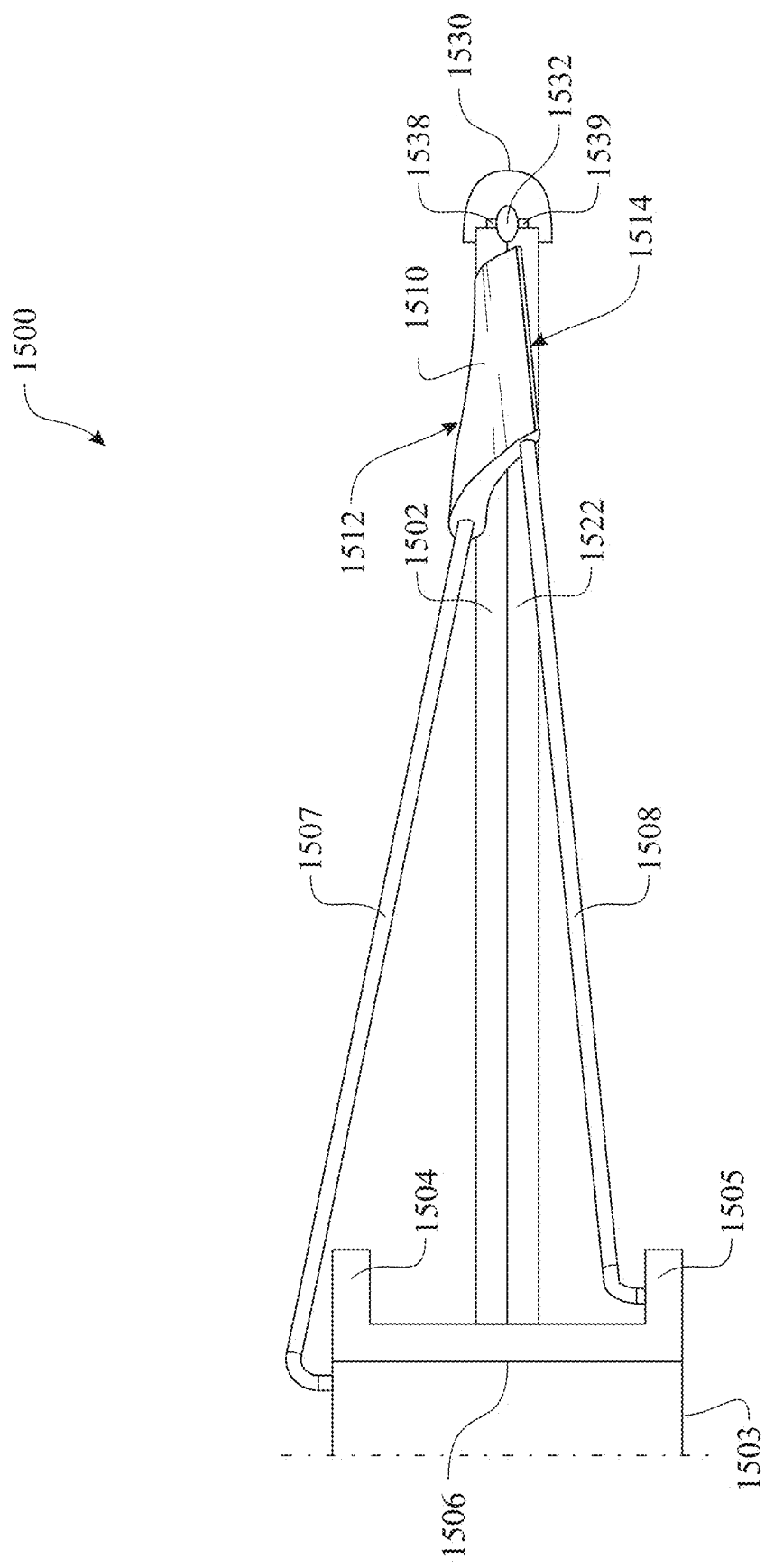
FIG. 40 presents a cross section view of an enhanced exemplary tension lifting wing wheel assembly introducing a wing angle of attack configuration, the illustration presenting a configuration having a low angle of attack.

The tension airfoil turbine or lifting wing assembly 1100 and the tension airfoil turbine or lifting wing assembly 1200 present configurations having fixed angles of attack. A lift angle adjusting tension lifting wing wheel assembly 1500, illustrated in FIGS. 40 and 41, introduces an enhanced version, wherein the lift angle adjusting tension lifting wing wheel assembly 1500 enables adjustability of the angle of attack of an angle adjusting wing 1510. Like features of the lift angle adjusting tension lifting wing wheel assembly 1500 and the tension airfoil turbine or lifting wing assembly 1100 are numbered the same except preceded by the numeral '15'. The lift angle adjusting tension lifting wing wheel assembly 1500 introduces a pair of rims 1502, 1522. Distal ends of each tension lifting wing leading spoke 1507 are assembled to the tension lifting wing upper outer rim 1502 and distal ends of each tension lifting wing trailing spoke 1508 are assembled to the tension lifting wing first central hub assembly 1503. The axial spacing between tension lifting wing upper outer rim 1502 and the tension lifting wing first central hub assembly 1503 is controlled by engagement of a tension lifting wing angle adjusting cam 1532 against an upper outer rim axial adjusting controller feature 1538 of the tension lifting wing upper outer rim 1502 and a lower outer rim axial adjusting controller feature 1539 of the tension lifting wing first central hub assembly 1503. The tension lifting wing angle adjusting cam 1532 can be operated by any suitable rotating drive mechanism, which would preferably be located within a portion of a tension lifting wing peripheral rim 1530. The tension lifting wing peripheral rim 1530 would include features which retain the tension lifting wing upper outer rim 1502 and the tension lifting wing lower outer rim 1522 from extending beyond a predetermined separation distance. A plurality of separation mechanisms would be spaced around the tension lifting wing peripheral rim 1530 to ensure equal spacing during operation. In one application, the plurality of separation mechanisms would be substantially equally spaced around the tension lifting wing peripheral rim 1530 to ensure equal spacing during operation.

Figure 41:
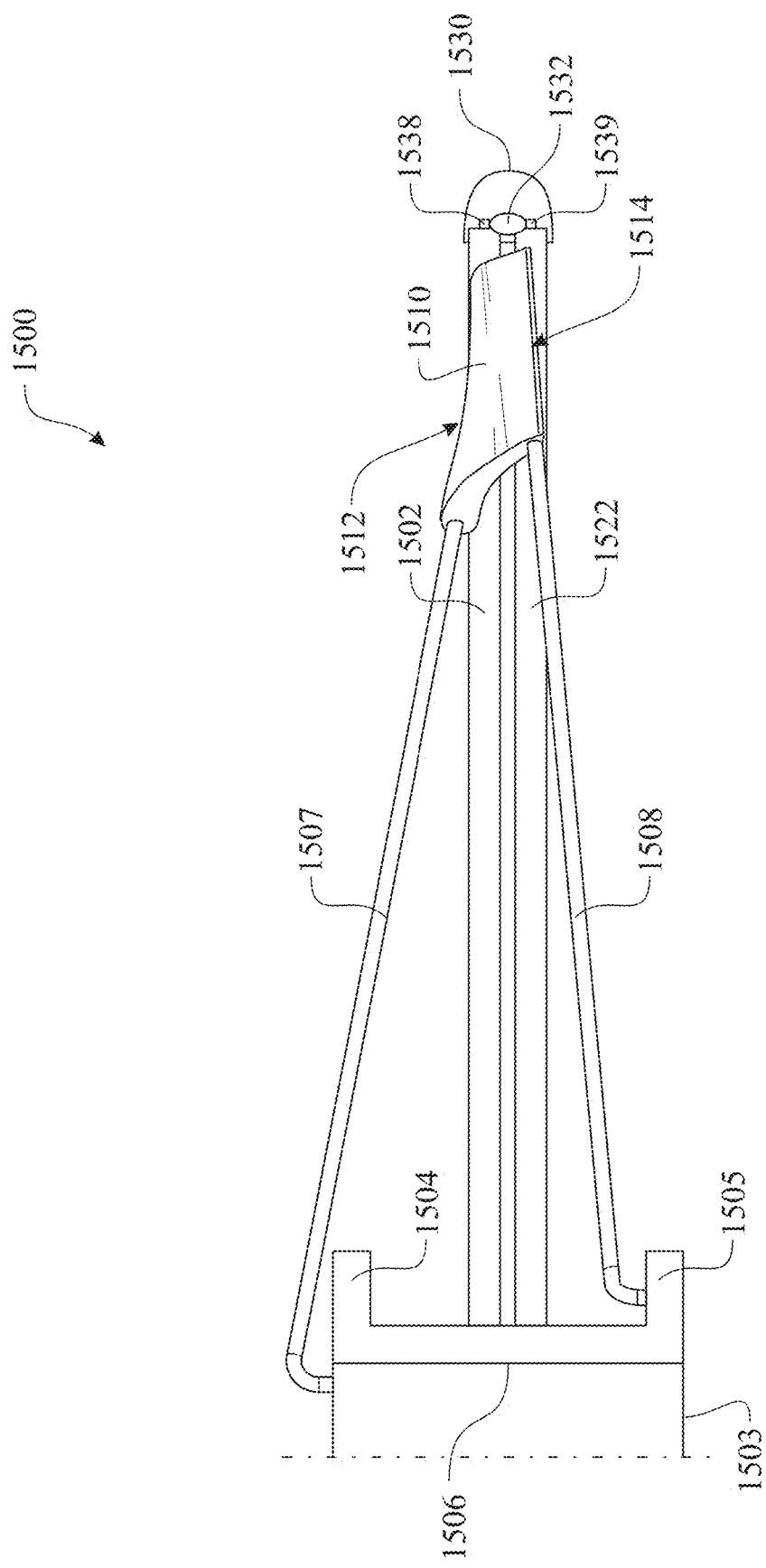
FIG. 41 presents a cross section view of the enhanced exemplary tension lifting wing wheel assembly originally introduced in FIG. 40, the illustration presenting a configuration having an increased angle of attack.

As the tension lifting wing angle adjusting cam 1532 is rotated, the tension lifting wing angle adjusting cam 1532 separates the upper outer rim axial adjusting controller feature 1538 and the lower outer rim axial adjusting controller feature 1539 from one another. The separation separates the tension lifting wing upper outer rim 1502 and the tension lifting wing lower outer rim 1522 from one another, as shown in FIG. 41. As the tension lifting wing upper outer rim 1502 and the tension lifting wing lower outer rim 1522 separate from one another, the distal distance between the tension lifting wing leading spoke 1507 and the tension lifting wing trailing spoke 1508 increases, causing the angle of attack of the angle adjusting wing 1510 to increase. With the increase of the angle of attack of the angle adjusting wing 1510, the lift increases at a lower rate of rotation of the lift angle adjusting tension lifting wing wheel assembly 1500. Although the separation mechanism employs a cam, it is understood that any mechanism that can control a distance between the tension lifting wing upper outer rim 1502 and the tension lifting wing lower outer rim 1522 can be employed.

The enhanced features of the lift angle adjusting tension lifting wing wheel assembly 1500 can be integrated into any of the previously described versions.

Although the tension airfoil turbine or lifting wing assembly 1100 is detailed for use as a generally horizontally oriented lifting device, it is understood that the tension airfoil turbine or lifting wing assembly 1100 can be generally vertically oriented for use as a propulsion device, for applications such as replacing or complimenting a propeller of an aircraft. The tension airfoil turbine or lifting wing assembly 1100 can also be installed on an aircraft wherein the tension airfoil turbine or lifting wing assembly 1100 rotates between a generally horizontal orientation and a generally vertical orientation.

In an alternative arrangement, the tension airfoil turbine or lifting wing assembly 1100 can be utilized in a vertical orientation for converting wind to electrical power, wherein the tension airfoil turbine or lifting wing assembly 1100 would replace the turbine wheel assembly 100, the crossover spoke turbine wheel assembly 300, the turbine blade subassembly 514, the turbine blade subassembly 614, or any other similar application. In an application where the turbine airfoil assembly 100, 300, 514, 614, 1100 is used for electrical power generation, the tension airfoil turbine or lifting wing assembly 1100 would be vertically oriented, rotating about a generally horizontal axis of rotation.

The turbine airfoil assembly 100, 300, 514, 614, 1100 can be modified to enhance performance, while reducing the forces on the supporting structure 202, 519, 619. The airfoils 1110 could impose a force upon the supporting structure 202, 519, 619 in an axial direction. The tension airfoil turbine or lifting wing assembly 1100 can be modified, as illustrated as an exemplary tension airfoil turbine 16. The tension airfoil turbine 16 and the tension airfoil turbine or lifting wing assembly 1100 include like elements, with the modifications described herein. Like elements of the tension airfoil turbine or lifting wing assembly 1100 and the tension airfoil turbine 16 are numbered the same, except elements associated with the tension airfoil turbine 16 are preceded by the numeral "16".

Figure 42:
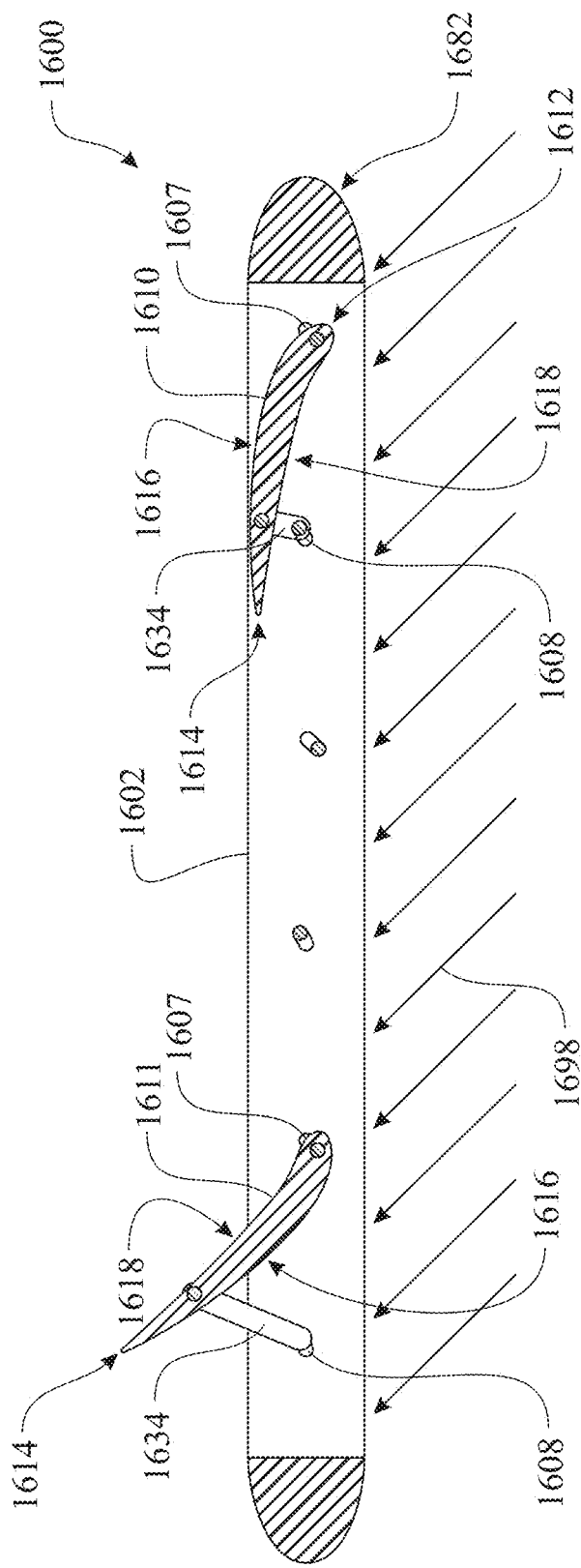
FIG. 42 presents a cross section view of a variant of the tension airfoil assembly originally introduced in FIG. 32, the illustration presenting a configuration that reduces an axial force created by lift generated during rotation of the tension airfoil assembly, wherein the axial force would be transferred to the turbine blade subassembly shaft.

The exemplary illustration presents each of the turbine blades 1110 are arranged having the same orientation. It is recognized that the turbine blades 1110 can be arranged in an alternating arrangement, referencing the tension airfoil turbine 16 illustrated in FIG. 42, where a first turbine blade 1610 would be oriented with the airfoil in a first direction and a second turbine blade 1611 would be oriented with the airfoil in a second, opposite direction. In the exemplary arrangement, the convex shape of the airfoil of the first turbine blade 1610 would be facing a first radial direction and the convex shape of the airfoil of the second turbine blade 1611 would be facing a second, opposite radial direction. The advantage to this arrangement is that the turbine blade subassembly 1600 would rotate when driven by the wind, without applying an axial force to the turbine blade subassembly shaft (such as the turbine blade subassembly shaft 514 of the wind operated electrical power generating system 500). In the exemplary illustration, the angle of incidence of each turbine blade 1610, 1611 could be increased by introducing an airfoil support member 1634. The airfoil support member 1634 can be used to support the turbine blade 1610, 1611 at a region proximate a leading edge airfoil leading edge 1612, at a region proximate a trailing edge airfoil trailing edge 1614 (as shown), or both. Each of the turbine blades 1610, 1611 would be angled to accommodate a predetermined direction of wind flow 1698. The airfoil support member 1634 can be fixed or adjustable. When adjustable, the airfoil support member 1634 can be manually adjusted or adjusted using an integrated adjustment system, such as a power adjustment system (such as motor controlled), a pneumatic adjustment system, or any other suitable adjustment mechanism.

Figure 43:
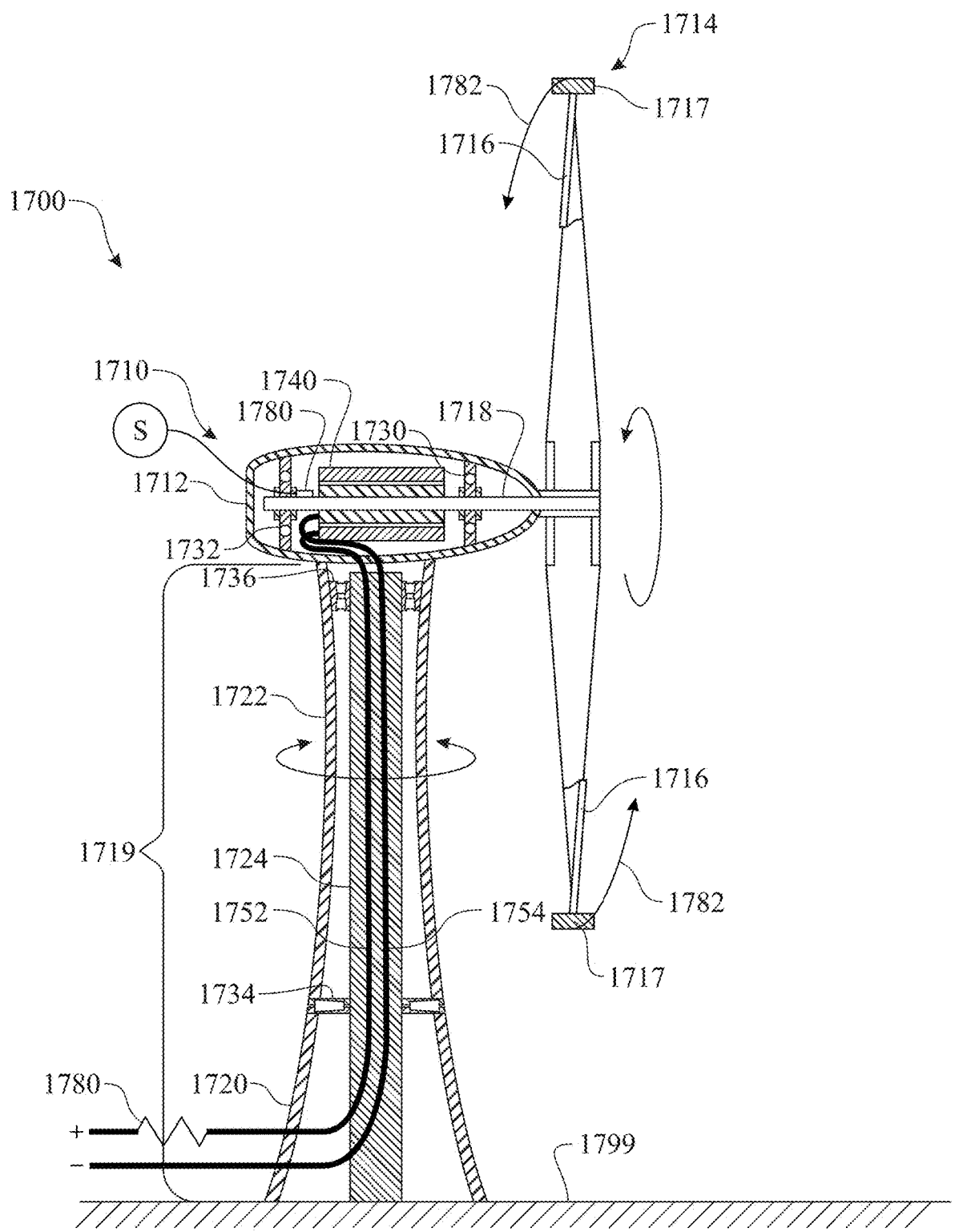
FIG. 43 presents a partially sectioned view of an exemplary wind operated electrical power generating system employing an electrical load adjusted via a power optimizing controller to optimize efficiency of the turbine blade assembly of the wind operated electrical power generating system.
Figure 44:
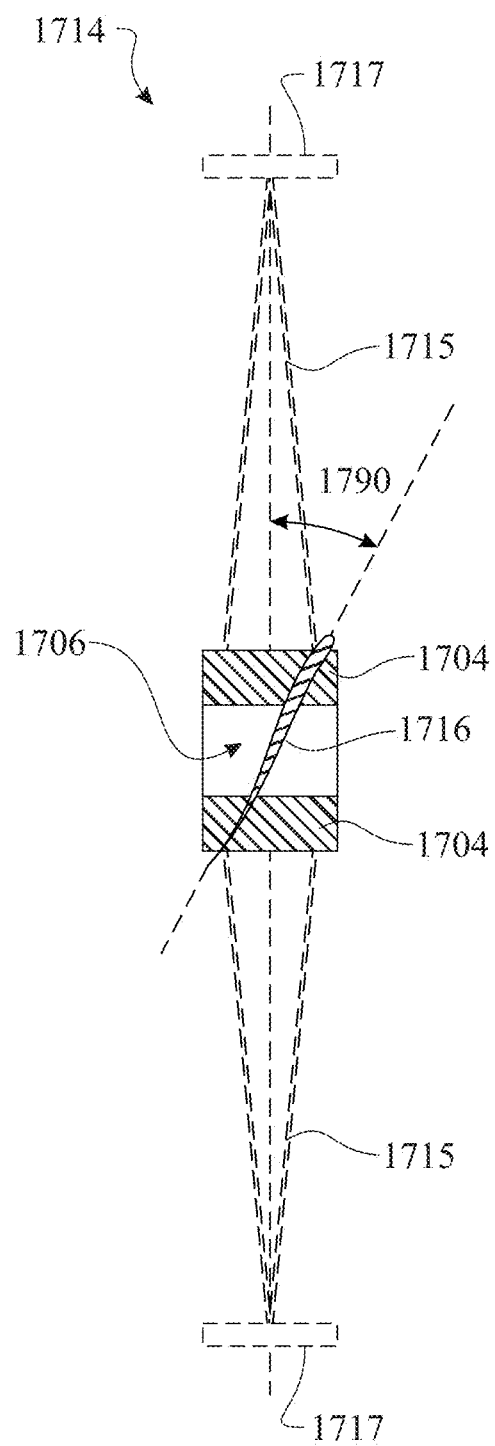
FIG. 44 presents a sectioned view of the turbine blade assembly illustrating an angle of attack of an exemplary turbine blade of the turbine blade assembly.

A wind operated electrical power generating system 1700, introduced in FIGS. 43 and 44, is a modified variant of the wind operated electrical power generating system 500 introduced in FIG. 21. The wind operated electrical power generating system 1700 and the wind operated electrical power generating system 500 have a number of like elements. Like elements of the wind operated electrical power generating system 1700 are numbered the same as like elements of the 500, wherein the elements of the wind operated electrical power generating system 1700 are preceded by the numeral "17". An electric generator 1740 is integrated into a turbine support housing 1712 and drive by a turbine blade subassembly shaft 1718 which is either directly (as shown) or indirectly driven by a turbine blade subassembly 1714.

The turbine blade subassembly 1714 includes a series of turbine blade 1716; each series of turbine blade 1716 is retained by a leading and trailing wind operated turbine tension member 1715. The turbine blades 1716 are oriented at a turbine blade angle of attack 1790 respective to a radial centerline of the turbine blade subassembly 1714 as best illustrated in FIG. 44. The turbine blade angle of attack 1790 defines an angle of attack between the turbine blade 1716 and wind. The angle of the turbine blade 1716, the wind velocity, and the rotational tip speed 1782 of the turbine blade subassembly 1714 are used to optimize the efficiency of the turbine blade subassembly 1714. The wing tip speed 1782 can be controlled by a variably applied electrical load 1792 introduced into the load circuit 1752, 1754 of the wind operated electrical power generating system 1700. It is preferred that the variably applied electrical load 1792 be placed in series with the load circuit 1752, 1754.

The variably applied electrical load 1792 is a variable resistance that can be adjusted by integrating a variable resistor into the circuit such as the arrangement described in the power control module 660 or introducing varying resistances using relays such as in the arrangement described in efficiency management system load management subsystem 1050.

Figure 45:
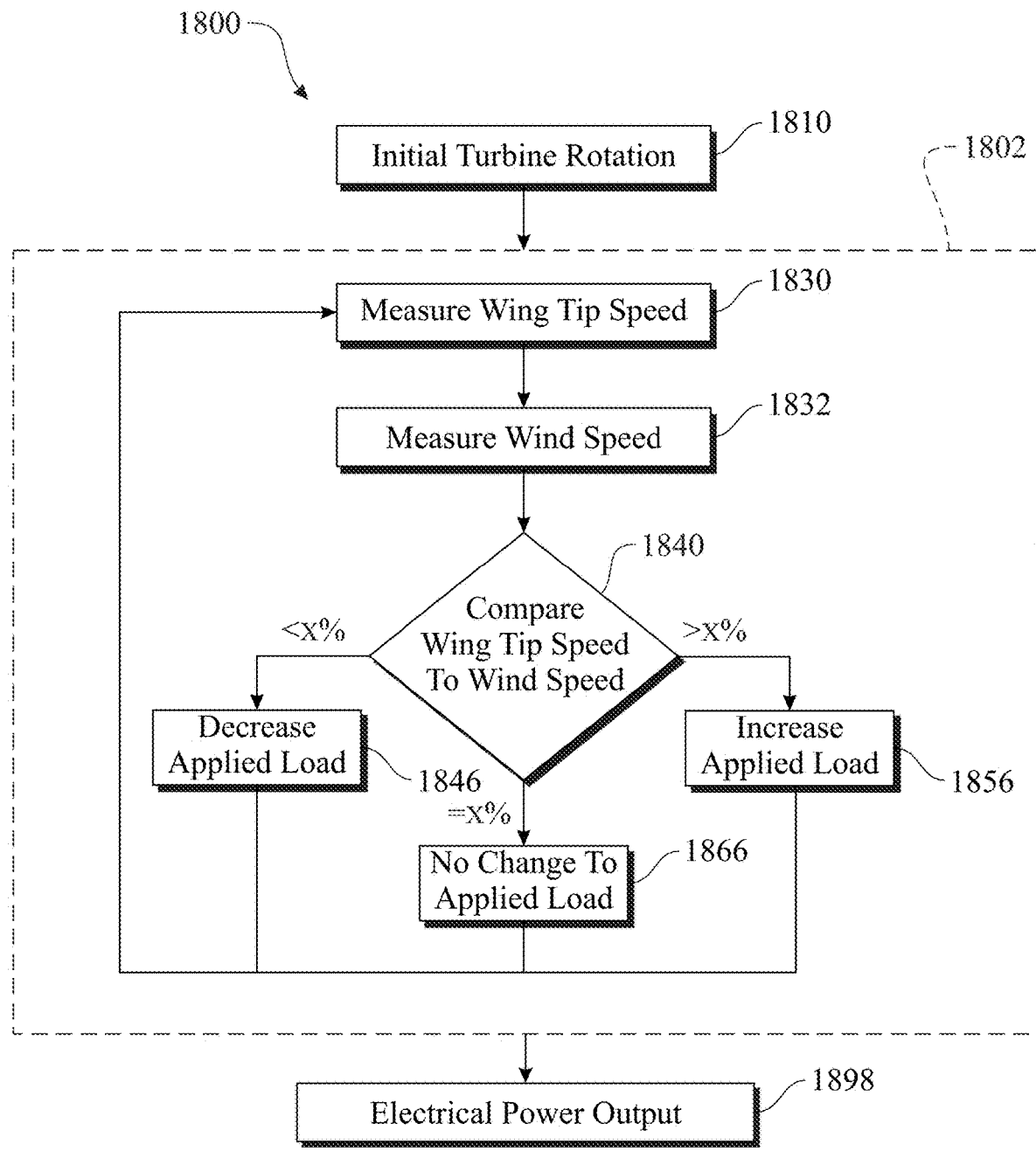
FIG. 45 presents an exemplary flow diagram illustrating steps associated with a wind turbine optimization process, wherein the process utilizes a ratio between a wing tip speed and a wind velocity.
Figure 46:
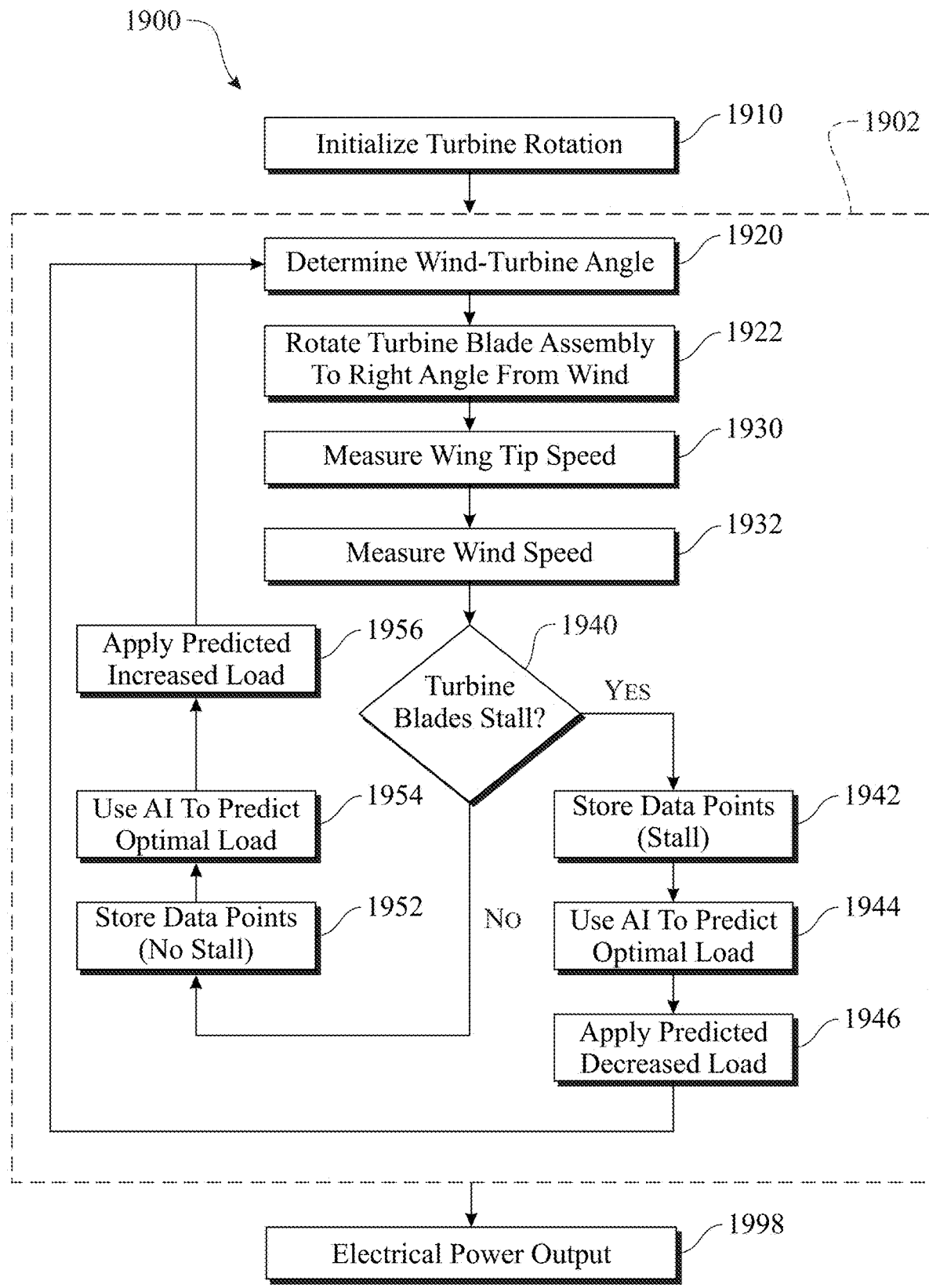
FIG. 46 presents an exemplary flow diagram illustrating steps associated with a wind turbine optimization process, wherein the process utilizes Artificial Intelligence (AI) to optimize the efficiency of the turbine blade assembly.

The variable resistance can be established using any of the methods described herein or by using a turbine optimization flow diagram 1800 detailed in FIG. 45 or a turbine optimization flow diagram 1900 detailed in FIG. 46. The turbine optimization flow diagram 1800 relies upon a ratio between the wing tip speed and the wind velocity to determine an optimal variably applied electrical load 1792. The optimal variably applied electrical load 1792 would increase or decrease the wing tip speed 1782 to set the wing tip speed 1782 to an optimum speed based upon the current wind velocity. The system would either continuously or periodically obtain data to optimize the efficiency of the turbine blade subassembly 1714.

The turbine optimization flow diagram 1800 initiates when the wind operated electrical power generating system 1700 is actively generating electrical power (block 1810); i.e. the turbine blade subassembly 1714 is rotating at a rotational rate or Revolutions Per Minute (RPM) creating an initial wing tip speed 1782. A RPM sensor 1780 can be used to measure the revolutions per minute (RPM) of the turbine blade subassembly shaft 1718, which can be used to calculate the wing tip speed 1782. A turbine power generation optimization process 1802 activates and continuously or periodically obtains data to optimize the efficiency of the turbine blade subassembly 1714. The turbine power generation optimization process 1802 includes a step of measuring a wing tip speed (block 1830) and a step of measuring a wing speed (block 1832). A ratio (x %) is predetermined by either a computer or an operating personnel. The wing tip speed 1782 and the wind velocity are compared with one another to determine an actual operating ratio under the current operating conditions. The calculated ratio is compared to the desired ratio (decision step 1840).

In a condition where the actual operating ratio under the current operating condition is less than the predetermined optimal ratio (x %), the process decreases an applied electrical load (block 1846). In a condition where the actual operating ratio under the current operating condition is greater than the predetermined optimal ratio (x %), the process increases an applied electrical load (block 1856). In a condition where the actual operating ratio under the current operating condition is substantially equal to the predetermined optimal ratio (x %), the process maintains applied electrical load (block 1866). A preferred optimal ratio (x %) is slightly less than 28 degrees. A preferred optional range for the optimal ratio (x %) is between 20 and 28 degrees.

The turbine power generation optimization process 1802 is accomplished using a microprocessor in signal communication with any of the suitable electrical load varying equipment, such as those described herein. The predetermined optimal ratio (x %) can be modified as desired to further optimize the efficiency based upon other conditions.

The turbine optimization flow diagram 1900 introduces an Artificial Intelligence (AI) method for optimizing the efficiency of the turbine blade subassembly 1714. The method operates in a manner similar to the turbine optimization flow diagram 1800, wherein the process initializes when the wind operated electrical power generating system 1700 becomes active, rotating the turbine blade subassembly 1714 and generating a wing tip speed 1782. Like the turbine power generation optimization process 1802, a turbine power generation optimization process 1902 activates and continuously or periodically obtains data to optimize the efficiency of the turbine blade subassembly 1714.

The wind to turbine angle is measured (block 1920). The turbine blade subassembly 1714 is designed to operate at a right or 90 degree angle to the direction of the wind. If the wind to turbine angle is different from a right or 90 degree angle, the turbine blade subassembly 1714 is rotated to the correct, desired angle respective to the wind. The direction of wind is rarely consistent over a period of time. The system can utilize multiple measurements over time and statistics to determine a meaningful direction of the wind to be applied in the mathematical formulas. The applied direction of the wind can be calculated to be an average over a period of time, using a standard deviation in the calculations, or using any other statistical consideration when determining the applied direction of the wind. Once the meaningful direction of the wind is determined or calculated, the turbine blade subassembly 1714 is rotated to the correct, desired angle respective to the wind.

The system then determines the wing tip speed 1782 (block 1930) and measures the wind velocity (1932) using any suitable equipment, It is preferred that the wind velocity and direction be measured at the location of the turbine blade subassembly 1714 to obtain accurate data.

The system continuously monitors the conditions of the turbine blade subassembly 1714 for stall (decision step 1940). Stall can be determined using any suitable and known means, such as those included on any commercial airplane.

In a condition where the system identifies that the turbine blade subassembly 1714 is encountering stall (yes), the system would store measured data points associated with the stall (block 1942). The microprocessor, in accordance with an associated instruction set, would learn from the stored data points (block 1942) to predict an optimal electrical load 1780 to be applied to the wind operated electrical power generating system 1700 (block 1944). The predicted optimal electrical load 1780 would be applied to the circuit (block 1946), wherein a decreased electrical load would result in an increased rotational rate of the turbine blade subassembly 1714, thus increasing the wing tip speed 1782 and avoiding stall.

In a condition where the system identifies that the turbine blade subassembly 1714 is not encountering stall (no), the system would store measured data points identified accordingly as acceptable conditions (block 1952). The microprocessor, in accordance with an associated instruction set, would learn from the stored data points (block 1952) to predict an optimal electrical load 1780 to be applied to the wind operated electrical power generating system 1700 (block 1954). The predicted optimal electrical load 1780 would be applied to the circuit (block 1956), wherein an increased electrical load would result in a decreased rotational rate of the turbine blade subassembly 1714, thus rotating at a reduced and more efficient rotational speed.

The monitoring and rotational speed adjustments can be continuous or be completed periodically. The periodic checks can be based upon varied measurements of the wind, stall rates, or any other considerations. Statistical functions, such as averages, standard deviations, and the like can be used to determine suitable periods of time between system checks and adjustments to the wing tip speed 1782. Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REFERENCE ELEMENT DESCRIPTIONS

Ref No. Description 100 turbine wheel assembly
102 turbine outer rim
104 turbine central hub
106 axle bearing
108 turbine spoke
109 airflow interior region
110 turbine blades
112 blade leading edge
114 blade trailing edge
116 posterior edge
118 interior edge
120 blade leading edge pivot
122 anti-slip interface
130 incident angle controller
132 angle control cleat
134 angle control tether
140 breakaway anchor
142 breakaway clip
144 breakaway frame
150 turbine blade
152 blade leading edge
154 blade trailing edge
156 posterior edge
158 interior edge
160 turbine blade
162 blade leading edge
164 blade trailing edge
166 posterior edge
168 interior edge
198 wind flow
199 resultant blade motion
200 turbine deployment assembly
202 vertical riser support
204 electrical power generator
206 turbine wheel shaft
210 counterbalance
212 counterbalance support beam
300 crossover spoke turbine wheel assembly
302 turbine outer rim
304 turbine central hub
306 axle bearing
308 turbine spoke
309 airflow interior region
310 turbine blades
400 cable supported mast turbine assembly
410 power generating central hub assembly
412 central hub
414 hub support member
416 hub coupling member
420 mast
422 mast distal end
430 pliant turbine blade
432 rigid turbine blade
434 retracted turbine blade portion 440 mast-to-mast tension cable
442 mast-to-axle tension cable
450 electricity generating apparatus
452 generator interface
460 electricity generating apparatus
462 generator interface
464 generator mount
470 retracting mechanism
500 wind operated electrical power generating system
510 wind operated turbine assembly
512 turbine support housing
514 turbine blade subassembly
516 turbine blade
517 turbine blade outer rim surface
518 turbine blade subassembly shaft
519 vertical riser support structure
520 vertical riser support structure base section
522 vertical riser support structure rotating section
524 vertical riser support structure stabilizing column
530 turbine blade shaft supporting forward bearing assembly
532 turbine blade shaft supporting rear bearing assembly
534 vertical riser support structure base bearing assembly
536 vertical riser support structure upper stabilizing bearing assembly
540 electric generator
542 electric generator shaft
543 electric generator turbine rim engagement wheel
548 electric generator support component
549 electric output panel
550 grid tie
552 positive electrical output cable
554 negative electrical output cable
559 power grid
599 system supporting surface
600 wind operated electrical power generating system
610 wind operated turbine assembly
612 turbine housing
614 turbine blade subassembly
616 turbine blade
618 turbine blade subassembly shaft
619 vertical riser support structure
620 hydraulic pump
622 first hydraulic line
624 second hydraulic line
630 hydraulic motor
632 hydraulic motor shaft
634 hydraulic motor shaft rotational speed sensor
636 hydraulic motor shaft rotational speed sensor signal communication link
639 shaft coupling
640 electric generator
642 electric generator shaft
644 electric generator shaft rotational speed sensor
646 electric generator shaft rotational speed sensor signal communication link
649 electric output panel
650 grid tie
652 positive electrical output cable
654 negative electrical output cable
659 power grid
660 power control module
662 power control module electrical communication link
664 power controller enclosure
670 first rotational speed indicator
672 second rotational speed indicator
674 third rotational speed indicator
676 fourth rotational speed indicator
678 nth rotational speed indicator
680 first potentiometer
682 second potentiometer
684 third potentiometer
686 fourth potentiometer
688 nth potentiometer
690 transformer
699 system supporting surface
700 power output chart
702 rotational speed axis
704 power output axis
710 turbine theoretical output power curve
712 generator theoretical output power curve
714 stall point
750 power output chart
752 wind velocity generated RPM axis
754 power output axis
760 current generator curve
762 turbine power curve
764 regulated generator curve
770 first RPM predetermined rotational speed
772 second RPM predetermined rotational speed
774 third RPM predetermined rotational speed
776 fourth RPM predetermined rotational speed
778 nth RPM predetermined rotational speed
780 first power output to grid tie
782 second power output to grid tie
784 third power output to grid tie
786 fourth power output to grid tie
788 nth power output to grid tie
800 wind operated electrical power generating system
810 wind operated turbine assembly
812 turbine housing
814 turbine blade subassembly
816 turbine blade
818 turbine blade subassembly shaft
819 vertical riser support structure
840 electrical power generating machine
841 sensor system
843 wind velocity sensor
845 electrical power generating machine rotational speed sensor
847 power output sensor
850 grid tie
850a loading controlled grid tie
852 positive electrical output cable
852a positive electrical output cable
854 negative electrical output cable
854a negative electrical output cable
858 positive power grid electrical connection
858a positive power grid electrical connection
859 negative power grid electrical connection
859a negative power grid electrical connection
899 system supporting surface
900 wind velocity-load chart for wind turbine arrangement
902 time axis
904 wind velocity axis
910 revolutions per minute (rotational speed)
912 wind velocity
914 stall speed
920 first maximum desired rotational rate at wind velocity
922 first load application transition period
924 first target minimal rotational rate at wind velocity to induce load
926 first minimum rotational rate transition period 930 second maximum desired rotational rate at wind velocity
932 second load application transition period
934 second target minimal rotational rate at wind velocity to induce load
936 second minimum rotational rate transition period
940 third maximum desired rotational rate at wind velocity
942 third load application transition period
944 third target minimal rotational rate at wind velocity to induce load
946 third minimum rotational rate transition period
960 wind turbine optimization process
961 initial turbine rotational speed
962 increase in wind velocity
964 maximum desired rotational speed at wind velocity
966 introduced 1st load reduces rotational speed
968 rotational speed reaches equilibrium above stall
972 increase in wind velocity
974 maximum desired rotational speed at wind velocity
976 introduced 2nd load reduces rotational speed
978 rotational speed reaches equilibrium above stall
982 increase in wind velocity
984 maximum desired rotational speed at wind velocity
986 introduced 3rd load reduces rotational speed
988 rotational speed reaches equilibrium above stall
990 reduce load as wind velocity reduces
1000 efficiency management system
1010 efficiency management system computer
1022 microprocessor
1024 memory
1026 digital storage device
1030 video circuit
1032 communication or network circuit
1040 keyboard
1042 pointer device
1044 monitor
1045 monitor display
1050 efficiency management system load management subsystem
1052 electromagnetic coil
1054 switch
1060 efficiency management system load management subsystem enclosure
1062 first load
1063 second load
1064 third load
1065 fourth load
1066 fifth load
1067 sixth load
1068 seventh load
1069 nth load
1072 positive input conductor
1074 negative input conductor
1076 positive output conductor
1078 negative output conductor
1100 tension airfoil turbine or lifting wing assembly
1102 tension airfoil outer rim
1103 tension airfoil central hub assembly
1104 tension airfoil first central hub flange
1105 tension airfoil second central hub flange
1106 axle bearing
1107 tension airfoil leading spoke
1108 tension airfoil trailing spoke
1110 airfoil
1112 airfoil leading edge
1113 airfoil outer edge
1114 airfoil trailing edge
1115 airfoil inner edge
1116 airfoil upper surface
1118 airfoil lower surface
1182 tension airfoil outer rim aerodynamic surface
1200 tension airfoil turbine or lifting wing assembly
1202 tension airfoil outer rim
1203 tension airfoil hub assembly
1204 tension airfoil first central hub flange
1205 tension airfoil second central hub flange
1206 axle bearing
1207 tension airfoil leading spoke
1208 tension airfoil trailing spoke distal segment
1209 tension airfoil trailing spoke proximal segment
1210 airfoil
1212 airfoil leading edge
1214 airfoil trailing edge
1216 airfoil upper surface
1218 airfoil lower surface
1222 spoke distal threading
1224 spoke anchor flange
1227 spoke proximal threading
1228 spoke distal segment proximal threading
1229 spoke proximal segment distal threading
1230 spoke distal assembly tensioning nipple
1232 spoke distal assembly tensioning nipple flange
1234 spoke distal assembly tensioning nipple body
1240 spoke distal assembly central tensioning system
1242 spoke distal assembly central tensioning element
1250 hub located spoke tensioning system
1252 hub located spoke tensioning element
1256 hub located spoke tensioning bracket
1257 tensioning bracket cavity
1300 tension airfoil turbine or lifting wing assembly
1302 tension lifting airfoil outer rim
1307 tension lifting airfoil leading spoke
1308 tension lifting airfoil trailing spoke
1322 spoke distal threading
1330 tensioning nipple assembly
1332 spoke tensioning nipple body
1334 spoke tensioning nipple flange
1336 spoke tensioning nipple spoke assembly retention surface
1350 spoke tensioning breakaway assembly
1360 tensioning stud
1362 tensioning stud trunk
1364 tensioning stud flange
1366 tensioning stud flange assembly retention surface
1370 tensioning assembly first coupling element
1371 tensioning assembly second coupling element
1373 tensioning coupling element nipple flange retention surface
1374 tensioning assembly coupling element connection cavity
1376 tensioning coupling element stud flange retention surface
1384 tension lifting airfoil rim inner surface
1400 tandem rotor heavy-lift helicopter
1410 tandem rotor heavy-lift helicopter fuselage
1412 tandem rotor heavy-lift helicopter front end
1414 tandem rotor heavy-lift helicopter rear end
1420 tandem rotor heavy-lift helicopter front landing gear
1422 tandem rotor heavy-lift helicopter rear landing gear
1430 tandem rotor heavy-lift helicopter forward rotor assembly
1431 tandem rotor heavy-lift helicopter forward rotor assembly angle 1432 tandem rotor heavy-lift helicopter rearward rotor assembly
1433 tandem rotor heavy-lift helicopter rearward rotor assembly angle
1440 forward rotor drive machine
1442 rearward rotor drive machine
1444 tandem rotor heavy-lift helicopter propulsion jet
1499 landing surface
1500 lift angle adjusting tension lifting airfoil wheel assembly
1502 tension lifting airfoil upper outer rim
1503 tension lifting airfoil first central hub assembly
1504 tension lifting airfoil first central hub flange
1505 tension lifting airfoil second central hub flange
1506 axle bearing
1507 tension lifting airfoil leading spoke
1508 tension lifting airfoil trailing spoke
1510 angle adjusting airfoil
1512 angle adjusting airfoil leading edge
1514 angle adjusting airfoil trailing edge
1522 tension lifting airfoil lower outer rim
1530 tension lifting airfoil peripheral rim
1532 tension lifting airfoil angle adjusting cam
1538 upper outer rim axial adjusting controller feature
1539 lower outer rim axial adjusting controller feature
1600 tension airfoil turbine
1602 tension airfoil outer rim
1607 tension airfoil leading spoke
1608 tension airfoil trailing spoke
1610 airfoil
1612 airfoil leading edge
1614 airfoil trailing edge
1616 airfoil upper surface
1618 airfoil lower surface
1634 airfoil support member
1682 tension airfoil outer rim aerodynamic surface
1698 wind flow
1700 wind operated electrical power generating system
1710 wind operated turbine assembly
1712 turbine support housing
1714 turbine blade subassembly
1715 wind operated turbine tension member
1716 turbine blade
1717 turbine blade outer rim
1718 turbine blade subassembly shaft
1719 vertical riser support structure
1720 vertical riser support structure base section
1722 vertical riser support structure rotating section
1724 vertical riser support structure stabilizing column
1730 turbine blade shaft supporting forward bearing assembly
1732 turbine blade shaft supporting rear bearing assembly
1734 vertical riser support structure base bearing assembly
1736 vertical riser support structure upper stabilizing bearing assembly
1740 electric generator
1752 positive electrical output cable
1754 negative electrical output cable
1780 RPM sensor
1782 wing tip speed
1790 turbine blade angle of attack
1792 variably applied electrical load
1799 system supporting surface
1800 turbine optimization flow diagram
1802 turbine power generation optimization process
1810 initialize turbine rotation
1830 measure wing tip speed step
1832 measure wind velocity step
1840 compare wing tip speed and wind velocity to one another decision step
1846 decrease applied electrical load step
1856 increase applied electrical load step
1866 no change to electrical load step
1898 electrical power output step
1900 turbine optimization flow diagram
1902 turbine power generation optimization process
1910 initialize turbine rotation
1920 determine wind to turbine blade assembly angle step
1922 rotate turbine blade assembly to right angle to wind step
1930 measure wing tip speed step
1932 measure wind velocity step
1940 turbine blade assembly in stall decision step
1942 store data points (stall) step
1944 use Artificial Intelligence (AI) to predict optimal electrical load (decrease) step
1946 apply predicted decrease applied electrical load step
1952 store data points (no stall) step
1954 use Artificial Intelligence (AI) to predict optimal electrical load (increase) step
1956 apply predicted increase applied electrical load step
1998 electrical power output step
R1 inner radius of rim
R2 radius of spoke hub attachment holes
R3 radial span of the spoke
H1 height of rim
CH airfoil chord
S1 airfoil span

What is claimed is:

1. A system for generating electrical power, the system operating in accordance with steps of:
   rotating a turbine blade assembly of a wind turbine, wherein the rotation of the turbine blade assembly is driven by a wind velocity;
   generating electrical power by rotating an electrical power generator, wherein the rotation of the electrical power generating machine is driven by a rotation of the turbine blade assembly as a result of subjection to wind having the wind velocity;
   determining a rotational rate of the turbine blade assembly that would encounter stall considering the wind velocity subjected to the turbine blade assembly, wherein stall is a minimum rotational rate to maintain lift when subjected to the current wind velocity;
   calculating an optimal value of an electrical load that would maintain the rotational rate of the turbine blade assembly slightly faster than a rotational rate that would cause the turbine blade assembly to stall at one of the currently known wind velocity or an anticipated wind velocity, where the rotational rate slightly faster than the rotational rate that would cause the turbine blade assembly to stall accommodates a predetermined fluctuation in the wind velocity used to determine the stall, wherein the value of an electrical load is calculated by a microprocessor, the calculations include a function of the wind velocity and the wing tip speed of turbine blades of the turbine blade assembly;
   changing a value of the electrical load applied to an electrical power circuit to the calculated optimal value, wherein the electrical power circuit applies the electrical load to the electrical power generator, wherein the applied load creates an electrical resistance to the electrical power generator, thus reducing the rotational rate of the turbine blade assembly, wherein the step of calculating the optimal value of the electrical load that would maintain the rotational rate of the turbine blade assembly slightly faster than the rotational rate that would cause the turbine blade assembly to stall at the anticipated wind velocity is accomplished using artificial intelligence, wherein the artificial intelligence operates on a microprocessor, wherein the artificial intelligence uses data obtained from a sensor that acquires a rotational speed of one of the turbine blade subassembly shaft and the generator shaft.

2. The system for generating electrical power as recited in claim 1, wherein the value of the electrical load is changed by at least one of:

(a) changing a state of at least one relay, and
(b) changing a value of a variable resistor.

3. The system for generating electrical power as recited in claim 2, wherein the value of the electrical load is changed via an automated process, wherein the automated process is controlled by the microprocessor.

4. The system for generating electrical power as recited in claim 1, wherein the step of calculating the optimal value of the electrical load that would maintain the rotational rate of the turbine blade assembly slightly faster than the rotational rate that would cause the turbine blade assembly to stall at one of the currently known wind velocity or the anticipated wind velocity is calculated by comparing a ratio between the wind velocity and the wing tip speed to a predetermined value.

5. The system for generating electrical power as recited in claim 1, wherein the artificial intelligence learns from a history of data points, the data points including wind velocity, wing tip speed of the turbine blades, and status of stall of the turbine blades.

6. The system for generating electrical power as recited in claim 1, wherein the angle of attack of the turbine blades are arranged to be within a range of between 20 and 28 degrees.

7. The system for generating electrical power as recited in claim 1, wherein the angle of attack of the turbine blades are arranged to be at slightly less than 28 degrees.

8. The system for generating electrical power as recited in claim 1, wherein the step of calculating the optimal value of the electrical load that would maintain the rotational rate of the turbine blade assembly slightly faster than the rotational rate that would cause the turbine blade assembly to stall at one of the currently known wind velocity or the anticipated wind velocity utilizes an average of the wind velocity over a period of time as the wind velocity in the calculations.

9. The system for generating electrical power as recited in claim 1, wherein the step of calculating the optimal value of the electrical load that would maintain the rotational rate of the turbine blade assembly slightly faster than the rotational rate that would cause the turbine blade assembly to stall at one of the currently known wind velocity or the anticipated wind velocity, wherein the value of the wind velocity used in the calculations is a function that includes a standard deviation of the wind velocity over a period of time.

10. The system for generating electrical power as recited in claim 1, the turbine blade subassembly further comprising:

an outer rim;
a central hub assembly;
a plurality of spokes assembling the central hub at a rotationally centralized position within the outer rim; and
a series of airfoils, each airfoil having an aerodynamically lifting shape extending between a leading edge and a trailing edge, wherein a first end of each spoke is assembled to the central hub assembly and a second end of each spoke is assembled to the outer rim, a first spoke of the plurality of spokes being assembled to the central hub assembly in an arrangement extending in an acute angular direction from a radial orientation in a first direction and a second spoke of the plurality of spokes being assembled to the central hub assembly in an arrangement extending in an acute angular direction from a radial orientation in a second, opposite direction, wherein one spoke of the plurality of spokes attached to the central hub assembly crosses at least one another spoke of the plurality of spokes attached to the central hub assembly, wherein the each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

11. A system for generating electrical power, the system operating in accordance with steps of:

rotating a turbine blade assembly of a wind turbine, wherein the rotation of the turbine blade assembly is driven by a wind velocity;

generating electrical power by rotating an electrical power generator, wherein the rotation of the electrical power generating machine is driven by a rotation of the turbine blade assembly as a result of subjection to wind having the wind velocity;

measuring the wind velocity;

determining a wing tip speed;

determining a rotational rate of the turbine blade assembly that would encounter stall based upon the wind velocity subjected to the turbine blade assembly, wherein stall is a minimum rotational rate to maintain lift when subjected to the current wind velocity;

applying Artificial Intelligence (AI) to determine an optimal value of an electrical load that would maintain the rotational rate of the turbine blade assembly slightly faster than a rotational rate that would cause the turbine blade assembly to stall at one of the currently known wind velocity or an anticipated wind velocity, where the rotational rate slightly faster than the rotational rate that would cause the turbine blade assembly to stall accommodates a predetermined fluctuation in the wind velocity used to determine the stall, wherein the value of an electrical load is determined by the Artificial Intelligence (AI) operating on at least one microprocessor, the determination include considerations of the wind velocity and the wing tip speed of turbine blades of the turbine blade assembly;

changing a value of the electrical load applied to an electrical power circuit to the calculated optimal value, wherein the electrical power circuit applies the electrical load to the electrical power generator, wherein the applied load creates an electrical resistance to the electrical power generator, thus reducing the rotational rate of the turbine blade assembly, wherein the Artificial Intelligence (AI) learns optimization of the electrical load based upon history and affect of wind velocity and wing tip speed of the turbine blade causing stall, wherein the artificial intelligence operates on a microprocessor, wherein the artificial intelligence uses data obtained from a sensor that acquires a rotational speed of one of the turbine blade subassembly shaft and the generator shaft.

12. The system for generating electrical power as recited in claim 11, wherein the value of the electrical load is changed by at least one of:

(a) changing a state of at least one relay by an automated process, and (b) changing a value of a variable resistor by the automated process, wherein the automated process is controlled by the microprocessor.

13. The system for generating electrical power as recited in claim 11, wherein the step of determining the optimal value of the electrical load that would maintain the rotational rate of the turbine blade assembly slightly faster than the rotational rate that would cause the turbine blade assembly to stall at one of the currently known wind velocity or the anticipated wind velocity is calculated by comparing a ratio between the wind velocity and the wing tip speed to a predetermined value.

14. The system for generating electrical power as recited in claim 11, wherein the step of determining the optimal value of the electrical load that would maintain the rotational rate of the turbine blade assembly slightly faster than the rotational rate that would cause the turbine blade assembly to stall at one of the currently known wind velocity or the anticipated wind velocity is accomplished by artificial intelligence, wherein the artificial intelligence learns from a history of data points, the data points including wind velocity, wing tip speed of the turbine blades, and status of stall of the turbine blades.

15. The system for generating electrical power as recited in claim 11, wherein the angle of attack of the turbine blades are arranged to be within a range of between 20 and 28 degrees.

16. The system for generating electrical power as recited in claim 11, wherein the angle of attack of the turbine blades are arranged to be at slightly less than 28 degrees.

17. The system for generating electrical power as recited in claim 11, wherein the step of determining the optimal value of the electrical load that would maintain the rotational rate of the turbine blade assembly slightly faster than the rotational rate that would cause the turbine blade assembly to stall at one of the currently known wind velocity or the anticipated wind velocity utilizes an average of the wind velocity over a period of time as the wind velocity in the calculations.

18. The system for generating electrical power as recited in claim 11, wherein the step of determining the optimal value of the electrical load that would maintain the rotational rate of the turbine blade assembly slightly faster than the rotational rate that would cause the turbine blade assembly to stall at one of the currently known wind velocity or the anticipated wind velocity, wherein the value of the wind velocity used in the calculations is a function that includes a standard deviation of the wind velocity over a period of time.

19. The system for generating electrical power as recited in claim 11, the turbine blade subassembly further comprising:

an outer rim;

a central hub assembly;

a plurality of spokes assembling the central hub at a rotationally centralized position within the outer rim; and a series of airfoils, each airfoil having an aerodynamically lifting shape extending between a leading edge and a trailing edge, wherein a first end of each spoke is assembled to the central hub assembly and a second end of each spoke is assembled to the outer rim, a first spoke of the plurality of spokes being assembled to the central hub assembly in an arrangement extending in an acute angular direction from a radial orientation in a first direction and a second spoke of the plurality of spokes being assembled to the central hub assembly in an arrangement extending in an acute angular direction from a radial orientation in a second, opposite direction, wherein one spoke of the plurality of spokes attached to the central hub assembly crosses at least one another spoke of the plurality of spokes attached to the central hub assembly, wherein the each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

* * * * *